(12) United States Patent
Kamada et al.

(10) Patent No.: US 8,966,962 B2
(45) Date of Patent: Mar. 3, 2015

(54) MEASUREMENT DEVICE OF POSITION OF CENTER OF GRAVITY OF VEHICLE TO BE MEASURED ON TRUCK SCALE AND TRUCK SCALE

(75) Inventors: Takeaki Kamada, Takamatsu (JP); Takashi Tamura, Takamatsu (JP)

(73) Assignee: Kamacho Scale Co., Ltd., Kagawa (JP)

( * ) Notice: Subject to any disclaimer, the term of this patent is extended or adjusted under 35 U.S.C. 154(b) by 279 days.

(21) Appl. No.: 13/702,916

(22) PCT Filed: Jul. 28, 2011

(86) PCT No.: PCT/JP2011/067211
§ 371 (c)(1),
(2), (4) Date: Dec. 7, 2012

(87) PCT Pub. No.: WO2012/056779
PCT Pub. Date: May 3, 2012

(65) Prior Publication Data
US 2013/0081451 A1    Apr. 4, 2013

(30) Foreign Application Priority Data

Oct. 26, 2010  (JP) .................... 2010-239351
Nov. 15, 2010  (JP) .................... 2010-254797

(51) Int. Cl.
| | | |
|---|---|---|
| G01M 1/00 | (2006.01) | |
| G06F 17/10 | (2006.01) | |
| G06G 7/48 | (2006.01) | |
| G01M 1/12 | (2006.01) | |
| B60P 1/04 | (2006.01) | |
| G01G 19/02 | (2006.01) | |
| G01M 17/007 | (2006.01) | |

(52) U.S. Cl.
CPC ............. *G01M 1/122* (2013.01); *B60P 1/045* (2013.01); *G01G 19/021* (2013.01); *G01G 19/02* (2013.01); *G01M 17/007* (2013.01)
USPC ......................................... 73/65.01; 701/124

(58) Field of Classification Search
USPC ......................................... 73/65.01; 701/124
See application file for complete search history.

(56) References Cited

U.S. PATENT DOCUMENTS 6,327,526 B1 * 12/2001 Hagan ........................ 701/124

7,009,118 B2 * 3/2006 Pottebaum et al. .......... 177/136
(Continued)

FOREIGN PATENT DOCUMENTS

| JP | 08-170935 | 7/1996 |
|---|---|---|
| JP | 10-115680 | 5/1998 |

(Continued)

OTHER PUBLICATIONS

International Search Report for Application No. PCT/JP2011/067211, Japanese Patent Office, mailed Nov. 1, 2011, 7 pages.

*Primary Examiner* — Lisa Caputo
*Assistant Examiner* — Jamel Williams
(74) *Attorney, Agent, or Firm* — Sterne, Kessler, Goldstein & Fox P.L.L.C.

(57) ABSTRACT

As a measurement table (10), an object provided with a flat surface (11) having an area on which all wheels of a vehicle can be mounted at the same time and a front wheel mounting table (12) which is disposed in front of the flat surface (11) and is lifted by a step of a predetermined height is used, a wheel position detector (8) which is capable of detecting a front wheel position and a rear wheel position of a vehicle to be measured is provided, a computation processing device (3) is provided with anterior-posterior displacement calculation means, an inter-axle distance calculation means (21), a vehicle inclination calculation means (22), a front wheel axle load calculation means (23A), a rear wheel axle load calculation means (23B), an anterior-posterior gravity center position calculation means (24), a storage means (32), an anterior-posterior gravity center displacement calculation means (25), and a vehicle gravity center height position calculation means (26), and from a gravity center displacement which is calculated from anterior-posterior gravity center position information calculated on the flat surface (11) and anterior-posterior gravity center position information in the state in which front wheels are mounted on the front wheel mounting table (12) and a vehicle inclination which is calculated by the vehicle inclination calculation means (22), the position of the height of the center of gravity of the vehicle to be measured is calculated.

13 Claims, 24 Drawing Sheets

(56) References Cited

U.S. PATENT DOCUMENTS

| | | | |
|---|---|---|---|
| 7,054,727 B2* | 5/2006 | Kemp et al. | 701/32.3 |
| 2004/0064246 A1* | 4/2004 | Lu et al. | 701/124 |
| 2012/0239250 A1* | 9/2012 | Lu et al. | 701/36 |

FOREIGN PATENT DOCUMENTS

| | | |
|---|---|---|
| JP | 2006-003291 | 1/2006 |
| JP | 2006-010498 | 1/2006 |
| JP | 2006-105845 | 4/2006 |

\* cited by examiner

MEASUREMENT DEVICE OF POSITION OF CENTER OF GRAVITY OF VEHICLE TO BE MEASURED ON TRUCK SCALE AND TRUCK SCALE

TECHNICAL FIELD

The present invention relates to a truck scale having load cells provided at around four corners of a measuring table for measuring the weight of a vehicle to be measured on the basis of measurement values fed from the individual load cells when all wheels of the vehicle to be measured are placed on the measuring table. More particularly, the invention pertains to an apparatus for determining the center of gravity of a vehicle to be measured on a truck scale which is configured to automatically determine the position of the center of gravity of the vehicle to be measured when the vehicle to be measured is placed on a measuring table.

BACKGROUND ART

An example of a truck scale configured to measure the weight of a vehicle to be measured by placing the vehicle on a measuring table is described in Japanese Laid-open Patent Application No. 2006-105845 (Patent Document 1), for instance.

The truck scale of this prior art example (Patent Document 1) includes load cells provided at around four corners of a measuring table and is configured to measure the weight of a vehicle to be measured by performing calculation (addition) by means of a central processing unit on the basis of measurement values detected by the individual load cells when all wheels of the vehicle to be measured are placed on the measuring table. In cases where the measuring table is longitudinally long, there are truck scales including load cells provided halfway along a front/rear direction as well (including 6 or 8 load cells in total).

Meanwhile, if a steering wheel is turned sharply when a truck (especially a truck carrying a high-profile cargo box or container) is running, a great centrifugal force acts on the entirety of the truck, causing the truck to become liable to easily roll over. Such rolling action (centrifugal force) occurs particularly when the center of gravity of the vehicle is located at a high position, or when the center of gravity is displaced leftward or rightward from the middle of wheels at four corners. Especially when the center of gravity of the vehicle is located at a high position and displaced leftward or rightward, a resultant synergistic effect creates a great centrifugal force (causing a rollover accident to become more likely to occur).

On the other hand, when loading goods into a box or a container on the bed of a truck, it is preferable to load the goods while taking into consideration weight balance. In actuality, however, the goods are loaded with first priority placed on volume filling efficiency and only a rough consideration is given to the weight balance during a process of loading the goods. Incidentally, one can hardly tell by visual inspection whereabouts the center of gravity of the entirety of the vehicle is under conditions where individual loads are already in the box or the container on the bed of the truck.

Therefore, in the current situation, it is almost always the case that one drives a vehicle down a road without judging whereabouts the center of gravity of the entirety of the vehicle including the cargo exists. Thus, when the center of gravity of the vehicle is located at a high position or greatly displaced leftward or rightward, there has been a risk of a rollover accident potentially caused by a sharp turn of a steering wheel.

CITATION LIST

Patent Document

Patent Document 1: Japanese Laid-open Patent Application No. 2006-105845

SUMMARY OF INVENTION

Technical Problem

Meanwhile, a truck scale capable of determining whereabouts the center of gravity of a vehicle to be measured exists is unavailable in conventional truck scales (in Patent Document 1, for example) so that it has been impossible to determine the height of the center of gravity of the vehicle to be measured or the lateral position of the center of gravity.

Accordingly, it is an object of the present invention to provide an apparatus for determining the center of gravity of a vehicle to be measured on a truck scale that makes it possible to simultaneously determine the center of gravity of the vehicle to be measured when measuring the weight of the vehicle by adding a simple structure to an existing truck scale.

It is another object of the present invention to provide a truck scale having a function of determining the center of gravity of a vehicle to be measured.

Solution to Problem

The present invention has the following configurations as means for solving the aforementioned problems. Meanwhile, this invention is intended to make measuring of the position of the center of gravity of a vehicle to be measured (such as the height of the center of gravity and the lateral position of the center of gravity) possible under conditions where the vehicle to be measured is placed on a measuring table of a truck scale.

Invention of Claim 1

An apparatus for determining the center of gravity of a vehicle of a truck scale according to claim 1 of the present application is applied to the truck scale including load cells provided individually at around four corners of a measuring table below a bottom surface thereof, the measuring table being provided with a flat surface having a surface area on which all wheels of a vehicle to be measured can be simultaneously placed and a front wheel platform located at a position in a frontal part of the flat surface and raised to a specific height, the truck scale being configured to be able to measure the weight of the vehicle to be measured by a central processing unit on the basis of measurement values fed from the individual load cells when the vehicle to be measured is placed on the measuring table.

The aforementioned measuring table is of a type having a surface area (length) which is sufficient to measure the weight of vehicles which may range from a relatively small-sized truck having only two axles, that is, front and rear axles, to a large-sized truck having a larger number of axles (e.g., four axles or so) from the front to the rear that is capable of hauling a container carrier. Also, in the case of a measuring table having a long length, load cells may also be provided at locations near left and right sides of the measuring table halfway along a front/rear direction thereof in addition to locations at around four corners of the measuring table. While front wheels of the vehicle to be measured are typically placed on the front wheel platform, it is possible to determine the center of gravity by placing rear wheels of the vehicle to be measured on the platform.

The height of the front wheel platform raised above the flat surface of the measuring table is approximately of an amount that will not produce an excessive impact (unpleasant feeling) when the front wheels of the vehicle to be measured move up onto and down from the front wheel platform. While this height is not particularly limited, the height may be properly set within a range of about 10 to 100 mm, for example. In a case where this front wheel platform is constructed to have a larger height, it is desirable to design the front wheel platform to have slopes along front and rear edges. The raised height of the front wheel platform has an invariable value, so that this value may be stored as height information on the front wheel platform in storage means in advance.

The invention of an apparatus for determining the center of gravity of a vehicle to be measured of a truck scale according to claim 1 of the present application comprises:

a wheel position detector for detecting a front wheel position and a rear wheel position of the vehicle to be measured that is placed on the measuring table;

longitudinal displacement calculation means for calculating how much the vehicle to be measured is displaced frontward or rearward from a reference position along a front/rear direction (e.g., the positions of front and rear load cells) on the basis of information on the wheel positions detected by the wheel position detector under conditions where the vehicle to be measured is placed on the measuring table;

longitudinal center-of-gravity position calculation means for acquiring a front axle load and a rear axle load of the vehicle to be measured and calculating a position where the center of gravity of the vehicle is located along the front/rear direction thereof on the basis of the front axle load, the rear axle load and the amount of longitudinal displacement calculated by the longitudinal displacement calculation means;

storage means for storing information on the center of gravity along the front/rear direction calculated by the longitudinal center-of-gravity position calculation means;

longitudinal center-of-gravity displacement calculation means for calculating the amount of displacement of the center of gravity along the front/rear direction by comparing information on the center of gravity along the front/rear direction newly calculated by the longitudinal center-of-gravity position calculation means under conditions where front wheels of the vehicle to be measured ride on the front wheel platform and the information on the center of gravity on the flat surface stored in the storage means; and vehicle center-of-gravity height calculation means for acquiring a longitudinal inclination angle of the vehicle to be measured under conditions where the front wheels thereof ride on the front wheel platform and calculating the height of the center of gravity of the vehicle to be measured on the basis of the amount of displacement of the center of gravity along the front/rear direction calculated by the longitudinal center-of-gravity displacement calculation means and the longitudinal inclination angle.

The wheel position detector is for detecting the positions of the front and rear wheels (on the left or right side only) of the vehicle to be measured that is stopped on the measuring table. It is possible to use an optical sensor as the wheel position detector. Also, the sensor usable as the wheel position detector is a single unit which is installed at a fixed position beside the measuring table at the height of the wheels and swings over a large angular range (150° to 160°, for example) in horizontal directions frontward and rearward to monitor obstacles (wheels) within the range of swinging. Additionally, the sensor usable as the wheel position detector is of a type which acquires information on distances to the individual obstacles and information on angles thereto and outputs these pieces of information to the central processing unit each time the wheel position detector detects the obstacle (wheel) (turns ON) in a non-detecting state or switches from a detecting state to the non-detecting state (turns OFF) while swinging frontward and rearward.

Incidentally, although the exact position on the measuring table where the vehicle to be measured moving onto the measuring table stops is unknown, the wheel position detector can detect the positions of the front and rear wheels by swinging frontward and rearward no matter at which position the vehicle to be measured stops on the measuring table.

Invention of Claim 2

The invention according to claim 2 of the present Application is the invention of claim 1 further comprising:

inter-axle distance calculation means for calculating the distance between the front and rear axles from the front wheel position and the rear wheel position detected by the wheel position detector;

vehicle inclination angle calculation means for calculating the longitudinal inclination angle from the distance between the front and rear axles calculated by the inter-axle distance calculation means and the height of the front wheel platform; and front axle load calculation means and rear axle load calculation means for calculating the front axle load and the rear axle load on the basis of measurement values fed from the individual load cells, respectively.

The apparatus for determining the center of gravity of the vehicle of a truck scale according to claim 2 of the present application functions in the below-described manner. First, under conditions where all the wheels of the vehicle to be measured ride on the flat surface of the measuring table, the inter-axle distance calculation means calculates the distance between the front and rear axles of the vehicle to be measured on the basis of the wheel position information fed from the wheel position detector, whereas the longitudinal displacement calculation means calculates the amount of longitudinal displacement of the vehicle to be measured. Also, the vehicle inclination angle calculation means calculates the angle of inclination of the vehicle under conditions where the front wheels of the vehicle to be measured ride on the front wheel platform from the distance between the front and rear axles calculated by the inter-axle distance calculation means. Next, the longitudinal center-of-gravity position calculation means calculates the center of gravity of the vehicle along the front/rear direction from the amount of longitudinal displacement calculated by the longitudinal displacement calculation means and the front axle load and the rear axle load calculated by the front axle load calculation means and the rear axle load calculation means, respectively, and the storage means stores the information on the center of gravity along the front/rear direction. Subsequently, under conditions where the vehicle to be measured is advanced up to a point where the front wheels ride on the front wheel platform, the longitudinal center-of-gravity position calculation means newly calculates the center of gravity along the front/rear direction of the vehicle and the longitudinal center-of-gravity displacement calculation means calculates the amount of displacement of the center of gravity along the front/rear direction by comparing information on the newly calculated center of gravity along the front/rear direction and the information on the center of gravity along the front/rear direction (the information on the center of gravity along the front/rear direction on the flat surface) previously stored in the storage means. The apparatus is configured such that the vehicle center-of-gravity height calculation means can then calculate the height of the center of gravity of the vehicle on the basis of the amount of displacement of the center of gravity along the front/rear direction and the angle of inclination of the vehicle under conditions where the front wheels ride on the front wheel platform.

Although the invention of claim 2 of the present application requires the front wheel platform which is located in a frontal part of the measuring table (flat surface) and raised by a specific amount, the front wheel platform has an extremely simple structure as described above. Also, the wheel position detector can detect the positions of the front and rear wheels relatively easily. Additionally, other constituent elements can simply be incorporated in the central processing unit of an existing truck scale as the aforementioned various kinds of calculation means, so that it is possible to measure the height of the center of gravity of the vehicle to be measured with a simple structure as a whole. Also, the apparatus for determining the center of gravity of the vehicle according to claim 2 can measure the position of the vehicle's center of gravity fully automatically even if the vehicle to be measured is not registered in the truck scale yet.

Incidentally, knowing the height of the center of gravity of the vehicle as discussed above makes it possible to predict the risk of rollover of the vehicle in a road driving situation and to know in advance if the vehicle in the present situation has a secure safety level with respect to a rollover incidence.

Meanwhile, in the apparatus for determining the center of gravity of the vehicle of claim 2, the longitudinal center-of-gravity position calculation means can calculate also the center of gravity of the vehicle along the front/rear direction in a stage prior to calculation of the height of the vehicle's center of gravity and, therefore, it is possible to indicate the information on the center of gravity along the front/rear direction and the height of the center of gravity of the vehicle together with various pieces of weighing information on a weighing report on the vehicle to be measured.

Invention of Claim 3

The invention according to claim 3 of the present application is the invention of claim 1 further comprising:

inter-axle distance storage means for storing the distance between the front and rear axles of the vehicle to be measured in advance;

vehicle inclination angle calculation means for calculating the longitudinal inclination angle from the distance between the front and rear axles stored in the inter-axle distance storage means and the height of the front wheel platform; and front axle load calculation means and rear axle load calculation means for calculating the front axle load and the rear axle load on the basis of measurement values fed from the individual load cells, respectively.

The invention according to claim 3 of the present Application can be preferably applied in a case where the distance between the front and rear axles of the vehicle to be measured is known in advance. The apparatus for determining the center of gravity of the vehicle of claim 3 is such that if the vehicle to be measured is a registered vehicle, the apparatus causes the inter-axle distance storage means to store the distance between the front and rear axles of the vehicle in advance, whereas if the vehicle to be measured is an unregistered vehicle, the inter-axle distance (an actual measurement value indicated on a vehicle inspection certificate, for example) of the vehicle is input through an input device (keyboard) whereby the inter-axle distance storage means can store the inter-axle distance immediately before measurement each time.

According to the invention of claim 3, the accurate inter-axle distance (actual measurement value) known in advance can be input and stored in the inter-axle distance storage means, so that it is possible to calculate a height of the center of gravity of the vehicle to be measured using the accurate inter-axle distance.

Invention of Claim 4

The invention according to claim 4 of the present Application is the invention of claim 1 further comprising:

inter-axle distance calculation means for calculating the distance between the front and rear axles from the front wheel position and the rear wheel position detected by the wheel position detector;

vehicle inclination angle calculation means for calculating the longitudinal inclination angle from the distance between the front and rear axles calculated by the inter-axle distance calculation means and the height of the front wheel platform; and front axle load storage means and rear axle load storage means for storing the front axle load and the rear axle load, respectively in advance.

In the invention according to claim 4 of the present Application, it is possible to measure the front axle load and the rear axle load to be stored in the front axle load storage means and the rear axle load storage means, respectively, by a separately provided axle-load scale beforehand and individually input the front axle load and the rear axle load measured by the axle-load scale through an input device (keyboard) prior to measurement by the truck scale. This means that it is not necessary to obtain the front and rear axle loads by calculation.

Invention of Claim 5

The invention according to claim 5 of the present Application is the invention of claim 1 further comprising:

inter-axle distance storage means for storing the distance between the front and rear axles of the vehicle to be measured in advance;

vehicle inclination angle calculation means for calculating the longitudinal inclination angle from the distance between the front and rear axles stored in the inter-axle distance storage means and the height of the front wheel platform; and front axle load storage means and rear axle load storage means for storing the front axle load and the rear axle load in advance, respectively in advance.

In the invention according to claim 5 of the present application, it is possible to store the distance between the front and rear axles which is known from actual measurement or the like in the inter-axle distance storage means in advance and store the front axle load and the rear axle load measured by the separately provided axle-load scale, for example, in the front axle load storage means and the rear axle load storage means in advance, respectively.

In the apparatus for determining the center of gravity of the vehicle of claim 5, the vehicle inclination angle calculation means can calculate the inclination angle of the vehicle when the front wheels ride on the front wheel platform of the measuring table on the basis of inter-axle distance information stored in the inter-axle distance storage means on one hand, and the longitudinal center-of-gravity position calculation means can calculate the center of gravity along the front/rear direction of the vehicle to be measured from the front axle load and the rear axle load stored in the front axle load storage means and the rear axle load storage means, respectively, and the amount of longitudinal displacement calculated by the longitudinal displacement calculation means on the other hand during measurement of the vehicle to be measured.

Invention of Claim 6

The invention according to claim 6 of the present application is the invention of claim 1 further comprising:

vehicle inclination angle storage means for storing the longitudinal inclination angle of the vehicle to be measured of which distance between the front and rear axles is constant; and front axle load calculation means and rear axle load calculation means for calculating the front axle load and the rear axle load on the basis of measurement values fed from the individual load cells, respectively.

The invention according to claim 6 of the present application can be preferably applied when determining the center of gravity of vehicles to be measured which are of a type having the same front- to rear-axle distance. In the apparatus for determining the center of gravity of the vehicle of claim 6, the longitudinal inclination angle can be obtained from the inter-axle distance (actual measurement value) of the vehicle to be measured and the raised height of the front wheel platform (actual measurement value) each of which is invariable data and stored in the vehicle inclination angle storage means. The longitudinal inclination angle stored in the vehicle inclination angle storage means can be used by the vehicle center-of-gravity height calculation means for calculating the height of the center of gravity of the vehicle.

The apparatus for determining the center of gravity of the vehicle of claim 6 is intended to measure the height of the center of gravity of each vehicle to be measured all of which have the same distance between the front and rear axles. Since the individual vehicles to be measured have the same inter-axle distance in this case, the apparatus obtains the angle of inclination of each vehicle under conditions where the front wheels thereof ride on the front wheel platform from the distance between the front and rear axles and the raised height of the front wheel platform (each being an actual measurement value) each of which is invariable data and causes the vehicle inclination angle storage means to store the angle of inclination of each vehicle. This means that, because the apparatus can determine the longitudinal inclination angle of the vehicle to be measured under conditions where the front wheels thereof ride on the front wheel platform by calculation on the basis of individual pieces of actual invariable data, it is possible to calculate the height of the center of gravity of each vehicle to be measured using the accurate longitudinal inclination angle.

Invention of Claim 7

The invention according to claim 7 of the present application is the invention of claim 1 further comprising:

lateral displacement calculation means for calculating how much a central extension line passing between the left and right wheels is displaced along a left/right direction with respect to a central extension line passing between the left and right load cells on the basis of the wheel position information fed from the wheel position detector under conditions where the vehicle to be measured is placed on the measuring table;

left-wheel group wheel load calculation means and right-wheel group wheel load calculation means for calculating total loads of left- and right-side wheel groups of the vehicle to be measured, respectively, on the basis of measurement values fed from the individual load cells when the vehicle to be measured is placed on the measuring table; and lateral center-of-gravity position calculation means for calculating the position where the center of gravity of the vehicle is located along the left/right direction thereof from the total loads of the left and right wheels calculated by the left-wheel group wheel load calculation means and the right-wheel group wheel load calculation means, respectively, and the amount of displacement along the left/right direction calculated by the lateral displacement calculation means.

The invention according to claim 7 of the present application is configured to be able to calculate the position where the vehicle's center of gravity is located three-dimensionally in longitudinal, lateral and vertical directions of the vehicle. Specifically, the invention is so configured as to be able to calculate the longitudinal center-of-gravity position of the vehicle by the longitudinal center-of-gravity position calculation means and finally calculate the height of the center of gravity of the vehicle by the vehicle center-of-gravity height calculation means. As the invention is configured to be able to further calculate the vehicle's lateral center-of-gravity position, it is possible to know the three-dimensional position of the vehicle's center of gravity.

The apparatus for determining the center of gravity of the vehicle according to claim 7 of the present application functions in the below-described manner. First, information concerning a distance measured from the wheel position detector in a horizontal direction perpendicular to the central extension line passing between two load cells located on the left and right and the distance between the left and right wheels of the vehicle to be measured is stored in the storage means in advance. Positions where the individual load cells are installed and a position where the wheel position detector is installed are invariable data. From these data, it is possible to actually measure the distance from the wheel position detector in the horizontal direction perpendicular to the central extension line passing between the aforementioned load cells and store this distance in storage means (ROM) of a personal computer in a truck scale administration cabin. In a case where the vehicle to be measured is a leased vehicle, it is possible to register (store in the storage means) basic data on the vehicle (e.g., the license plate number, the zero-load weight of the vehicle, the number of axles and the distance between the left and right wheels) in the personal computer in advance, for example, so that the basic data on the vehicle to be measured can be retrieved by entering the license plate number of the relevant vehicle at the time of measurement. Meanwhile, in a case where the vehicle to be measured is not a leased vehicle (of which basic data is not registered), information concerning the distance between the left and right wheels only needs to be input prior to weighing.

The invention according to claim 7 of the present Application includes a function of calculating the vehicle's lateral center-of-gravity position in addition to functions of calculating the longitudinal center-of-gravity position and the height of the center of gravity of the vehicle. Specifically, under conditions where the vehicle to be measured rides on the measuring table, it is possible to calculate how much the central extension line passing between the left and right wheels is displaced along the left/right direction with respect to the central extension line passing between the left and right load cells by the lateral displacement calculation means, calculate the total loads of the left and right wheels by the left-wheel group wheel load calculation means and the right-wheel group wheel load calculation means, respectively, and calculate the vehicle's lateral center-of-gravity position from the aforementioned total loads of the left and right wheels and the aforementioned amount of displacement along the left/right direction by the lateral center-of-gravity position calculation means. This makes it possible to calculate the center of gravity of the vehicle to be measured three-dimensionally in the longitudinal, lateral and vertical directions.

Invention of Claim 8

The invention according to each of claims 1 to 7 recited above relates to the apparatus for determining the center of gravity of the vehicle of a truck scale. One of features of the apparatus is that the apparatus can easily be added to an existing truck scale. Besides this capability to add the apparatus to an existing truck scale, the present invention makes it possible to configure a new truck scale having a function of determining the position of the center of gravity of a vehicle.

Specifically, the invention according to claim 8 of the present application is a truck scale including load cells provided individually at around four corners of a measuring table below a bottom surface thereof, the measuring table being provided with a flat surface having a surface area on which all wheels of a vehicle to be measured can be simultaneously placed and a front wheel platform located at a position in a frontal part of the flat surface and raised to a specific height, the truck scale being configured to be able to measure the weight of the vehicle to be measured by a central processing unit on the basis of measurement values fed from the individual load cells when the vehicle to be measured is placed on the measuring table, the truck scale comprising:

a wheel position detector for detecting a front wheel position and a rear wheel position of the vehicle to be measured that is placed on the measuring table;

longitudinal displacement calculation means for calculating how much the vehicle to be measured is displaced frontward or rearward from a reference position along a front/rear direction on the basis of information on the wheel positions fed from the wheel position detector under conditions where the vehicle to be measured is placed on the measuring table;

longitudinal center-of-gravity position calculation means for acquiring a front axle load and a rear axle load of the vehicle to be measured and calculating a position where the center of gravity of the vehicle is located along the front/rear direction thereof on the basis of the front axle load, the rear axle load and the amount of longitudinal displacement calculated by the longitudinal displacement calculation means;

storage means for storing information on the center of gravity along the front/rear direction calculated by the longitudinal center-of-gravity position calculation means under conditions where all the wheels of the vehicle to be measured ride on the measuring table;

longitudinal center-of-gravity displacement calculation means for calculating the amount of displacement of the center of gravity along the front/rear direction by comparing information on the center of gravity along the front/rear direction newly calculated by the longitudinal center-of-gravity position calculation means under conditions where the front wheels of the vehicle to be measured ride on the front wheel platform and the information on the center of gravity on a flat surface stored in the storage means; and vehicle center-of-gravity height calculation means for acquiring a longitudinal inclination angle of the vehicle to be measured under conditions where the front wheels thereof ride on the front wheel platform and calculating the height of the center of gravity of the vehicle to be measured on the basis of the amount of displacement of the center of gravity along the front/rear direction calculated by the longitudinal center-of-gravity displacement calculation means and the longitudinal inclination angle.

Invention of Claim 9

An apparatus for determining the center of gravity of a vehicle to be measured of a truck scale according to claim 9 of the present application is the apparatus applied to the truck scale which includes load cells provided individually at around four corners of a measuring table below a bottom surface thereof, the truck scale being configured to be able to measure the weight of the vehicle to be measured by a central processing unit on the basis of measurement values fed from the individual load cells when the vehicle to be measured is placed on the measuring table.

The aforementioned measuring table is of a type having a surface area (length) which is sufficient to measure the weight of vehicles which may range from a relatively small-sized truck having only two axles, that is, front and rear axles, to a large-sized truck having a larger number of axles (e.g., four axles or so) from the front to the rear that is capable of hauling a container carrier. Also, in the case of a measuring table having a long length, load cells may also be provided at locations near left and right sides of the measuring table halfway along a front/rear direction thereof in addition to locations at around four corners of the measuring table.

The invention of an apparatus for determining the center of gravity of a vehicle to be measured of a truck scale according to claim 9 of the present application comprises:

a vehicle position detector for detecting a specified position of the vehicle to be measured that is placed on the measuring table;

lateral displacement calculation means for calculating how much a center line of the vehicle to be measured is displaced along a left/right direction with respect to a central extension line passing between a pair of left and right load cells on the basis of detection by the vehicle position detector;

left-wheel group wheel load calculation means and right-wheel group wheel load calculation means for calculating total loads of left- and right-side wheel groups of the vehicle to be measured, respectively, on the basis of measurement values fed from the individual load cells when the vehicle to be measured is placed on the measuring table; and lateral center-of-gravity position calculation means for calculating the position where the center of gravity of the vehicle is located along the left/right direction thereof from the total loads of the left and right wheels calculated by the left-wheel group wheel load calculation means and the right-wheel group wheel load calculation means, respectively, and the amount of displacement along the left/right direction calculated by the lateral displacement calculation means.

Invention of Claim 10

The invention according to claim 10 of the present Application is the invention of claim 9, wherein the vehicle position detector is configured to detect the position of one of left and right side surfaces of the vehicle to be measured that is placed on the measuring table, and the lateral displacement calculation means acquires the center line on the basis of information on the vehicle's side surface positions fed from the vehicle position detector and the width of the vehicle to be measured that is stored in advance.

In a case where the vehicle to be measured is a leased vehicle, it is possible to register (store) basic data on the vehicle in storage means (ROM) of a computer in advance and register data on the width of the vehicle to be measured in vehicle width storage means of the computer. Then, it is possible to retrieve the basic data and the vehicle width data of the vehicle to be measured by entering the license plate number of the relevant vehicle at the time of measurement. In a case where the vehicle to be measured is not a leased vehicle (of which basic data is not registered), on the other hand, it is possible to input data concerning the width of the vehicle prior to weighing. Meanwhile, the storage means (ROM) for registering (storing) the basic data of the vehicle to be measured may also be used as the vehicle width storage means for storing the vehicle width in advance.

Also, positions where the individual load cells are installed and a position where the vehicle's side surface position detector is installed are invariable data. From these data, it is possible to actually measure the distance from the vehicle's side surface position detector in the horizontal direction perpendicular to the central extension line passing between the aforementioned load cells and store this distance in the storage means (ROM) of the computer and the like in the truck scale administration cabin in advance.

The apparatus for determining the center of gravity of the vehicle of claim 10 of the present application is configured such that, under conditions where the vehicle to be measured rides on the measuring table, it is possible to calculate how much the center line of the vehicle is displaced along the left/right direction with respect to the central extension line passing between the left and right load cells by the lateral displacement calculation means, calculate the total loads of the left and right wheels by the left-wheel group wheel load calculation means and the right-wheel group wheel load calculation means, respectively, and calculate the vehicle's lateral center-of-gravity position from the aforementioned total loads of the left and right wheels and the aforementioned amount of displacement along the left/right direction by the lateral center-of-gravity position calculation means. Knowing the vehicle's lateral center-of-gravity position as discussed above makes it possible to predict the risk of rollover of the vehicle in a road driving situation and to know in advance if the vehicle in the present situation has a secure safety level with respect to a rollover incidence.

Invention of Claim 11

The invention according to claim 11 of the present application is the invention of claim 9, wherein the vehicle position detector includes vehicle's left side surface position detector and a vehicle's right side surface position detector for detecting the positions of left and right side surfaces of the vehicle to be measured that rides on the measuring table, respectively, and the lateral displacement calculation means acquires the center line on the basis of information on the vehicle's left and right side surface positions detected by the vehicle's left side surface position detector and the vehicle's right side surface position detector and the distance between the vehicle's left side surface position detector and the vehicle's right side surface position detector along the left/right direction stored in advance.

Although it is preferable to install the vehicle's left side surface position detector and the vehicle's right side surface position detector at positions equidistant leftward and rightward (bilaterally symmetric positions) from the central extension line passing between the left and right load cells, respectively, positions where the two detectors are installed need not necessarily be positions equidistant leftward and rightward from the central extension line passing between the left and right load cells (i.e., the positions need not be bilaterally symmetric positions).

The apparatus for determining the center of gravity of the vehicle of claim 11 is such that, under conditions where the vehicle to be measured rides on the measuring table, the vehicle's left side surface position detector and the vehicle's right side surface position detector detect distances from the individual detectors to the left and right side surfaces of the vehicle to be measured, respectively, and then it is possible to calculate the width of the vehicle to be measured by subtracting the distances to the left and right side surfaces of the vehicle detected respectively by the vehicle's left side surface position detector and the vehicle's right side surface position detector from the distance between the individual detectors along the left/right direction by the lateral displacement calculation means.

Then, as a result of the aforementioned calculation of the vehicle width, the lateral displacement calculation means can calculate how much the center line of the vehicle to be measured that rides on the measuring table is displaced leftward or rightward from the central extension line passing between the left and right load cells and, subsequently, the lateral center-of-gravity position calculation means can calculate the position where the center of gravity of the vehicle is located along the left/right direction thereof from the total loads of the left and right wheels calculated by the left-wheel group wheel load calculation means and the right-wheel group wheel load calculation means, respectively, and the amount of displacement along the left/right direction calculated by the lateral displacement calculation means as is the case with the aforementioned invention of claim 10. Therefore, the invention of claim 11 discussed herein makes it possible to measure the lateral center-of-gravity position of the vehicle to be measured even if data concerning the width of the vehicle to be measured is unavailable.

Invention of Claim 12

The invention according to claim 12 of the present Application is the invention of claim 9, wherein the vehicle position detector includes a single vehicle's left/right corner position detector for detecting the positions of left and right corners of the vehicle to be measured that rides on the measuring table by swinging across horizontal directions, and the lateral center-of-gravity position calculation means acquires the vehicle's center line on the basis of information on the positions of the vehicle's left and right corners detected by the vehicle's left/right corner position detector.

The apparatus for determining the center of gravity of the vehicle of claim 12 employs the single swing-type vehicle's left/right corner position detector for the measurement of the width of the vehicle to be measured, making it possible to achieve structural simplification. This vehicle's left/right corner position detector may be installed at a position obliquely ahead of a forward end of the vehicle to be measured that rides on the measuring table (or at a position obliquely behind at the rear of a rear end of the vehicle to be measured), for example. The vehicle's left/right corner position detector can detect the positions of the left and right corners at a front or rear part of the vehicle to be measured by swinging the vehicle's left/right corner position detector and provide data to be used for calculating the width of the vehicle to be measured and left and right positions thereof from each positions of the left and right corners.

The apparatus for determining the center of gravity of the vehicle of claim 12 is such that, under conditions where the vehicle to be measured rides on the measuring table, the vehicle's left/right corner position detector detects distances from the detector to the left and right corners of the vehicle to be measured, while the lateral displacement calculation means can calculate the width of the vehicle to be measured on the basis of the distances to the vehicle's left and right corners detected by the detector.

Then, as a result of the aforementioned calculation of the vehicle width, the lateral displacement calculation means can calculate how much the center line of the vehicle to be measured that rides on the measuring table is displaced leftward or rightward from the central extension line passing between the left and right load cells and, subsequently, the lateral center-of-gravity position calculation means can calculate the position where the center of gravity of the vehicle is located along the left/right direction thereof from the total loads of the left and right wheels calculated by the left-wheel group wheel load calculation means and the right-wheel group wheel load calculation means, respectively, and the amount of displacement along the left/right direction calculated by the lateral displacement calculation means as is the case with the aforementioned invention of claim 10. Therefore, as is the case with the invention of claim 11, the invention of claim 12 discussed herein makes it possible to determine the lateral center-of-gravity position of the vehicle to be measured even if data concerning the width of the vehicle to be measured is unavailable.

Invention of Claim 13

The invention according to each of claims 9 to 12 recited above relates to the apparatus for determining the center of gravity of the vehicle of a truck scale. One of features of the apparatus is that the apparatus can easily be added to an existing truck scale. Besides this capability to add the apparatus to an existing truck scale, the present invention makes it possible to configure a new truck scale having a function of determining the position of the center of gravity of a vehicle.

Specifically, the invention according to claim 13 of the present Application is a truck scale including load cells provided individually at around four corners of a measuring table below a bottom surface thereof, the truck scale being configured to be able to measure the weight of the vehicle to be measured by a central processing unit on the basis of measurement values fed from the individual load cells when the vehicle to be measured is placed on the measuring table, the truck scale comprising:

a vehicle position detector for detecting a specified position of the vehicle to be measured that is placed on the measuring table;

lateral displacement calculation means for calculating how much a center line of the vehicle to be measured is displaced along a left/right direction with respect to a central extension line passing between a pair of left and right load cells on the basis of detection by the vehicle position detector;

left-wheel group wheel load calculation means and right-wheel group wheel load calculation means for calculating total loads of left- and right-side wheel groups of the vehicle to be measured, respectively, on the basis of measurement values fed from the individual load cells when the vehicle to be measured is placed on the measuring table; and lateral center-of-gravity position calculation means for calculating the position where the center of gravity of the vehicle is located along the left/right direction thereof from the total loads of the left and right wheels calculated by the left-wheel group wheel load calculation means and the right-wheel group wheel load calculation means, respectively, and the amount of displacement along the left/right direction calculated by the lateral displacement calculation means.

Advantageous Effects of Invention

Advantages of the Invention of claim 1

The invention of the apparatus for determining the center of gravity of the vehicle of the truck scale according to claim 1 of the present application produces an advantage in that the apparatus can measure the weight of the vehicle to be measured by use of the truck scale and, at the same time, calculate the height of the center of gravity of the vehicle to be measured, which has been impossible with an existing truck scale. Generally, the higher the center of gravity of the vehicle, the higher the risk of rollover in driving situations. Thus, by knowing the height of the center of gravity of the vehicle in the aforementioned manner, it is possible to predict the risk of rollover of the vehicle in a road driving situation and to know in advance if the vehicle in the present situation has a secure safety level with respect to a rollover incidence.

Also, while the invention of claim 1 of the present Application uses the measuring table provided with the front wheel platform located at a position in the frontal part of the flat surface and raised to a specific height and the wheel position detector for detecting the positions of the front and rear wheels for calculating the height of the center of gravity of the vehicle to be measured, other features of the apparatus can be achieved by incorporating various kinds of means for calculating the height of the center of gravity of the vehicle in a central processing unit of an existing truck scale. Therefore, the invention also provides such an advantage that the structure of the apparatus for determining the center of gravity of the vehicle is extremely simple and thus can be manufactured at low cost.

Additionally, this apparatus for determining the center of gravity of the vehicle of claim 1 makes it possible to calculate the center of gravity along the front/rear direction of the vehicle to be measured by the longitudinal center-of-gravity position calculation means in a process of calculating the height of the center of gravity of the vehicle to be measured, and thereby recognize an imbalance of loaded cargo along the front/rear direction.

Advantages of the Invention of claim 2

The invention of claim 2 of the present application makes it possible to determine the distance between the front and rear axles by calculation as a result of detection by the vehicle position detector. It is therefore possible to calculate the height of the center of gravity of the vehicle even if the distance between the front axle and rear axle is unknown.

Advantages of the Invention of claim 3

The invention of claim 3 of the present Application makes it possible to store the distance between the front and rear axles of the vehicle to be measured in the vehicle inclination angle storage means on the basis of an actual measurement value, so that the vehicle inclination angle calculation means can calculate the longitudinal inclination angle on the basis of the accurate distance between the front and rear axles. The eventually calculated height of the center of gravity of the vehicle is therefore highly reliable.

Advantages of the Invention of claim 4

According to the invention of claim 4 of the present Application, the front axle load and the rear axle load of the vehicle to be measured are measured by a separately provided axle-load scale, and the front axle load and the rear axle load thus measured in advance can be stored in the front axle load storage means and the rear axle load storage means, respectively, before weighing the vehicle to be measured by the truck scale, so that it becomes unnecessary to calculate the front axle load and the rear axle load by the central processing unit at the time of actual weighing on the truck scale. It is therefore possible to simplify the structure.

Advantages of the Invention of claim 5

According to the invention of claim 5 of the present Application, the distance between the front and rear axles and the front and rear axle loads of the vehicle to be measured are stored in the prescribed storage means prior to the weighing by the truck scale, respectively, so that it becomes unnecessary to calculate the distance between the front and rear axles and the front and rear axle loads by the central processing unit at the time of actual weighing on the truck scale. It is therefore possible to simplify the structure.

Advantages of the Invention of claim 6

According to the invention of claim 6 of the present application, the inclination angle of the vehicle when the front wheels thereof ride on the front wheel platform can be obtained from the inter-axle distance (actual measurement value) of the vehicle to be measured and the raised height of the front wheel platform (actual measurement value) each of which is invariable data and stored in the vehicle inclination angle storage means. Thus, it is possible to use an accurate longitudinal inclination angle obtained from the inter-axle distance and the raised height of the front wheel platform based on the actual measurement values. The eventually calculated height of the center of gravity of the vehicle is therefore highly reliable.

Advantages of the Invention of claim

The invention of claim 7 of the present Application makes it possible to calculate the vehicle's lateral center-of-gravity position in addition to the longitudinal center-of-gravity position and the height of the center of gravity of the vehicle. Generally, the more the center of gravity of the vehicle is displaced leftward or rightward, the higher the risk of rollover in driving situations. Thus, it is important to know the amount of displacement of the center of gravity of the vehicle along the left/right direction in addition to recognizing the height of the vehicle's center of gravity in the aforementioned manner for predicting the risk of rollover in a road driving situation. Since the center of gravity of the vehicle to be measured can be calculated three-dimensionally in the longitudinal, lateral and vertical directions according to the invention of claim 7 discussed herein, it is possible to recognize the risk of rollover of the vehicle during road driving more strictly.

Advantages of the Invention of claim 8

The invention of the truck scale according to claim 8 of the present application makes it possible to calculate the height of the center of gravity of the vehicle to be measured, which has been impossible for an existing truck scale, as is the case with the invention of claim 1 of the present application. In addition to this, the invention of claim 8 makes it possible to calculate the longitudinal center-of-gravity position of the vehicle to be measured by the longitudinal center-of-gravity position calculation means in a process of calculating the height of the center of gravity of the vehicle to be measured, and thereby recognize an imbalance of loaded cargo along the front/rear direction.

Advantages of the Invention of claim 9

The invention of the apparatus for determining the center of gravity of the vehicle of the truck scale according to claim 9 of the present application produces an advantage in that the apparatus can measure the weight of the vehicle to be measured by use of the truck scale and, at the same time, calculate the lateral center-of-gravity position of the vehicle to be measured, which has been impossible with an existing truck scale.

Generally, if the vehicle is run on a road with the vehicle's center of gravity greatly displaced leftward or rightward, the risk of rollover in a driving situation increases. Thus, by knowing the lateral center-of-gravity position of the vehicle, it is possible to predict the risk of rollover of the vehicle in the road driving situation and to know in advance if the vehicle in the present situation has a secure safety level with respect to a rollover incidence.

Advantages of the Invention of claim 10

According to the invention of claim 10 of the present Application, it is possible to use a vehicle's side surface position detector for detecting the position of one of the side surfaces of the vehicle to be measured on the measuring table as the vehicle position detector by storing the width of the vehicle to be measured in advance. This makes it possible to achieve structural simplification and low-cost manufacturing.

Advantages of the Invention of claim 11

According to the invention of claim 11 of the present Application, the vehicle's left side surface position detector and the vehicle's right side surface position detector detect the positions of (distances to) the left and right side surfaces of the vehicle to be measured that rides on the measuring table, respectively, so that it is possible to calculate the width of the vehicle to be measured even if the width of the vehicle is unknown.

Advantages of the Invention of claim 12

As the invention of claim 12 of the present application employs the swing-type detector, it is possible to calculate the width of the vehicle to be measured with a single detector. This makes it possible to achieve structural simplification and low-cost manufacturing.

Advantages of the Invention of claim 13

As is the case with the invention of claim 9 of the present Application, the invention of the truck scale according to claim 13 of the present Application makes it possible to calculate the lateral center-of-gravity position of the vehicle to be measured, which has been impossible with an existing truck scale.

DESCRIPTION OF EMBODIMENTS

First to Fifth Embodiments

Figure 9:
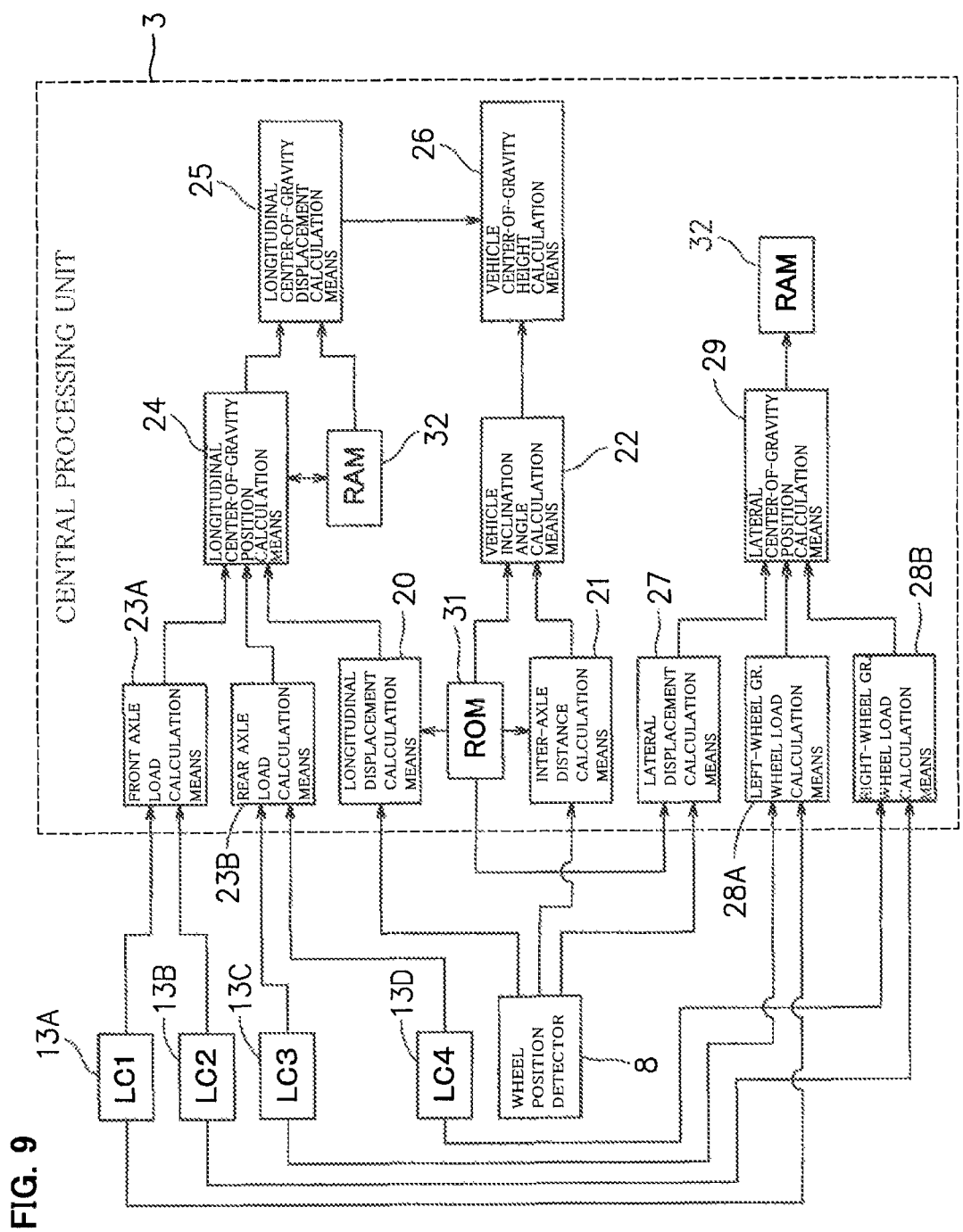
FIG. 9 is a detailed block diagram of the apparatus for determining the center of gravity of the vehicle according to the first embodiment of this application.
Figure 10:
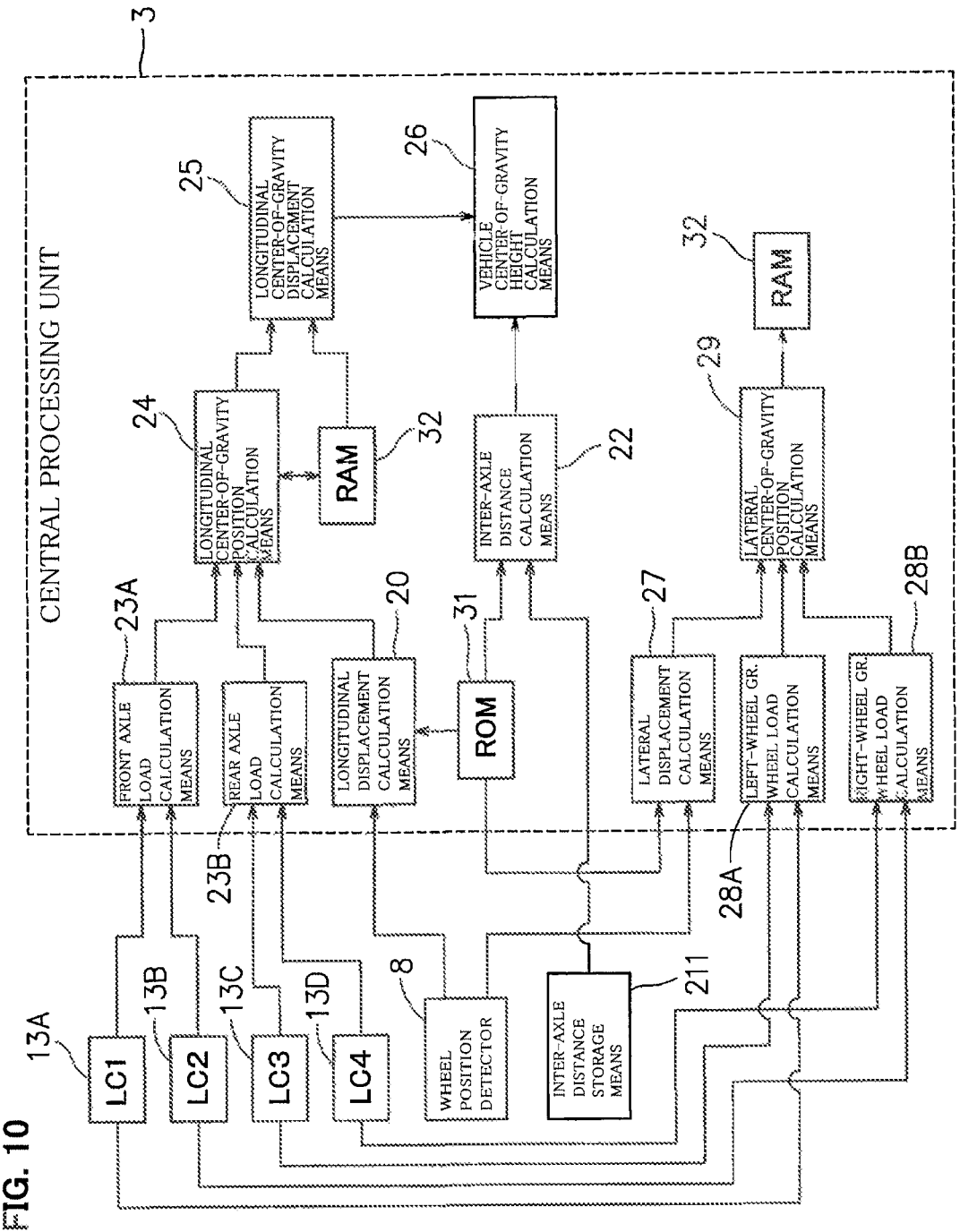
FIG. 10 is a detailed block diagram of an apparatus for determining the center of gravity of the vehicle according to a second embodiment of this application.
Figure 11:
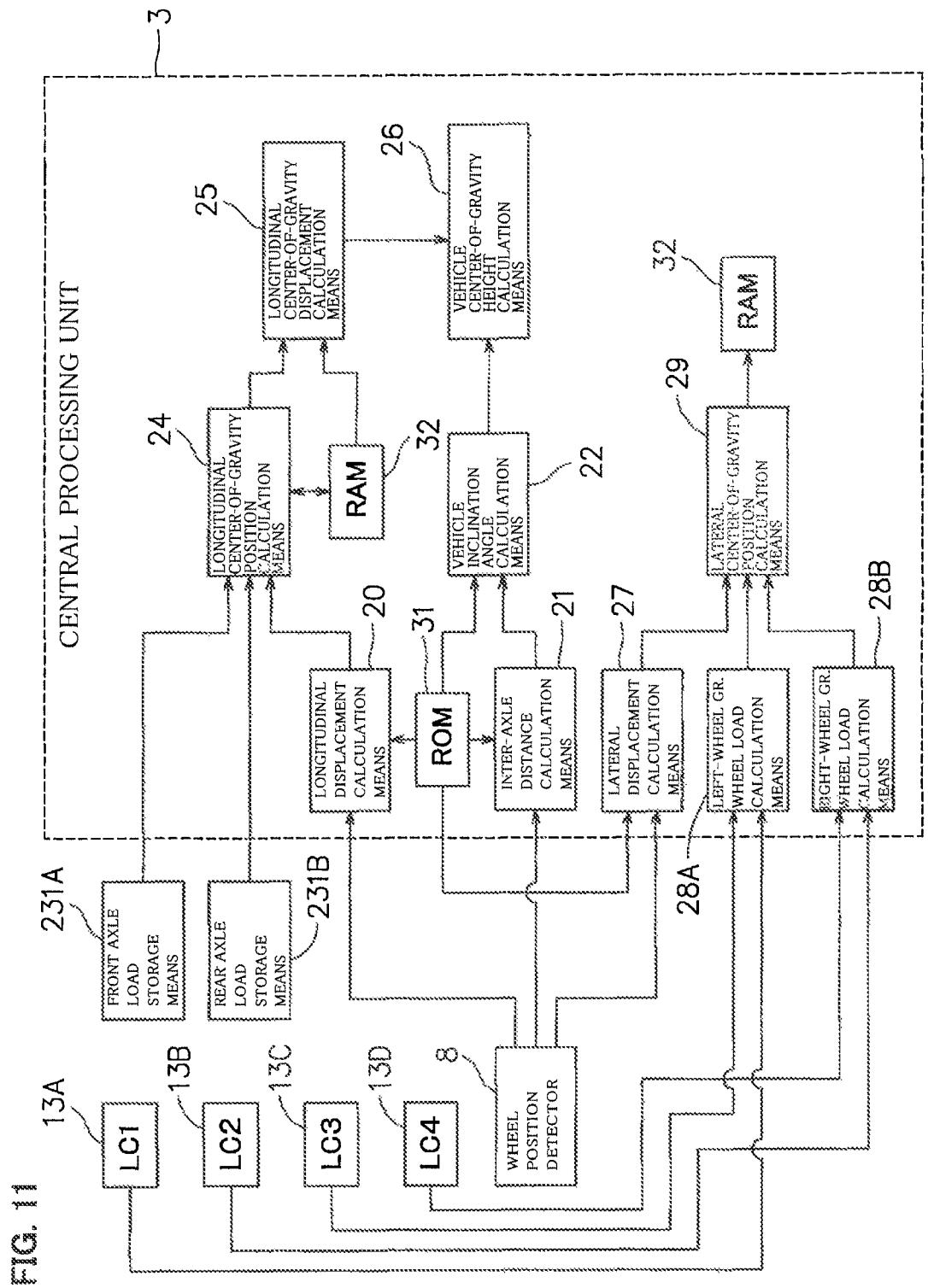
FIG. 11 is a detailed block diagram of an apparatus for determining the center of gravity of the vehicle according to a third embodiment of this application.
Figure 12:
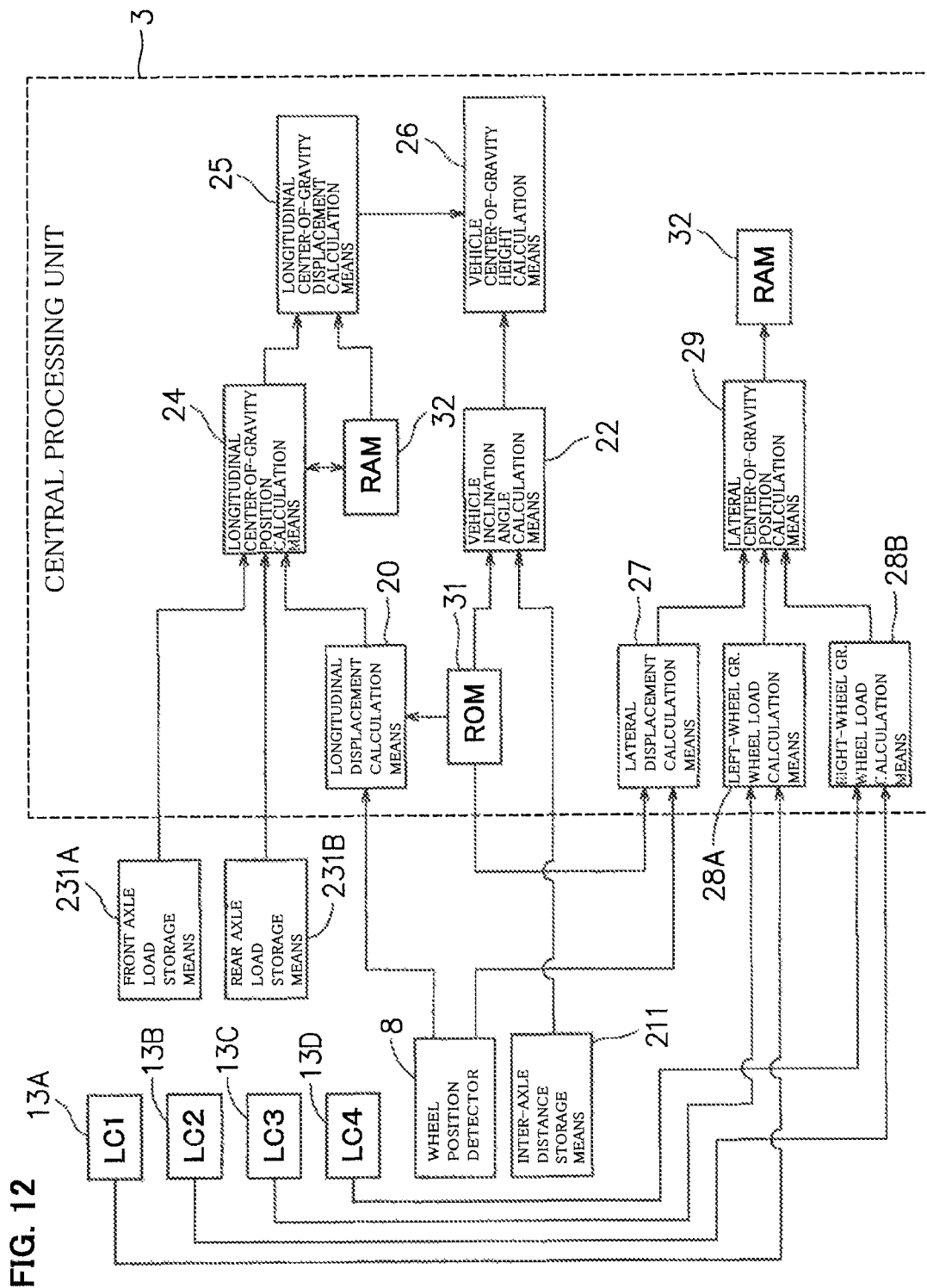
FIG. 12 is a detailed block diagram of an apparatus for determining the center of gravity of the vehicle according to a fourth embodiment of this application.
Figure 13:
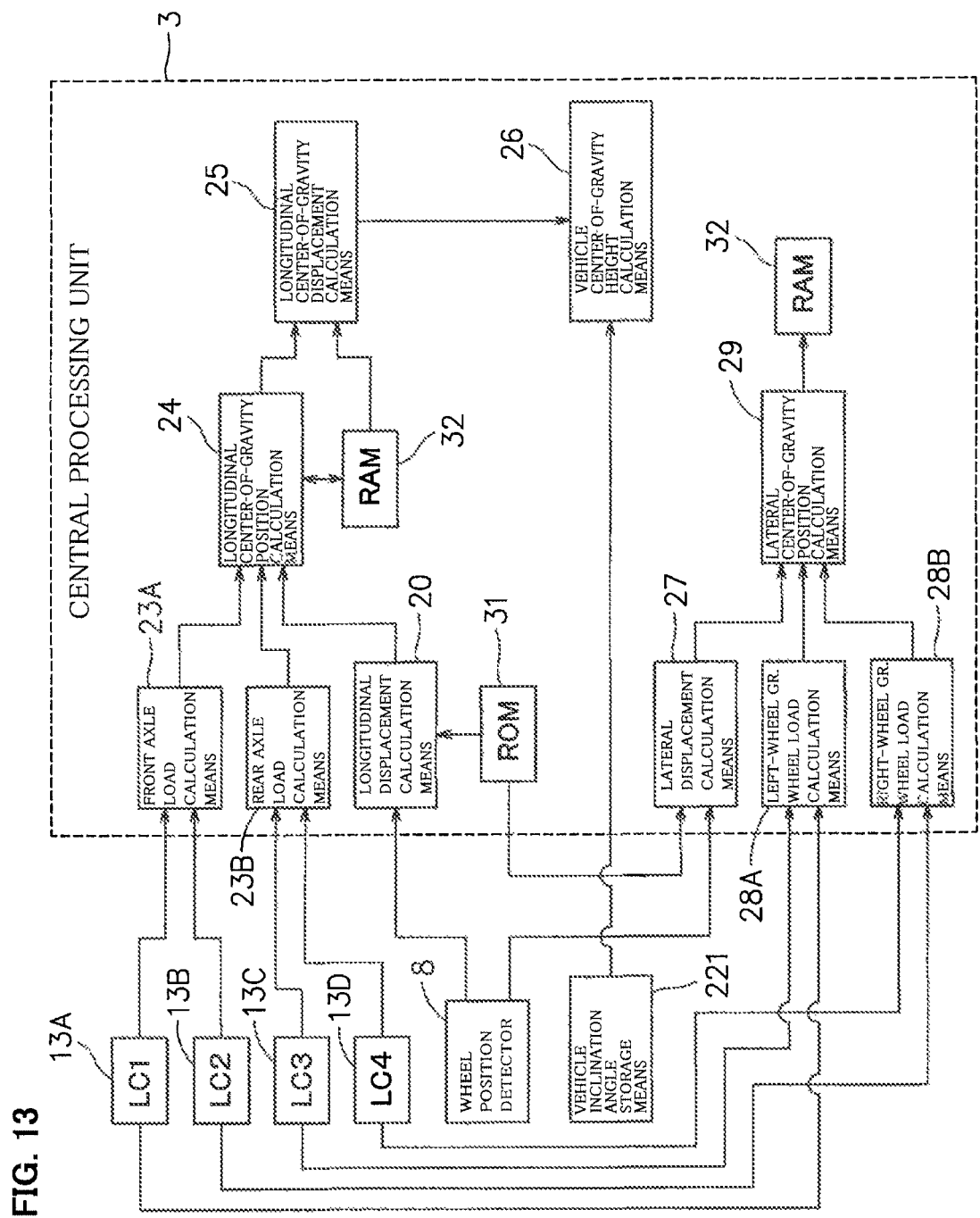
FIG. 13 is a detailed block diagram of an apparatus for determining the center of gravity of the vehicle according to a fifth embodiment of this application.

Referring to FIGS. 1 to 13, an apparatus for determining a vehicle's center of gravity of a truck scale according to each of first to fifth embodiments of the present invention is described. The apparatus for determining the vehicle's center of gravity is configured to be able to determine the center of gravity of a vehicle 5 to be measured by using a truck scale 1 illustrated in FIGS. 1 to 7 and a central processing unit 3 depicted in FIG. 8. Also, FIG. 9 is a detailed block diagram of the apparatus for determining the vehicle's center of gravity according to the first embodiment, FIG. 10 is a detailed block diagram of the apparatus for determining the vehicle's center of gravity according to the second embodiment, FIG. 11 is a detailed block diagram of the apparatus for determining the vehicle's center of gravity according to the third embodiment, FIG. 12 is a detailed block diagram of the apparatus for determining the vehicle's center of gravity according to the fourth embodiment, and FIG. 13 is a detailed block diagram of the apparatus for determining the vehicle's center of gravity according to the fifth embodiment. In FIGS. 1 to 13, similar constituent elements are designated by the same symbols.

Referring to FIGS. 1 to 8, the overall structure of the truck scale 1 used in the aforementioned individual embodiments is described first.

Figure 1:
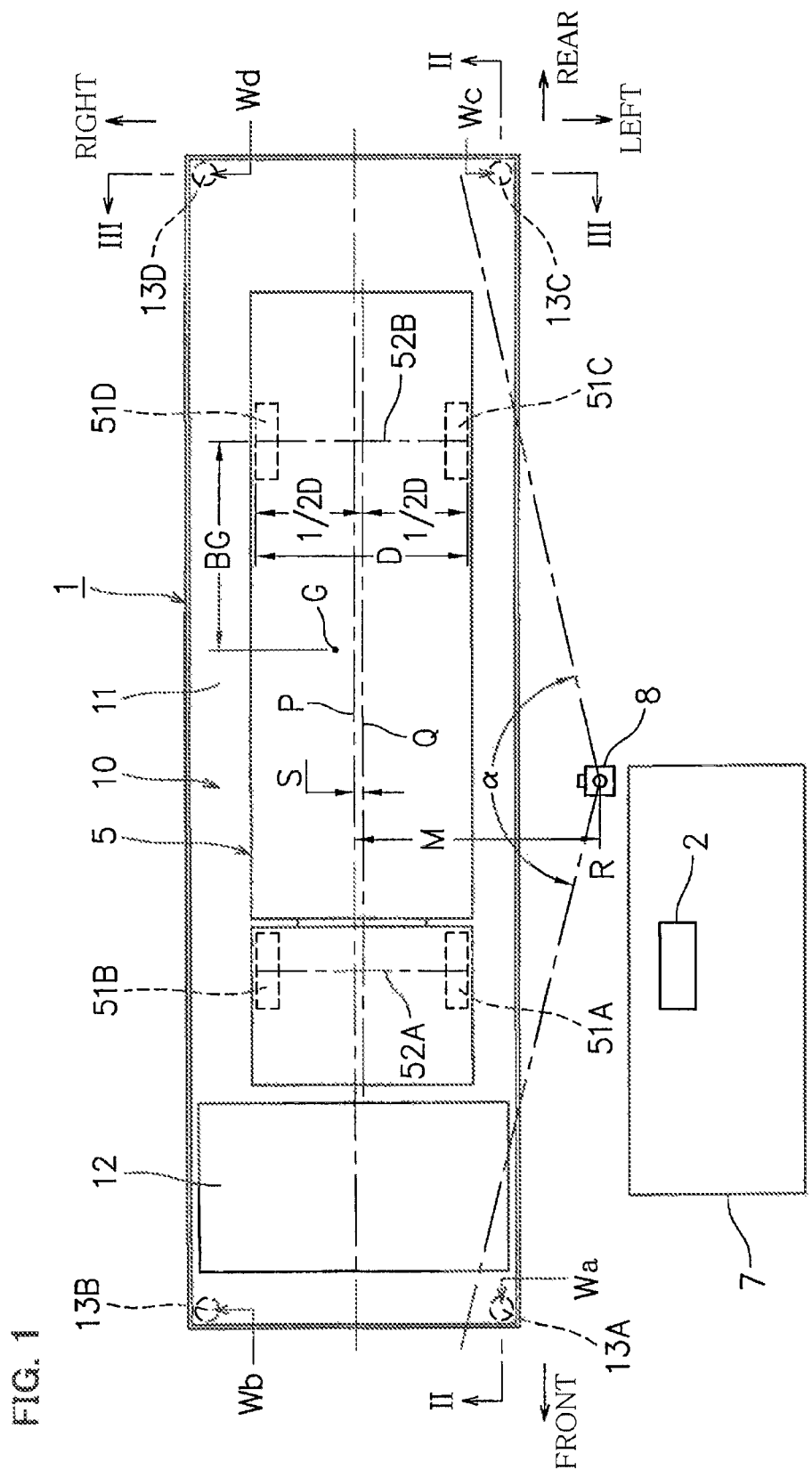
FIG. 1 is a plan view of a truck scale provided with an apparatus for determining the center of gravity of a vehicle according to a first embodiment of this Application, the plan view depicting a state in which the vehicle to be measured is placed on a flat surface of a measuring table.
Figure 2:
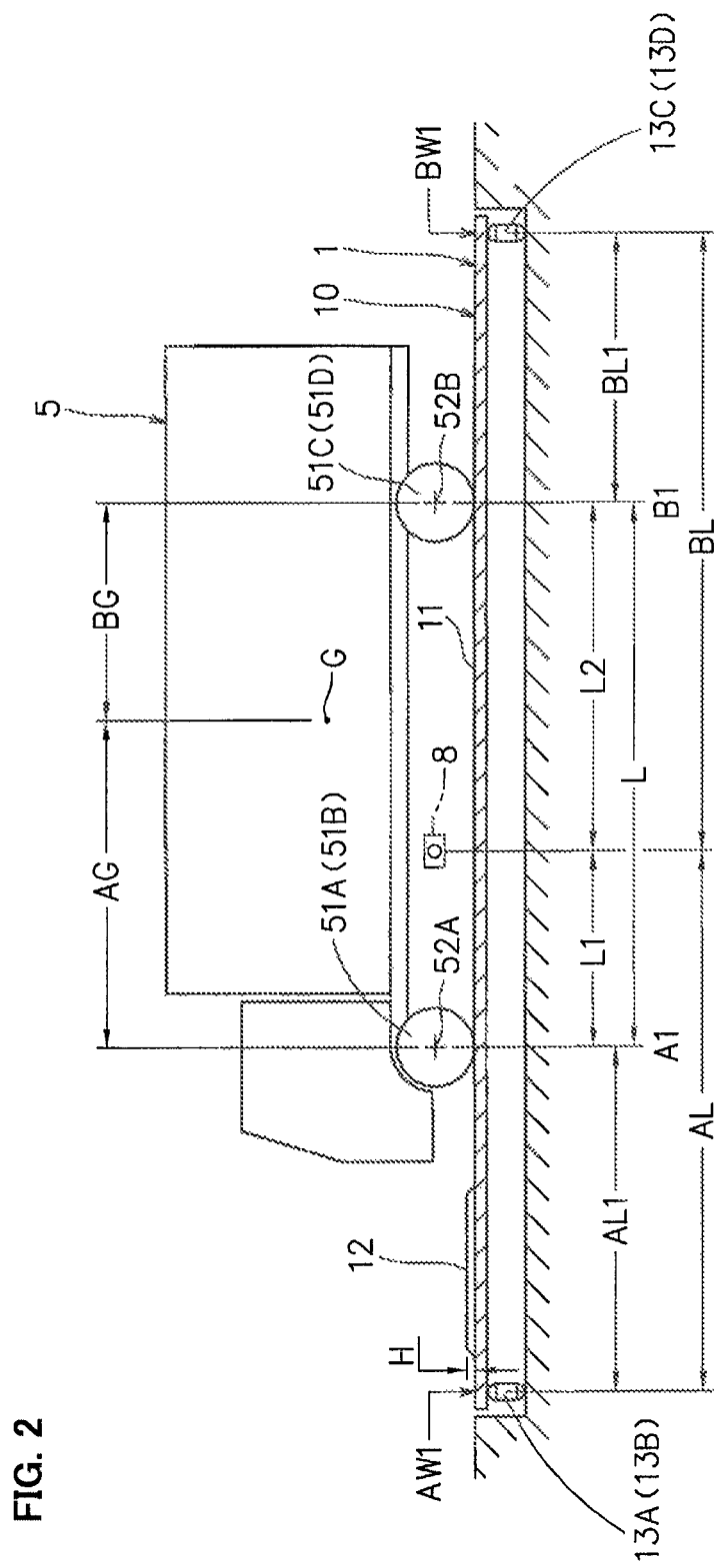
FIG. 2 is a view taken in the direction of arrows II-II of FIG. 1.
Figure 3:
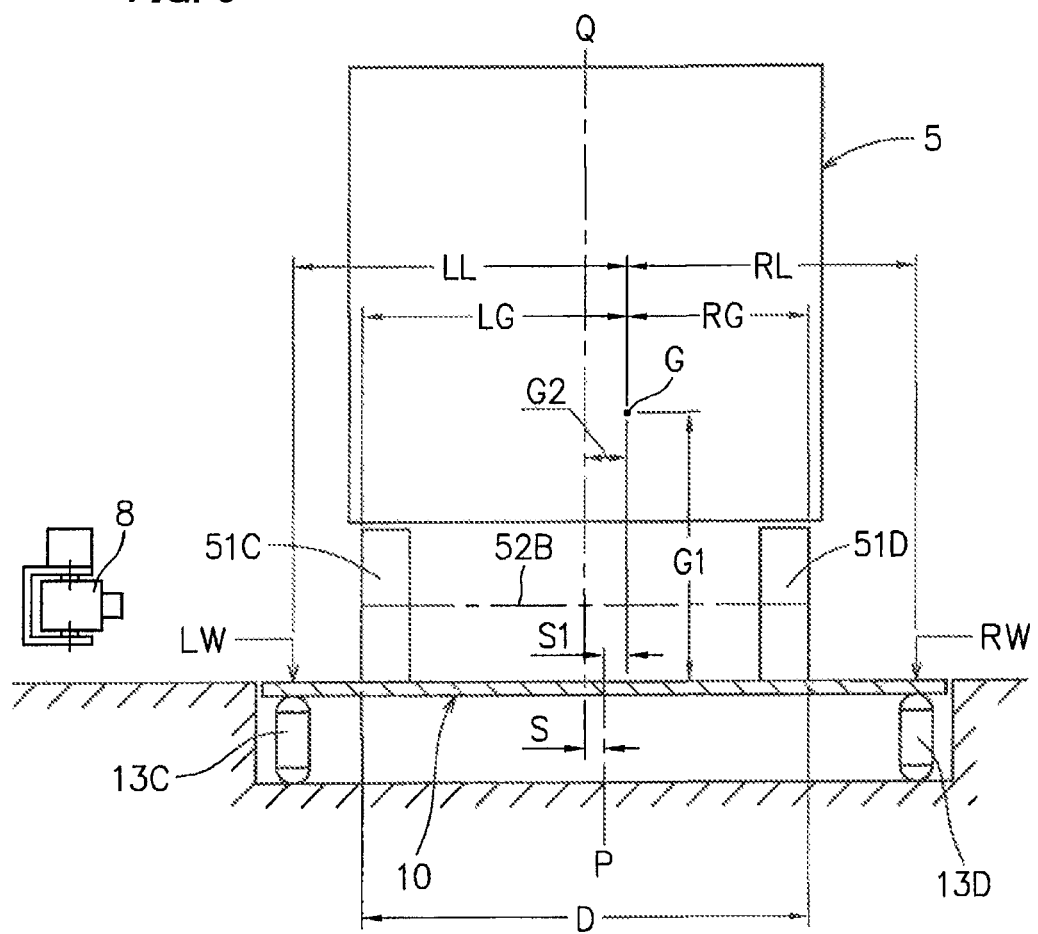
FIG. 3 is an enlarged view taken in the direction of arrows III-III of FIG. 1.

As depicted in FIGS. 1 to 3, the truck scale 1 includes load cells 13A-13D provided individually at around four corners of a longitudinally long measuring table 10 below a bottom surface thereof. The truck scale 1 can measure the weight of the vehicle 5 to be measured by means of the central processing unit (CPU) 3 depicted in FIG. 8 on the basis of measurement values fed from the individual load cells 13A-13D when the vehicle 5 to be measured is placed on the measuring table 10.

The present embodiment employs a structure in which the load cells 13A-13D are provided one each (four in total) at around the four corners, that is, front-left, front-right, rear-left and rear right corners, of the measuring table 10 below the bottom surface thereof and the vehicle 5 to be measured is provided with four wheels 51A-51D of the vehicle 5 to be measured, that is, front-left, front-right, rear-left and rear right wheels to facilitate understanding of a method of calculating the center of gravity of the vehicle. Meanwhile, designated by the symbol 52A is a front axle and designated by the symbol 52B is a rear axle.

Located close to the truck scale 1 is an administration cabin 7 in which a computer 2 for performing various processing operations concerning weight measurement of the vehicle 5 to be measured is provided.

Figure 8:
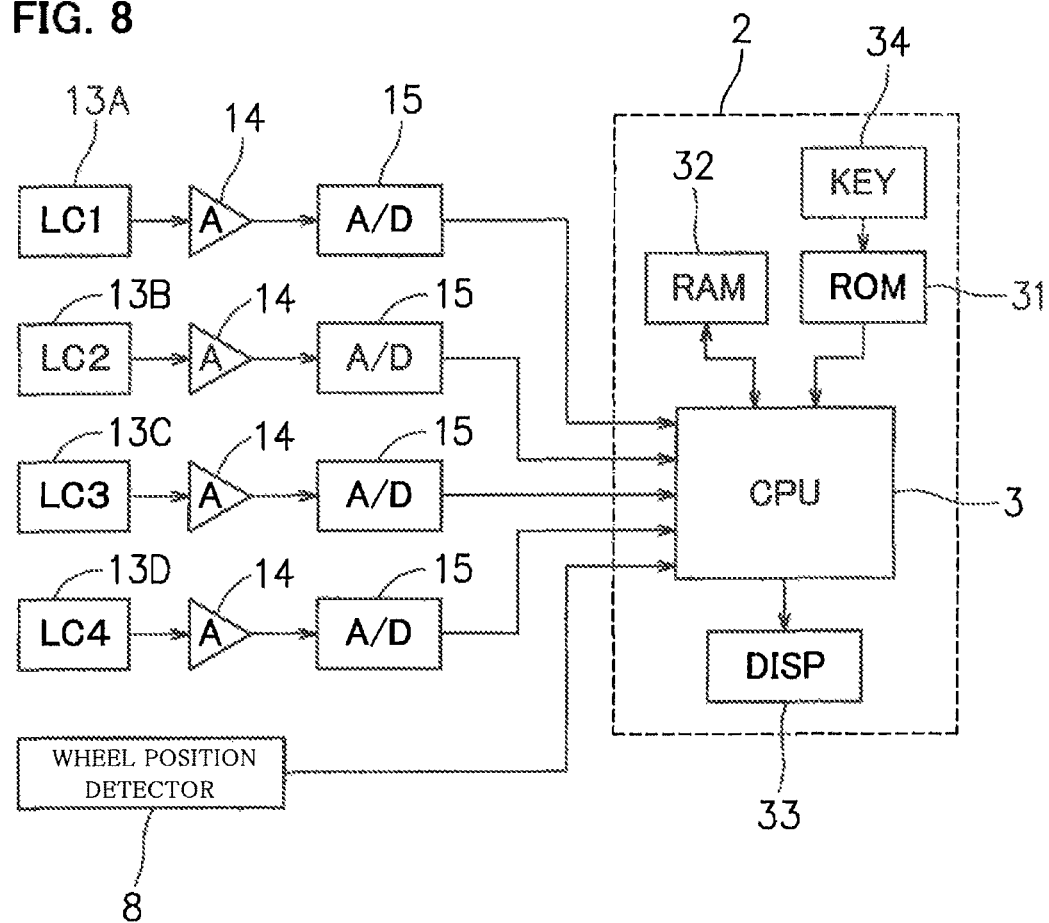
FIG. 8 is a general block diagram of the apparatus for determining the center of gravity of the vehicle according to the first embodiment of this application.

This computer 2 includes, besides the central processing unit (CPU) 3, various kinds of storage means (ROM, RAM) 31, 32, a display (DISP) 33, an input device (KEY) 34, etc. as depicted in FIG. 8. Meanwhile, the computer 2 referred to herein is a device that carries out all the processing operations concerning weight measurement and determination of the center of gravity performed on the truck scale 1.

The truck scale 1 is configured such that, as depicted in FIG. 8, when the vehicle 5 to be measured is placed on the measuring table 10, measurement values detected by the individual load cells (LC1-LC4) 13A-13D are amplified by amplifiers 14, converted into digital signals by analog-to-digital (A/D) converters 15, and input into the central processing unit (CPU) 3 which adds up the measurement values detected by the individual load cells 13A-13D, whereby the display 33 can present the total weight of the vehicle 5 to be measured. It is possible to print out various kinds of data presented on he display 33 in the form of a weighing report.

The input device (KEY) 34 is a keyboard of the computer 2, for example. There is made such an arrangement that basic data on the vehicle 5 to be measured (e.g., the license plate number and zero-load weight of the vehicle) can be registered (stored) in the storage means (ROM) 31 of the computer 2.

Incidentally, although generally available truck scales of the prior art have been able to calculate various data concerning the weight of a vehicle to be measured including the weights of individual wheels, individual axle loads, total vehicle weight, and so on, those truck scales have not been able to perform measurement concerning the center of gravity of the vehicle that is related to the vehicle's rolling action in a driving situation.

Under such circumstances, the apparatus for determining the center of gravity of the vehicle of each embodiment of the present Application is configured to be able to calculate various data concerning the center of gravity of the vehicle 5 to be measured besides various kinds of weights on the measuring table 10 of the truck scale 1.

The apparatus for determining the center of gravity of the vehicle of this embodiment includes a later-described front wheel platform 12 added to the measuring table 10 as well as a wheel position detector 8 which can detect a front wheel position A (A1 in FIG. 2 or A2 in FIG. 6, for example) and a rear wheel position B (B1 in FIG. 2 or B2 in FIG. 6, for example) of the vehicle 5 to be measured that is placed on the measuring table 10.

The measuring table 10 is provided with a flat surface 11 having a surface area on which all the wheels 51A-51D of the vehicle 5 to be measured can be simultaneously placed. The measuring table 10 used herein includes the front wheel platform 12 which is located at a position in a frontal part of the flat surface 11 and raised by a specific amount to a height above the flat surface 11. The flat surface 11 of the measuring table 10 forms a horizontal plane. The height H of the front wheel platform 12 raised above the flat surface 11 (refer to FIGS. 2, 6 and 7) is approximately of an amount that will not produce an excessive impact (unpleasant feeling) when the front wheels 52A, 52B of the vehicle 5 to be measured move up onto and down from the front wheel platform 12. While this height is not particularly limited, the height H of the front wheel platform 12 is appropriately set within a range of about 10 to 100 mm, for example. In a case where this front wheel platform 12 is constructed higher, it is desirable to design the front wheel platform 12 to have slopes along front and rear edges.

Under conditions where all the wheels 51A-51D of the vehicle 5 to be measured are located on the flat surface 11 of the measuring table 10 (i.e., a state depicted in FIGS. 1 and 2), all the wheels 51A-51D are positioned at the same height. Under conditions where the front wheels 51A, 51B of the vehicle 5 to be measured are located on the front wheel platform 12 of the measuring table 10 (i.e., a state depicted in FIGS. 5 and 6), on the other hand, the front wheels 51A, 51B (front axle 52A) are positioned higher than the rear wheels 51C, 51D (rear axle 52B) so that the entire vehicle is inclined downward towards the rear by a slight angle θ.

Figure 5:
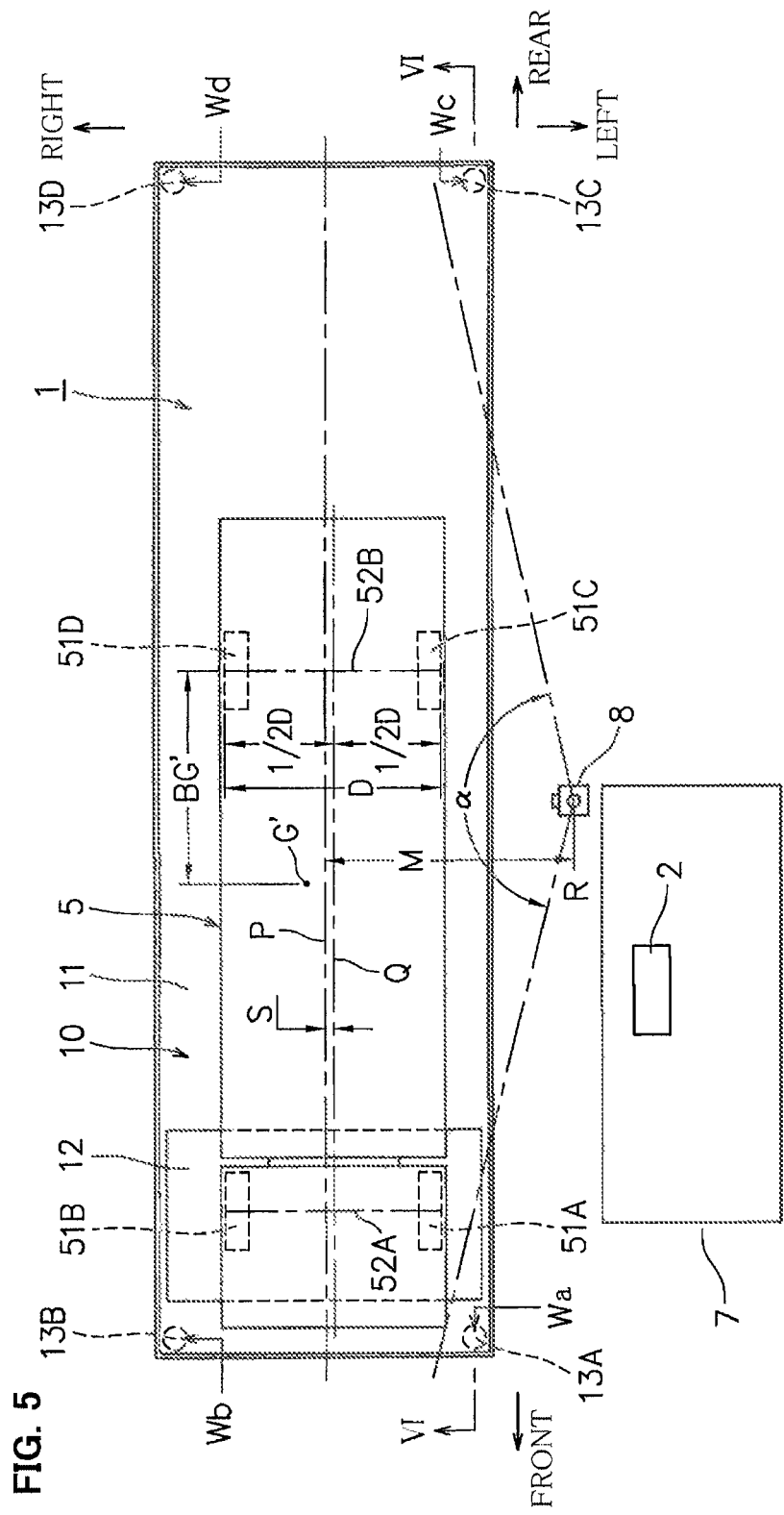
FIG. 5 is a plan view depicting a state in which front wheels of the vehicle to be measured are located on a front wheel platform of the measuring table of the truck scale of FIG. 1.

The wheel position detector 8 capable of individually detecting the front wheel position and the rear wheel position of the vehicle 5 to be measured that is placed on the measuring table 10 is configured with a single range sensor which is made of an optical sensor. The wheel position detector 8 is located at a fixed position on a left side of the measuring table 10 at the same height as the center of each wheel of the vehicle 5 to be measured. The wheel position detector 8 is configured to swing over a large angular range α (α=150° to 160°, for example) in horizontal directions frontward and rearward as depicted in FIGS. 1 and 5 so as to monitor obstacles (i.e., the left-side wheels 51A, 51C) within the range of swinging. Specifically, if the wheel position detector 8 is swung from a front side to a rear side, for example, under conditions where the vehicle 5 to be measured is stopped on the measuring table 10 (the vehicle's stopping position is not strictly defined in either a front/rear direction or a left/right direction), the wheel position detector 8 becomes ON upon detecting a foremost part 51Aa of the left-front wheel 51A and becomes OFF (not detecting) when a rearmost part 51Ab of the left-front wheel 51A goes out of the swinging range of the wheel position detector 8. Likewise, the wheel position detector 8 becomes ON upon detecting a foremost part 51Ca of the left-rear wheel 51C and becomes OFF (not detecting) when a rearmost part 51Cb of the left-rear wheel 51C goes out of the swinging range of the wheel position detector 8. Meanwhile, the frontward/rearward swinging range α of the wheel position detector 8 is so set as to be able to detect the positions of each of the front and rear wheels 51A, 51C no matter at which position the vehicle 5 to be measured is located within a wide range from a position close to a rear end of the measuring table 10 to a front end thereof.

Figure 4:
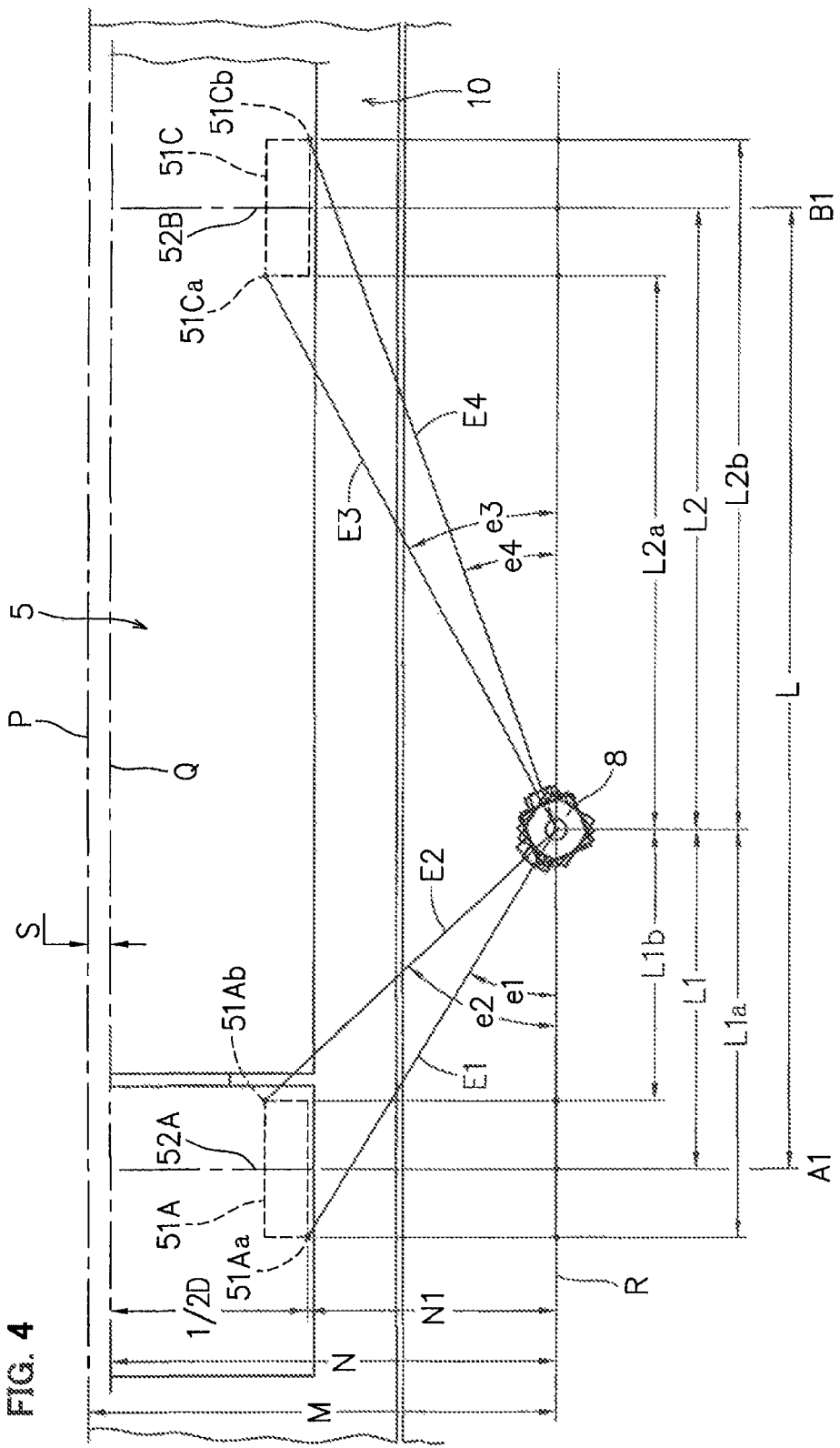
FIG. 4 is a diagram for explaining a method of calculating the position of the vehicle to be measured by the apparatus for determining the center of gravity of the vehicle of FIG. 1.

As depicted in FIG. 4, the wheel position detector 8 detects distances E1-E4 from the wheel position detector 8 to individual wheel detecting positions or wheel non-detecting positions and angles e1-e4 of the individual wheel detecting positions or wheel non-detecting positions with respect to a front-to-rear extension line R passing through the wheel position detector 8 at points in time when the wheel position detector 8 becomes ON and OFF. The wheel position detector 8 then outputs relevant distance data (E1-E4) and relevant angle data (e1-e4) individually to later-described specific calculation means (longitudinal displacement calculation means 20, inter-axle distance calculation means 21 and lateral displacement calculation means 27 in the first embodiment of FIG. 9). Incidentally, methods of calculation performed by the longitudinal displacement calculation means 20, the inter-axle distance calculation means 21 and the lateral displacement calculation means 27 of FIG. 9 will be described later.

Basic data on the truck scale 1 are registered (stored) in the storage means (ROM) 31 of the computer 2 beforehand. Among these basic data concerning the truck scale 1, distances AL, BL along the front/rear direction from the wheel position detector 8 to the front and rear load cells 13A, 13C, respectively, distance M measured from the wheel position detector 8 in a horizontal direction perpendicular to a central extension line P passing between the left and right load cells 13A, 13B (or 13C, 13D), and the height H of the front wheel platform 12 are stored individually in the storage means (ROM) 31 based on actual measurements. The storage means (ROM) 31 also stores a data table concerning a trigonometric function.

In a case where the vehicle 5 to be measured is a leased vehicle, this storage means (ROM) 31 stores basic data on the vehicle (e.g., the license plate number, the zero-load weight of the vehicle, the number of axles and distance ½D measured from the left and right wheels perpendicularly to a center line Q of the vehicle 5 to be measured based on distance D between the left and right wheels) beforehand. It is possible to retrieve the basic data on the vehicle 5 to be measured (i.e., the distance ½D measured from the left and right wheels perpendicularly to the center line Q for calculation of the lateral position of the center of gravity) by entering the license plate number of the relevant vehicle at the time of measurement. Meanwhile, in a case where the vehicle 5 to be measured is not a leased vehicle (of which basic data is not registered), information concerning the distance ½D measured from the left and right wheels perpendicularly to the center line Q of the vehicle 5 to be measured based on the distance D between the left and right wheels is input prior to weighing.

Next, the central processing units 3 of the first to fifth embodiments depicted in FIGS. 9 to 13 are individually described.

<First Embodiment of FIG. 9 >

The central processing unit 3 of the first embodiment depicted in FIG. 9 includes various calculation means (refer to FIG. 9) for calculating the center of gravity of the vehicle 5 to be measured. Specifically, the central processing unit 3 of this embodiment is so configured as to be able to calculate the position where the center of gravity of the vehicle 5 to be measured is located in three-dimensional directions, that is, the longitudinal direction, lateral direction and vertical direction.

The relevant central processing unit 3 (refer to FIG. 9) is provided with calculation means for calculating a longitudinal center-of-gravity position including the longitudinal displacement calculation means 20, front axle load calculation means 23A, rear axle load calculation means 23B and longitudinal center-of-gravity position calculation means 24, calculation means for calculating the height of the center of gravity including the longitudinal center-of-gravity position calculation means 24, longitudinal center-of-gravity displacement calculation means 25, the inter-axle distance calculation means 21, vehicle inclination angle calculation means 22 and vehicle center-of-gravity height calculation means 26, as well as calculation means for calculating a lateral center-of-gravity position including the lateral displacement calculation means 27, left-wheel group wheel load calculation means 28A, right-wheel group wheel load calculation means 28B and lateral center-of-gravity position calculation means 29. The aforementioned individual calculation means are described in detail hereunder.

<Inter-axle Distance Calculation Means 21>

First, the inter-axle distance calculation means 21 is described. The inter-axle distance calculation means 21 serves to calculate distance L between the front and rear axles 52A, 52B of the vehicle 5 to be measured based on the distance data E1-E4 and the angle data e1-e4 detected by the wheel position detector 8 as depicted in FIG. 4 under conditions where the vehicle 5 to be measured is placed on the measuring table 10. While the inter-axle distance L is the sum of longitudinal distance L1 from the wheel position detector 8 to the front axle 52A and longitudinal distance L2 from the wheel position detector 8 to the rear axle 52B as depicted in FIG. 4, these two distances L1, L2 are calculated by the inter-axle distance calculation means 21 in the below-described manner based on detection data fed from the wheel position detector 8.

At a point in time when the wheel position detector 8 swung from the front side detects the foremost part 51Aa of the left-front wheel 51A as depicted in FIG. 4 under conditions where the vehicle 5 to be measured is placed on the measuring table 10, the wheel position detector 8 outputs the distance data E1 concerning the distance from the wheel position detector 8 to the left-front wheel's foremost part 51Aa and the angle data e1 concerning the angle of the left-front wheel's foremost part 51Aa with respect to the front-to-rear extension line R of the wheel position detector 8 to the inter-axle distance calculation means 21. The inter-axle distance calculation means 21 calculates distance L1$a$ along the front/rear direction from the wheel position detector 8 to the left-front wheel's foremost part 51Aa (L1$a$=E1×cos e1). Subsequently, at a point in time when the wheel position detector 8 detects the rearmost part 51Ab of the left-front wheel 51A, the wheel position detector 8 similarly outputs the distance data E2 concerning the distance from the wheel position detector 8 to the left-front wheel's rearmost part 51Ab and the angle data e2 to the inter-axle distance calculation means 21. The inter-axle distance calculation means 21 calculates distance L1$b$ along the front/rear direction from the wheel position detector 8 to the left-front wheel's rearmost part 51Ab (L1$b$=E2×cos e2). The inter-axle distance calculation means 21 then calculates the longitudinal distance L1 from the wheel position detector 8 to the front axle 52A (position A1) by calculating the value of (L1$a$+L1$b$)/2.

On the other hand, at a point in time when the wheel position detector 8 further swung rearward detects the foremost part 51Ca of the left-rear wheel 51C, the wheel position detector 8 outputs the distance data E3 concerning the distance from the wheel position detector 8 to the left-rear wheel's foremost part 51Ca and the angle data e3 to the inter-axle distance calculation means 21. The inter-axle distance calculation means 21 calculates distance L2$a$ along the front/rear direction from the wheel position detector 8 to the left-rear wheel's foremost part 51Ca (L2$a$=E3×cos e3). Subsequently, at a point in time when the wheel position detector 8 detects the rearmost part 51Cb of the left-rear wheel 51C, the wheel position detector 8 similarly outputs the distance data E4 concerning the distance from the wheel position detector 8 to the left-rear wheel's rearmost part 51Cb and the angle data e4 to the inter-axle distance calculation means 21. The inter-axle distance calculation means 21 calculates distance L2$b$ along the front/rear direction from the wheel position detector 8 to the left-rear wheel's rearmost part 51Cb (L2$b$=E4×cos e4). The inter-axle distance calculation means 21 then calculates the longitudinal distance L2 from the wheel position detector 8 to the rear axle 52B by calculating the value of (L2$a$+L2$b$)/2.

The inter-axle distance calculation means 21 is configured to finally calculate the inter-axle distance L by performing the aforementioned mathematical operation (L1+L2).

Meanwhile, values of the aforementioned cosines are read out from the data table concerning the trigonometric function stored in the storage means (ROM) 31.

<Longitudinal Displacement Calculation Means 20>

Figure 6:
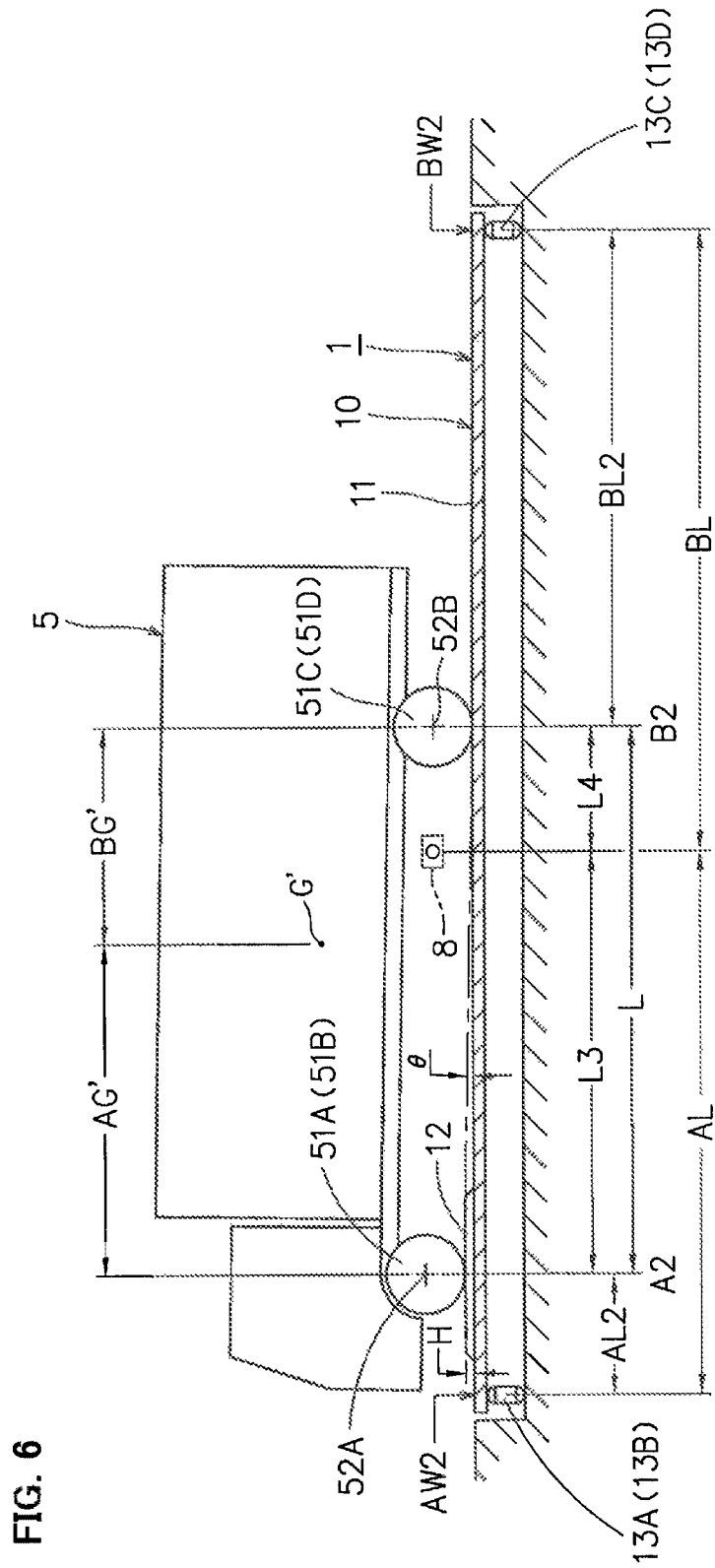
FIG. 6 is a view taken in the direction of arrows VI-VI of FIG. 1.

The longitudinal displacement calculation means 20 serves to calculate how much the vehicle 5 to be measured is displaced along the front/rear direction from longitudinal reference positions (e.g., the positions of the front and rear load cells 13A, 13C) under conditions where the vehicle 5 to be measured is placed on the measuring table 10 (i.e., the state depicted in FIGS. 1 and 2 or the state depicted in FIGS. 5 and 6).

Incidentally, the distance AL from the wheel position detector 8 to the front-side load cell 13A measured along the front/rear direction and the distance BL from the wheel position detector 8 to the rear-side load cell 13C measured along the front/rear direction are stored in the storage means (ROM) 31 beforehand.

A method of calculating the amount of longitudinal displacement performed by the longitudinal displacement calculation means 20 is as follows. First, when the vehicle 5 to be measured is located at a position indicated in FIG. 2 (i.e., a position at which the wheels 51A-51D are all located on the flat surface 11 of the measuring table 10), the longitudinal displacement calculation means 20 calculates the longitudinal distance L1 from the wheel position detector 8 to the front wheel position A1 using the aforementioned method of calculating the inter-axle distance L and subtracts the distance L1 from the distance AL along the front/rear direction from the wheel position detector 8 to the front load cell 13A that is stored in the storage means (ROM) 31 to determine distance AL1 from the front wheel position A1 to the front load cell 13A. On the other hand, the longitudinal displacement calculation means 20 similarly calculates the longitudinal distance L2 from the wheel position detector 8 to the rear wheel position B1 and subtracts the distance L2 from the distance BL along the front/rear direction from the wheel position detector 8 to the rear load cell 13C that is stored in the storage means (ROM) 31 to determine distance BL1 from the rear wheel position B1 to the rear load cell 13C. Then, the longitudinal displacement calculation means 20 can calculate the amount of the longitudinal displacement of the vehicle 5 to be measured on the measuring table 10 by comparing the aforementioned distances AL1 and BL1 (AL1:BL1).

Also, when the vehicle 5 to be measured is located at a position indicated in FIG. 6, the longitudinal displacement calculation means 20 calculates longitudinal distance L3 from the wheel position detector 8 to the front wheel position A2 using the aforementioned method of calculating the inter-axle distance L and subtracts the distance L3 from the distance AL along the front/rear direction from the wheel position detector 8 to the front load cell 13A that is stored in the storage means (ROM) 31 to determine longitudinal distance AL2 from the front wheel position A1 to the front load cell 13A in a manner similar to the above. On the other hand, the longitudinal displacement calculation means 20 calculates longitudinal distance L4 from the wheel position detector 8 to the rear wheel position B2 and subtracts the distance L4 from the distance BL along the front/rear direction from the wheel position detector 8 to the rear-side load cell 13C that is stored in the storage means (ROM) 31 to determine distance BL2 from the rear wheel position B2 to the rear-side load cell 13C. Then, the longitudinal displacement calculation means 20 can calculate the amount of the longitudinal displacement of the vehicle 5 to be measured on the measuring table 10 by comparing the aforementioned distances AL2 and BL2 (AL2:BL2).

<Front Axle Load Calculation Means 23A and Rear Axle Load Calculation Means 23B>

The front axle load calculation means 23A and the rear axle load calculation means 23B serve to calculate a front axle load (AW1 or AW2) and a rear axle load (BW1 or BW2) on the basis of measurement values Wa-Wd fed from the individual load cells 13A-13D, respectively, under conditions where vehicle 5 to be measured is placed on the measuring table 10.

While the weight detected by the left-front load cell 13A is designated by Wa, the weight detected by the right-front load cell 13B is designated by Wb, the weight detected by the left-rear load cell 13C is designated by Wc, and the weight detected by the right-rear load cell 13D is designated by Wd in the following description, the weights Wa-Wd detected by the respective load cells 13A-13D vary with the position where the vehicle 5 to be measured rides on the measuring table 10. Also, referring to FIG. 2 (in which all the wheels 51A-51D ride on the flat surface 11), the symbol AW1 represents the sum of the weights Wa, Wb (FIG. 1) detected by the left and right front load cells 13A, 13B, respectively, indicating the front axle load, while the symbol BW1 represents the sum of the weights Wc, Wd detected by the left and right rear load cells 13C, 13D, respectively, indicating the rear axle load. Referring also to FIG. 6 (in which the front wheels 51A, 51B ride on the front wheel platform 12), the symbol AW2 represents the sum of the weights Wa, Wb (FIG. 6) detected by the left and right front load cells 13A, 13B, respectively, indicating the front axle load, while the symbol BW2 represents the sum of the weights Wc, Wd detected by the left and right rear load cells 13C, 13D, respectively, indicating the rear axle load.

The front axle load calculation means 23A calculates the front axle load of the vehicle 5 to be measured at the current position thereof (i.e., the weight AW1 in the state depicted in FIG. 2, the weight AW2 in the state depicted in FIG. 6) by adding the weight Wa detected by the left-front load cell 13A and the weight Wb detected by the right-front load cell 13B. On the other hand, the rear axle load calculation means 23B calculates the rear axle load of the vehicle 5 to be measured at the current position thereof (i.e., the weight BW1 in the state depicted in FIG. 2, the weight BW2 in the state depicted in FIG. 6) by adding the weight Wc detected by the left-rear load cell 13C and the weight Wd detected by the right-rear load cell 13D.

<Longitudinal Center-of-Gravity Position Calculation Means 24>

The longitudinal center-of-gravity position calculation means 24 serves to determine longitudinal center-of-gravity position G (or G') of the vehicle 5 to be measured that is placed on the measuring table 10 from the front axle load (AW1 of FIG. 2 or AW2 of FIG. 6) and the rear axle load (BW1 of FIG. 2 or BW2 of FIG. 6) calculated by the aforementioned front axle load calculation means 23A and rear axle load calculation means 23B, respectively, and the amount of the longitudinal displacement (AL1:BL1 as depicted in FIG. 2 or AL2:BL2 as depicted in FIG. 6) of the vehicle 5 to be measured calculated by the aforementioned longitudinal displacement calculation means 20.

The longitudinal center-of-gravity position calculation means 24 is configured to perform the below-described calculations in the state depicted in FIG. 2 and in the state depicted in FIG. 6, respectively.

First, in the state depicted in FIG. 2, the longitudinal center-of-gravity position calculation means 24 can calculate the position where the center of gravity G of the vehicle 5 to be measured is located as measured from the front load cell 13A on the measuring table 10 along the front/rear direction thereof by calculating the value of AW1/(AW1+BW1), and further calculate longitudinal distance AG from the front axle 52A of the vehicle 5 to be measured to the center-of-gravity position G by subtracting the distance AL1 from the front load cell 13A to the front axle 52A determined earlier by the longitudinal displacement calculation means 20 from distance (AL1+AG) from the front load cell 13A to the center of gravity G on the measuring table 10.

Similarly, referring again to FIG. 2, the longitudinal center-of-gravity position calculation means 24 can calculate longitudinal distance BG from the rear axle 52B of the vehicle 5 to be measured to the center-of-gravity position G by calculating the value of BW1/(AW1+BW1) (thereby calculating a longitudinal distance of (BL1+BG) from the rear load cell 13C to the center of gravity G) and subtracting the longitudinal distance BL1 from the rear load cell 13C to the rear axle 52B determined earlier by the longitudinal displacement calculation means 20 from the distance calculated by the aforementioned mathematical operation.

Then, in the state depicted in FIG. 2, the longitudinal center-of-gravity position calculation means 24 can calculate the position (AG:BG) where the center of gravity G of the vehicle 5 to be measured is located between the front and rear axles 52A, 52B along the front/rear direction by calculating the values of AG/(AG+BG) and BG/(AG+BG) using the aforementioned distances AG and BG.

Longitudinal center-of-gravity position information (AG: BG) concerning the vehicle 5 to be measured calculated by the longitudinal center-of-gravity position calculation means 24 in the state depicted in FIG. 2 is stored in the storage means (RAM) 32 and is used as information for later-described calculation of the height of the center of gravity. Meanwhile, the longitudinal center-of-gravity position may be represented by a calculated value of AG/(AG+BG) or BG/(AG+BG).

On the other hand, in the state depicted in FIG. 6, the longitudinal center-of-gravity position calculation means 24 can calculate the position where the center of gravity G' of the vehicle 5 to be measured is located as measured from the front load cell 13A on the measuring table 10 along the front/rear direction thereof by calculating the value of AW2/(AW2+BW2), and further calculate longitudinal distance AG' from the front axle 52A of the vehicle 5 to be measured to the center-of-gravity position G' by subtracting the distance AL2 from the front load cell 13A to the front axle 52A determined earlier by the longitudinal displacement calculation means 20 from distance (AL2+AG') from the front load cell 13A to the center of gravity G' on the measuring table 10.

Similarly, referring again to FIG. 6, the longitudinal center-of-gravity position calculation means 24 can calculate longitudinal distance BG' from the rear axle 52B of the vehicle 5 to be measured to the center-of-gravity position G' by calculating the value of BW2/(AW2+BW2) (thereby calculating a longitudinal distance of (BL2+BG') from the rear load cell 13C to the center of gravity G') and subtracting the longitudinal distance BL2 from the rear load cell 13C to the rear axle 52B determined earlier by the longitudinal displacement calculation means 20 from the distance calculated by the aforementioned mathematical operation.

Then, in the state depicted in FIG. 6, the longitudinal center-of-gravity position calculation means 24 can calculate the position (AG':BG') where the center of gravity G' of the vehicle 5 to be measured is located between the front and rear axles 52A, 52B along the front/rear direction by calculating the values of AG'/(AG'+BG') and BG'/(AG'+BG') using the aforementioned distances AG' and BG'. Meanwhile, the longitudinal center-of-gravity position may be represented by a calculated value of AG'/(AG'+BG') or BG'/(AG'+BG').

Incidentally, the vehicle 5 to be measured is inclined downward toward the rear under conditions where the front wheels 51A, 51B ride on the front wheel platform 12 (i.e., the state depicted in FIG. 6) although the angle of inclination is small. Therefore, the inter-axle distance (AG'+BG') measured horizontally along the front/rear direction in the state depicted in FIG. 6 is shorter, although extremely slightly, than the inter-axle distance L (AG+BG) measured in the state depicted in FIG. 2.

<Vehicle Inclination Angle Calculation Means 22>

The vehicle inclination angle calculation means 22 serves to calculate vehicle inclination angle θ (FIGS. 6 and 7) under conditions where the front wheels 51A, 51B of the vehicle 5 to be measured ride on the front wheel platform 12 of the measuring table 10 as depicted in FIGS. 5 and 6.

Actually, the vehicle inclination angle calculation means 22 calculates how much a straight line that interconnects a bottommost part of the front wheel 51A placed on the front wheel platform 12 and a bottommost part of the rear wheel 51C placed on the flat surface 11 is inclined along the front/rear direction with respect to the flat surface 11 forming a horizontal plane. The vehicle inclination angle calculation means 22 is needed for calculating the height of the center of gravity of the vehicle as will be described later.

Using the inter-axle distance L calculated earlier by the inter-axle distance calculation means 21 and the height H of the front wheel platform 12 that is stored in the storage means (ROM) 31 beforehand, the vehicle inclination angle calculation means 22 obtains the value of sine (θ) corresponding to H/L from the data table concerning the trigonometric function stored in the storage means (ROM) 31. Meanwhile, the vehicle inclination angle θ calculated by the vehicle inclination angle calculation means 22 is needed for determining the height of the center of gravity of the vehicle 5 to be measured and is used by the later-described vehicle center-of-gravity height calculation means 26.

<Longitudinal Center-of-Gravity Displacement Calculation Means 25>

Figure 7:
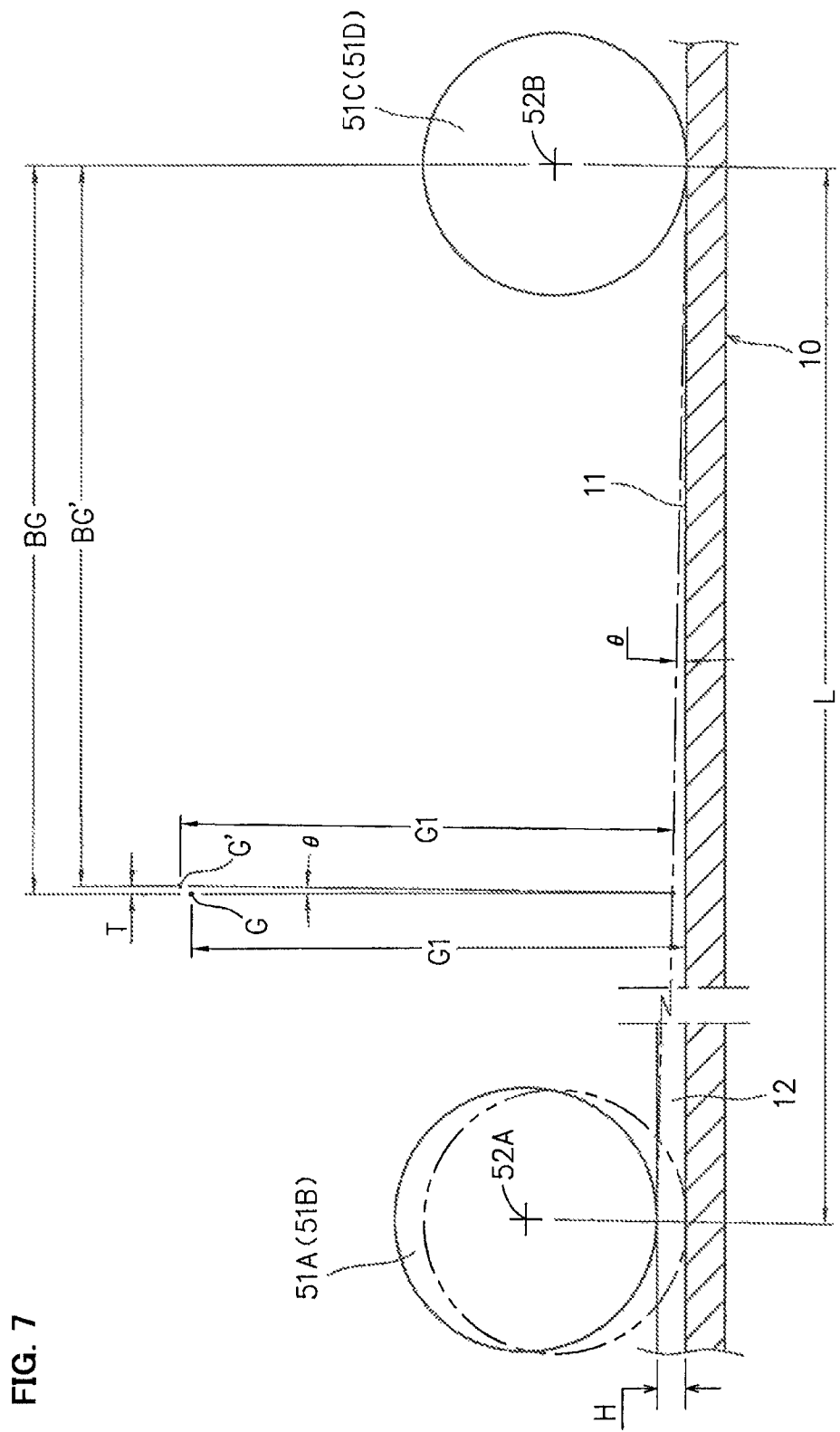
FIG. 7 is an enlarged fragmentary view of FIG. 1.

The longitudinal center-of-gravity displacement calculation means 25 serves to calculate the amount of displacement T (BG−BG') of the center of gravity along the front/rear direction as depicted in FIG. 7 by comparing longitudinal center-of-gravity position information (e.g., the longitudinal distance BG) in the state depicted in FIG. 2 stored in the storage means (RAM) 32 and longitudinal center-of-gravity position information (e.g., the longitudinal distance BG') calculated in the state depicted in FIG. 6.

Meanwhile, the longitudinal center-of-gravity position G' in the state depicted in FIG. 6 is displaced rearward from the longitudinal center-of-gravity position G (FIG. 2) when all the wheels 51A-51D ride on the flat surface 11 by an amount corresponding to the vehicle inclination angle θ because the front wheels 51A, 51B ride on the front wheel platform 12 (the vehicle 5 to be measured is inclined downward towards the rear) in the state of FIG. 6. The amount of displacement of the center of gravity along the front/rear direction indicated by the symbol T in FIG. 7 occurs at this time.

<Vehicle Center-of-Gravity Height Calculation Means 26>

The vehicle center-of-gravity height calculation means 26 serves to calculate the height G1 of the center of gravity of the vehicle 5 to be measured (FIG. 7) on the basis of the amount of displacement T ((BG−BG') indicated in FIG. 7) along the front/rear direction calculated by the longitudinal center-of-gravity displacement calculation means 25 and the vehicle inclination angle θ calculated by the vehicle inclination angle calculation means 22.

A specific method of calculating the height G1 of the center of gravity (FIG. 7) performed by the vehicle center-of-gravity height calculation means 26 is as follows.

Specifically, while the amount of displacement T ((BG−BG') indicated in FIG. 7) along the front/rear direction calculated by the longitudinal center-of-gravity displacement calculation means 25 and the vehicle inclination angle θ calculated by the vehicle inclination angle calculation means 22 are input into the vehicle center-of-gravity height calculation means 26, it is possible to calculate the height G1 of the center of gravity to be obtained by the formula T/tan θ, where the value of tan θ is read out from the data table concerning the trigonometric function stored in the storage means (ROM) 31.

<Lateral Displacement Calculation Means 27>

The lateral displacement calculation means 27 is intended to calculate how much the vehicle 5 to be measured that is placed on the measuring table 10 is displaced leftward or rightward with respect to the measuring table 10. The storage means (ROM) 31 stores, as basic data needed for this calculation performed by the lateral displacement calculation means 27, information concerning the distance M measured from the wheel position detector 8 in the horizontal direction perpendicular to the central extension line P passing between the two load cells 13A, 13B (or 13C, 13D) located left and right as well as information concerning the distance ½D measured from the left and right wheels perpendicularly to the center line Q of the vehicle 5 to be measured based on the distance D between the left and right wheels 51A, 51B (or 51C, 51D) of the vehicle 5 to be measured.

The lateral displacement calculation means 27 serves to calculate the amount of lateral displacement S indicating how much the center line Q of the vehicle 5 to be measured that is placed on the measuring table 10 is displaced leftward or rightward with respect to the central extension line P passing between the left and right load cells. The lateral displacement calculation means 27 performs this calculation using the below-described procedure.

Using the distance data E1 concerning the distance from the wheel position detector 8 to a position of detection of a wheel (the left-front wheel's foremost part 51Aa is used for the sake of explanation herein) and the angle data e1 concerning the angle of the left-front wheel's foremost part 51Aa with respect to the front-to-rear extension line R of the wheel position detector 8 obtained when the wheel position detector 8 detects the left-side wheel 51A (or 51C) as depicted in FIG. 4, the lateral displacement calculation means 27 first calculates distance N1 measured from the left-front wheel's foremost part 51Aa perpendicularly to the front-to-rear extension line R of the wheel position detector 8. The lateral displacement calculation means 27 can calculate this perpendicularly measured distance N1 by N1=E1×sin e1. Meanwhile, the value of sin e1 is read out from the data table concerning the trigonometric function stored in the storage means (ROM) 31.

The lateral displacement calculation means 27 is configured to calculate distance N between the front-to-rear extension line R of the wheel position detector 8 and the center line Q of the vehicle 5 to be measured that is placed on the measuring table 10 by adding N1 and ½D mentioned above (N1+½D), and further calculate how much the vehicle 5 to be measured (center line Q) placed on the measuring table 10 is displaced leftward or rightward (amount of lateral displacement S) with respect to the central extension line P passing between the left and right load cells by calculating the value of (M−N) on the basis of the distance N and the distance M between the central extension line P passing between the left and right load cells and the front-to-rear extension line R of the wheel position detector 8 that is stored in the storage means (ROM) 31. Meanwhile, if N mentioned above is larger than M mentioned above (M<N), it means that the center line Q of the vehicle 5 to be measured is located farther away from the central extension line P passing between the left and right load cells with respect to the front-to-rear extension line R of the wheel position detector 8, and the aforementioned amount of lateral displacement S takes a negative (−) value.

<Left-Wheel Group Wheel Load Calculation Means 28a>

The left-wheel group wheel load calculation means 28A serves to calculate the total load of a left-wheel group (51A and 51C) of the vehicle 5 to be measured by adding the Individual measurement values Wa, Wc fed from the left-front load cell 13A and the left-rear load cell 13C (Wa+Wc), respectively, when the vehicle 5 to be measured is placed on the measuring table 10. Meanwhile, the sum of the individual measurement values Wa, Wc (FIG. 1) fed from the left-front load cell 13A and the left-rear load cell 13C is designated by LW in FIG. 3.

<Right-Wheel Group Wheel Load Calculation Means 285>

The right-wheel group wheel load calculation means 285 serves to calculate the total load of a right-wheel group (51B and 51D) of the vehicle 5 to be measured by adding the individual measurement values Wb, Wd fed from the right-front load cell 135 and the right-rear load cell 13D (Wb+Wd), respectively, when the vehicle 5 to be measured is placed on the measuring table 10. Meanwhile, the sum of the individual measurement values Wa, We (FIG. 1) fed from the right-front load cell 13B and the right-rear load cell 13D is designated by RW in FIG. 3.

<Lateral Center-of-Gravity Position Calculation Means 29>

The lateral center-of-gravity position calculation means 29 serves to calculate the position where the center of gravity G of the vehicle is located along the left/right direction thereof from the individual total loads of the left and right wheels (Wa+Wc=LW and Wb+Wd=RW) calculated by the aforementioned left-wheel group wheel load calculation means 28A and right-wheel group wheel load calculation means 28B and the amount of lateral displacement S calculated by the lateral displacement calculation means 27.

Specifically, the lateral center-of-gravity position calculation means 29 is configured to calculate lateral displacement distance G2 from the center line Q of the vehicle 5 to be measured to the center of gravity G thereof in a state depicted in FIG. 3 by calculating lateral distance LL from the center of gravity G to the left load cell 13C and lateral distance RL from the center of gravity G to the right load cell 13D using the ratio of the individual total loads of the left and right wheels (LW: RW) and further calculating the amount of lateral displacement S1 from the central extension line P of the measuring table 10 to the center of gravity G by (LL−RL)/2 as well as the value of (S+S1).

Although the lateral position of the center of gravity of the vehicle 5 to be measured that is presented on the display 33 may be expressed in terms of the aforementioned lateral displacement distance G2 from the center line Q of the vehicle, the lateral position of the center of gravity may be expressed upon converting the same into left and right distances LG, RG measured respectively from the left and right wheels 51C, 51D to the center of gravity G on the basis of the lateral displacement distance G2 instead.

The apparatus for determining the center of gravity of the vehicle of the first embodiment (FIG. 9) functions in the below-described manner. In the truck scale 1 of this embodiment, the vehicle 5 to be measured is expected to move onto the measuring table 10 from the rear side as depicted in FIG. 1.

Then, under conditions where all the wheels 51A-51D of the vehicle 5 to be measured ride on the flat surface 11 of the measuring table 10 as depicted in FIGS. 1 and 2, the central processing unit 3 measures the total weight of the vehicle 5 to be measured on the basis of the individual measurement values Wa-Wd fed from the load cells 13A-13D, respectively, while the apparatus for determining the vehicle's center of gravity depicted in FIG. 9 first calculates the longitudinal center-of-gravity position and lateral center-of-gravity position of the vehicle 5 to be measured on the other hand.

Specifically, the longitudinal center-of-gravity position of the vehicle 5 to be measured is calculated by the longitudinal center-of-gravity position calculation means 24 in the above-described manner from the amount of the longitudinal displacement calculated by the longitudinal displacement calculation means 20 based on wheel position information fed from the wheel position detector 8 and the front axle load AW1 and the rear axle load BW1 calculated by the front axle load calculation means 23A and the rear axle load calculation means 23B, respectively. Meanwhile, longitudinal center-of-gravity position information (AG:BG) or AG/(AG+BG) calculated by the longitudinal center-of-gravity position calculation means 24 is stored in the storage means (RAM) 32 as data to be used for calculating the height of the center of gravity and to be output to the display 33.

Also, the lateral center-of-gravity position of the vehicle 5 to be measured is calculated by the lateral center-of-gravity position calculation means 29 in the above-described manner from the amount of lateral displacement calculated by the lateral displacement calculation means 27 based on the wheel position information fed from the wheel position detector 8 and the left-wheel group wheel load LW and the right-wheel group wheel load RW calculated by the left-wheel group wheel load calculation means 28A and the right-wheel group wheel load calculation means 28B, respectively. Meanwhile, lateral center-of-gravity position information (LG:RG) calculated by the lateral center-of-gravity position calculation means 29 is also stored in the storage means (RAM) 32 as data to be output to the display 33.

To measure the height G1 of the center of gravity (FIG. 7) of the vehicle 5 to be measured, the vehicle 5 to be measured is advanced from the flat surface 11 in the state depicted in FIGS. 1 and 2 and stopped in the state depicted in FIGS. 5 and 6 where the front wheels 51A, 51B are placed on the front wheel platform 12.

The apparatus is configured such that the longitudinal center-of-gravity position calculation means 24 newly calculates the longitudinal center-of-gravity position of the vehicle 5 to be measured of which front wheels ride on the front wheel platform 12, the longitudinal center-of-gravity displacement calculation means 25 calculates the amount of displacement T along the front/rear direction by comparing newly obtained longitudinal center-of-gravity position information (AG': BG') and the longitudinal center-of-gravity position information (AG:BG) previously stored in the storage means 32, and then the vehicle center-of-gravity height calculation means 26 can calculate the height G1 of the center of gravity (FIG. 7) of the vehicle on the basis of the amount of displacement T along the front/rear direction and the vehicle inclination angle θ under conditions where the front wheels ride on the front wheel platform 12.

Although the apparatus for determining the center of gravity of the vehicle of the first embodiment requires the front wheel platform 12 which is located in the frontal part of the measuring table (flat surface 11) and raised by a specific amount to calculate the height of the center of gravity of the vehicle 5 to be measured, the front wheel platform 12 has an extremely simple structure. Also, the wheel position detector 8 can detect the positions of the front and rear wheels relatively easily. Additionally, other constituent elements can simply be incorporated in the central processing unit 3 as the aforementioned various kinds of calculation means, so that the apparatus can measure the height of the center of gravity (G1 indicated in FIG. 7) of the vehicle to be measured with a simple structure as a whole.

Further, the apparatus for determining the center of gravity of this first embodiment (FIG. 9) has the central processing unit 3 in which the inter-axle distance calculation means 21 for calculating the distance between the front and rear axles is provided and, therefore, it is possible to automatically calculate the inter-axle distance L needed for calculating the height of the center of gravity of the vehicle 5 to be measured by the inter-axle distance calculation means 21.

<Second Embodiment of FIG. 10>

The apparatus for determining the center of gravity of the vehicle of the second embodiment depicted in FIG. 10 is preferable in a case where distance L between the front axle and rear axle of the vehicle 5 to be measured is known in advance.

The apparatus for determining the center of gravity of the vehicle of this second embodiment (FIG. 10) stores the already known inter-axle distance L of the vehicle 5 to be measured (e.g., the distance L of FIG. 2) in inter-axle distance storage means 211 instead of the inter-axle distance calculation means 21 of the apparatus for determining the center of gravity of the vehicle of the first embodiment (FIG. 9). Then, The apparatus for determining the center of gravity of the vehicle of this second embodiment uses the inter-axle distance L stored in the inter-axle distance storage means 211 for calculating the vehicle inclination angle in the vehicle inclination angle calculation means 22. Meanwhile, the apparatus for determining the center of gravity of the vehicle of this second embodiment (FIG. 10) has otherwise generally the same configuration as the above-described first embodiment (FIG. 9).

If the vehicle 5 to be measured is a registered vehicle, the apparatus for determining the center of gravity of the vehicle of the present second embodiment stores the front- to rear-axle distance L together with other data, whereas if the vehicle 5 to be measured is an unregistered vehicle, the inter-axle distance L (an actual measurement value indicated on a vehicle inspection certificate, for example) of the vehicle is input from the input device (the keyboard of FIG. 8) 34 and stored in the inter-axle distance storage means 211 immediately before measurement each time.

Although the apparatus for determining the center of gravity of the vehicle of this second embodiment uses a different method for obtaining information concerning the inter-axle distance L of the vehicle 5 to be measured from the foregoing first embodiment, the apparatus is configured such that the central processing unit 3 can give the center of gravity of the vehicle 5 to be measured expressed three-dimensionally in the longitudinal, lateral and vertical directions by performing otherwise the same calculation method as the above-described first embodiment.

Also, the apparatus for determining the center of gravity of the vehicle of this second embodiment (FIG. 10) can provide precise inter-axle distance data because already known precise inter-axle distance L (actual measurement value) is input and stored in the inter-axle distance storage means 211.

Therefore, the inter-axle distance L based on which the vehicle inclination angle calculation means 22 calculates vehicle inclination angle θ is accurate in the apparatus for determining the center of gravity of the vehicle of this second embodiment. Accordingly, the apparatus can calculate vehicle inclination angle θ with high reliability and, thus, the height G1 of the center of gravity of the vehicle (FIGS. 3 and 7) eventually calculated by the vehicle center-of-gravity height calculation means 26 on the basis of the vehicle inclination angle θ is highly reliable.

<Third Embodiment of FIG. 11>

The apparatus for determining the center of gravity of the vehicle of the third embodiment depicted in FIG. 11 is preferable in a case where an axle-load scale (e.g., a mat scale) provided separately from the truck scale 1 is used to individually measure front and rear axle loads (the front axle load and the rear axle load) of the vehicle 5 to be measured.

In the apparatus for determining the center of gravity of the vehicle of this third embodiment (FIG. 11), the front axle load and the rear axle load of the vehicle 5 to be measured are measured by the separately provided axle-load scale instead of the front axle load calculation means 23A and the rear axle load calculation means 23B of the aforementioned first embodiment (FIG. 9) and stored respectively in front axle load storage means 231A and rear axle load storage means 231B by entering the front axle load and the rear axle load measured by the axle-load scale through the input device (the keyboard of FIG. 8) 34 prior to weighing by the truck scale 1. Since the front axle load and the rear axle load are measured by the separately provided axle-load scale in this case, it is not necessary to calculate the front and rear axle loads by the central processing unit 3. Meanwhile, the apparatus for determining the center of gravity of the vehicle of this third embodiment (FIG. 11) has otherwise generally the same configuration as the above-described first embodiment (FIG. 9).

The apparatus for determining the center of gravity of the vehicle of this third embodiment is configured such that, when the vehicle 5 to be measured is weighed on the measuring table 10, the longitudinal center-of-gravity position calculation means 24 calculates the longitudinal center-of-gravity position of the vehicle 5 to be measured from the front axle load and the rear axle load of the vehicle 5 to be measured stored in the front axle load storage means 231A and the rear axle load storage means 231B, respectively, and the amount of the longitudinal displacement calculated by the longitudinal displacement calculation means 20 based on the wheel position information fed from the wheel position detector 8.

Although the apparatus for determining the center of gravity of the vehicle of this third embodiment uses a different method for obtaining information concerning the front and rear axle loads of the vehicle 5 to be measured from the foregoing first embodiment, the apparatus is configured such that the central processing unit 3 can give the center of gravity of the vehicle 5 to be measured expressed three-dimensionally in the longitudinal, lateral and vertical directions by performing otherwise the same calculation method as the above-described first embodiment.

Additionally, because the front axle load and the rear axle load of the vehicle 5 to be measured are measured by the separately provided axle-load scale and the front and rear axle loads are stored respectively in the front axle load storage means 231A and the rear axle load storage means 231B in the apparatus for determining the center of gravity of the vehicle of this third embodiment, it is not necessary to calculate the front and rear axle loads by the central processing unit 3 during actual measurement thereof on the measuring table 10. Accordingly, it is possible to simplify the configuration of the central processing unit 3 by a corresponding amount.

<Fourth Embodiment of FIG. 12>

The apparatus for determining the center of gravity of the vehicle of the fourth embodiment depicted in FIG. 12 is configured by substituting the inter-axle distance storage means 211 of the aforementioned second embodiment (FIG. 10) for the inter-axle distance calculation means 21 of the aforementioned first embodiment (FIG. 9) and substituting the front axle load storage means 231A and the rear axle load storage means 231B of the aforementioned third embodiment (FIG. 11) for the front axle load calculation means 23A and the rear axle load calculation means 23B of the aforementioned first embodiment (FIG. 9), respectively.

Specifically, the apparatus for determining the center of gravity of the vehicle of this fourth embodiment employs the inter-axle distance storage means 211 instead of the inter-axle distance calculation means 21 provided in the central processing unit 3 of the first embodiment (FIG. 9) to store the already known inter-axle distance (actual measurement value) of the vehicle 5 to be measured. On the other hand, the apparatus employs the front axle load storage means 231A and the rear axle load storage means 231B instead of the front axle load calculation means 23A and the rear axle load calculation means 23B in the central processing unit 3 of the aforementioned first embodiment (FIG. 9) to store the front axle load and the rear axle load measured by the separately provided axle-load scale, respectively.

Specifically, the apparatus for determining the center of gravity of the vehicle of this fourth embodiment is configured such that, during measurement of the vehicle 5 to be measured, the vehicle inclination angle calculation means 22 calculates the vehicle inclination angle θ when the front wheels 51A, 51B ride on the front wheel platform 12 of the measuring table 10 as depicted in FIGS. 5 and 6 on the basis of inter-axle distance information stored in the inter-axle distance storage means 211 on one hand, and the longitudinal center-of-gravity position calculation means 24 calculates the longitudinal center-of-gravity position of the vehicle 5 to be measured from the front axle load and the rear axle load stored in the front axle load storage means 231A and the rear axle load storage means 231B and the amount of the longitudinal displacement calculated by the longitudinal displacement calculation means 20 on the other hand. Meanwhile, the apparatus of this fourth embodiment has otherwise generally the same configuration as the above-described first embodiment (FIG. 9).

Although the apparatus for determining the center of gravity of the vehicle of this fourth embodiment uses different methods for obtaining information concerning the inter-axle distance and information concerning the front axle load and the rear axle load of the vehicle 5 to be measured from the foregoing first embodiment (FIG. 9), the apparatus is configured such that the central processing unit 3 can give the center of gravity of the vehicle 5 to be measured expressed three-dimensionally in the longitudinal, lateral and vertical directions by performing otherwise the same calculation method as the above-described first embodiment.

In the apparatus for determining the center of gravity of the vehicle of this fourth embodiment, it is not necessary to calculate inter-axle distance and the front and rear axle loads by the central processing unit 3 during actual measurement thereof on the measuring table 10. Accordingly, it is possible to further simplify the configuration of the central processing unit 3 by a corresponding amount.

<Fifth Embodiment of FIG. 13>

The apparatus for determining the center of gravity of the vehicle of the fifth embodiment depicted in FIG. 13 is applicable when determining the center of gravity of vehicles 5 to be measured which are of a type having the same front- to rear-axle distance L.

In the apparatus for determining the center of gravity of the vehicle of this fifth embodiment (FIG. 13), the vehicle inclination angle θ calculated by the vehicle inclination angle calculation means 22 of the apparatus for determining the center of gravity of the vehicle of any of the aforementioned first to fourth embodiments (FIGS. 9 to 12) is obtained from the inter-axle distance L (actual measurement value) of the vehicle 5 to be measured and the raised height H (actual measurement value) of the front wheel platform 12 of the measuring table 10 each of which is invariable data, and stored in vehicle inclination angle storage means 221 (FIG. 13) in advance, and the vehicle inclination angle θ stored in the vehicle inclination angle storage means 221 is used by the vehicle center-of-gravity height calculation means 26 for calculating the height of the center of gravity of the vehicle. Meanwhile, the apparatus of this fifth embodiment has otherwise generally the same configuration as the above-described first embodiment (FIG. 9) and second embodiment (FIG. 10).

The apparatus for determining the center of gravity of the vehicle of this fifth embodiment (FIG. 13) is intended to be used for individually measuring the height G1 of the center of gravity (FIGS. 3 and 7) of the vehicles 5 to be measured having the same front- to rear-axle distance L. Since the individual vehicles 5 to be measured have the same front- to rear-axle distance L in this case, the vehicle inclination angle θ under conditions where the front wheels 51A, 51B ride on the front wheel platform 12 is obtained from the inter-axle distance L and the raised height H of the front wheel platform 12 (actual measurement values) each of which is invariable data and stored in the vehicle inclination angle storage means 221.

Although the apparatus for determining the center of gravity of the vehicle of this fifth embodiment (FIG. 13) uses a different method for obtaining information concerning the aforementioned vehicle inclination angle θ from the above-described first to fourth embodiments (FIGS. 9 to 12), the apparatus is configured such that the central processing unit 3 can give the center of gravity of the vehicle 5 to be measured expressed three-dimensionally in the longitudinal, lateral and vertical directions by performing otherwise the same calculation method as the aforementioned first to fourth embodiments.

While the vehicle inclination angle storage means 221 is assembled in the configuration of the first embodiment (FIG. 9) in the fifth embodiment depicted in FIG. 13, the vehicle inclination angle storage means 221 may be assembled in the configuration of any of the second to fourth embodiments (FIGS. 10 to 12).

The vehicle inclination angle θ measured when the front wheels 51A, 51B ride on the front wheel platform 12 (FIGS. 6 and 7) is obtained from the inter-axle distance L (actual measurement value) of the vehicle 5 to be measured and the raised height H (actual measurement value) of the front wheel platform 12 of the measuring table each of which is invariable data, and stored in the vehicle inclination angle storage means 221 in the apparatus for determining the center of gravity of the vehicle of this fifth embodiment. The vehicle inclination angle θ stored in the vehicle inclination angle storage means 221 is accurate because this angle θ is obtained from the inter-axle distance L and the height H of the front wheel platform based individually on the actual measurement values.

Thus, the vehicle inclination angle θ stored in the vehicle inclination angle storage means 221 is accurate such that values of the height G1 of the center of gravity (FIGS. 3 and 7) eventually calculated by the vehicle center-of-gravity height calculation means 26 have high reliability if the apparatus for determining the center of gravity of the vehicle of this fifth embodiment (FIG. 13) is applied to the vehicles 5 to be measured having the same inter-axle distance L.

Incidentally, knowing the vehicle's center of gravity G as discussed in the foregoing first to fifth embodiments makes it possible to predict the risk of rollover of the vehicle in a road driving situation and to know in advance if the vehicle in the present situation has a secure safety level with respect to a rollover incidence.

Since the apparatus for determining the center of gravity of the vehicle of each of the embodiments of the present Application can calculate the center of gravity G of the vehicle 5 to be measured three-dimensionally in the longitudinal, lateral and vertical directions, it is possible to recognize the risk of rollover of the vehicle during road driving more strictly.

Also, while the wheel position detector 8 is installed on only one side of the measuring table 10 so as to be able to detect wheel positions on the left or right side only in each embodiment of the present application, it is possible to mount wheel position detectors 8 (two detectors in total) on both left and right sides in other embodiments. Since information on left and right wheel positions can be detected from both the left and right sides in this case (in which two wheel position detectors 8 on the left and right sides are used), it is not necessary to store the distance D between the left and right wheels in the storage means (ROM) 31 beforehand for calculating the amount of lateral displacement S of the vehicle 5 to be measured on the measuring table 10.

Also, while the vehicle 5 to be measured employed in each of the above-described embodiments is of a type having a pair of front and rear axles (with a total of four wheels), it is possible to calculate the center of gravity G of the vehicle 5 to be measured three-dimensionally on the ground of the basic idea of the apparatuses for determining the center of gravity of the embodiments of the present application even if the vehicle is of a type having three or more axles from the vehicle's front to rear side. In the case of the vehicle having three or more axles, wheels to be detected by the wheel position detector 8 are the foremost and rearmost wheels.

Furthermore, in a case of a truck scale with a pair of left and right load cells added between the front and rear load cells (including six load cells in total, for example), the values of weights detected by the load cells located between the front and rear load cells are added to the values of weights detected by either the front or rear load cells to perform various calculations.

Sixth to Eighth Embodiments

Figure 17:
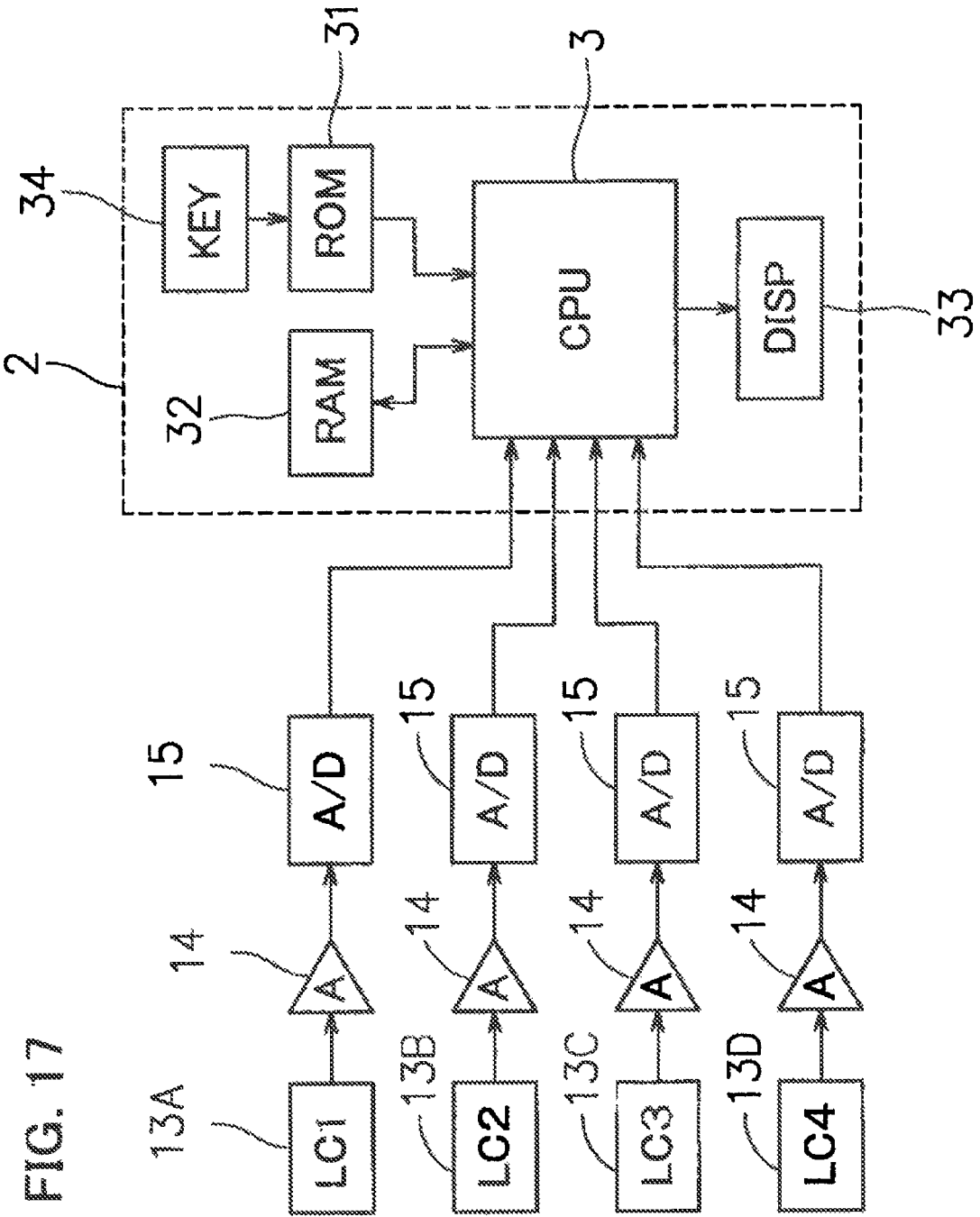
FIG. 17 is a general block diagram of the apparatus for determining the center of gravity of the vehicle according to the sixth embodiment of this Application.
Figure 18:
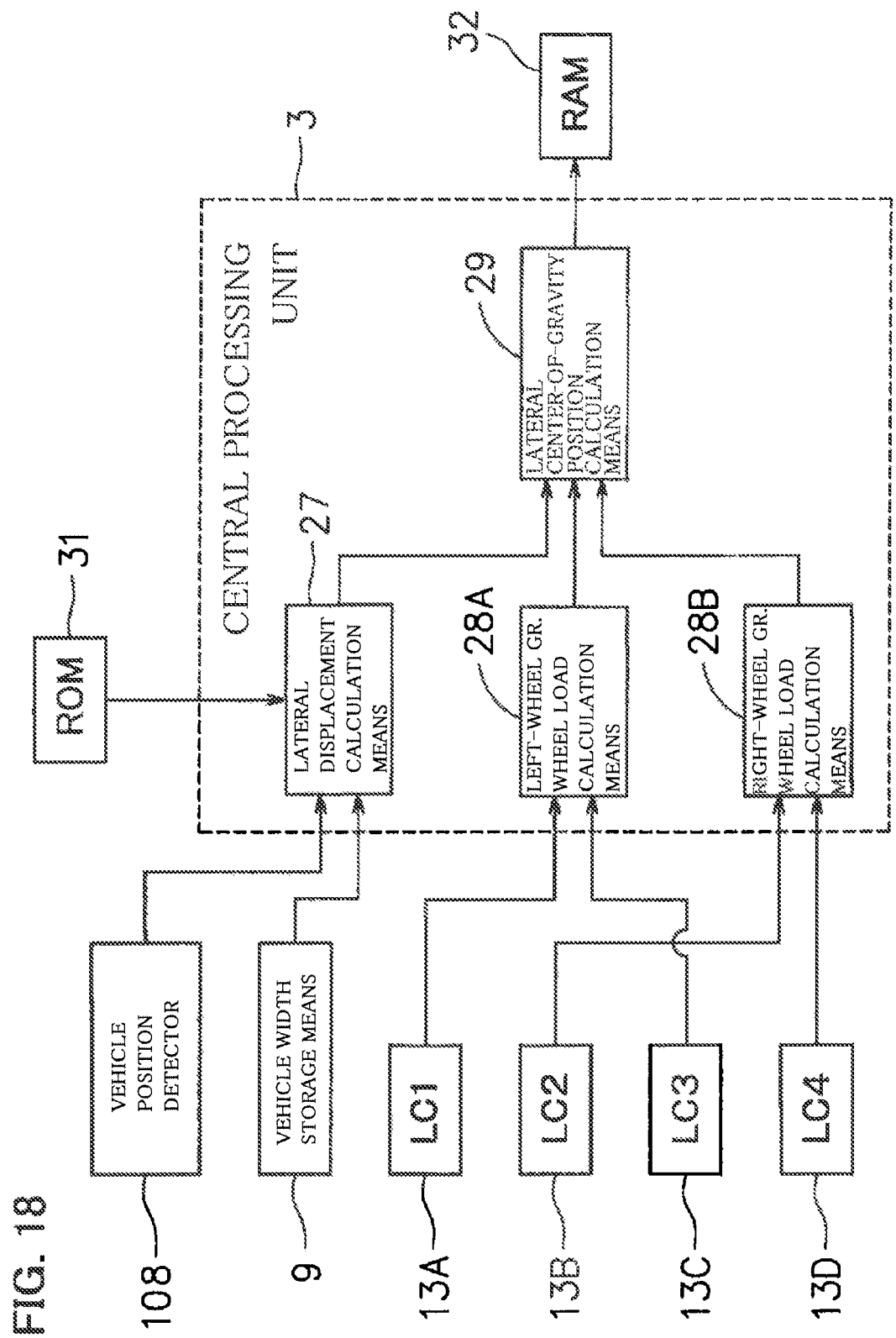
FIG. 18 is a detailed block diagram of the apparatus for determining the center of gravity of the vehicle according to the sixth embodiment of this Application.
Figure 19:
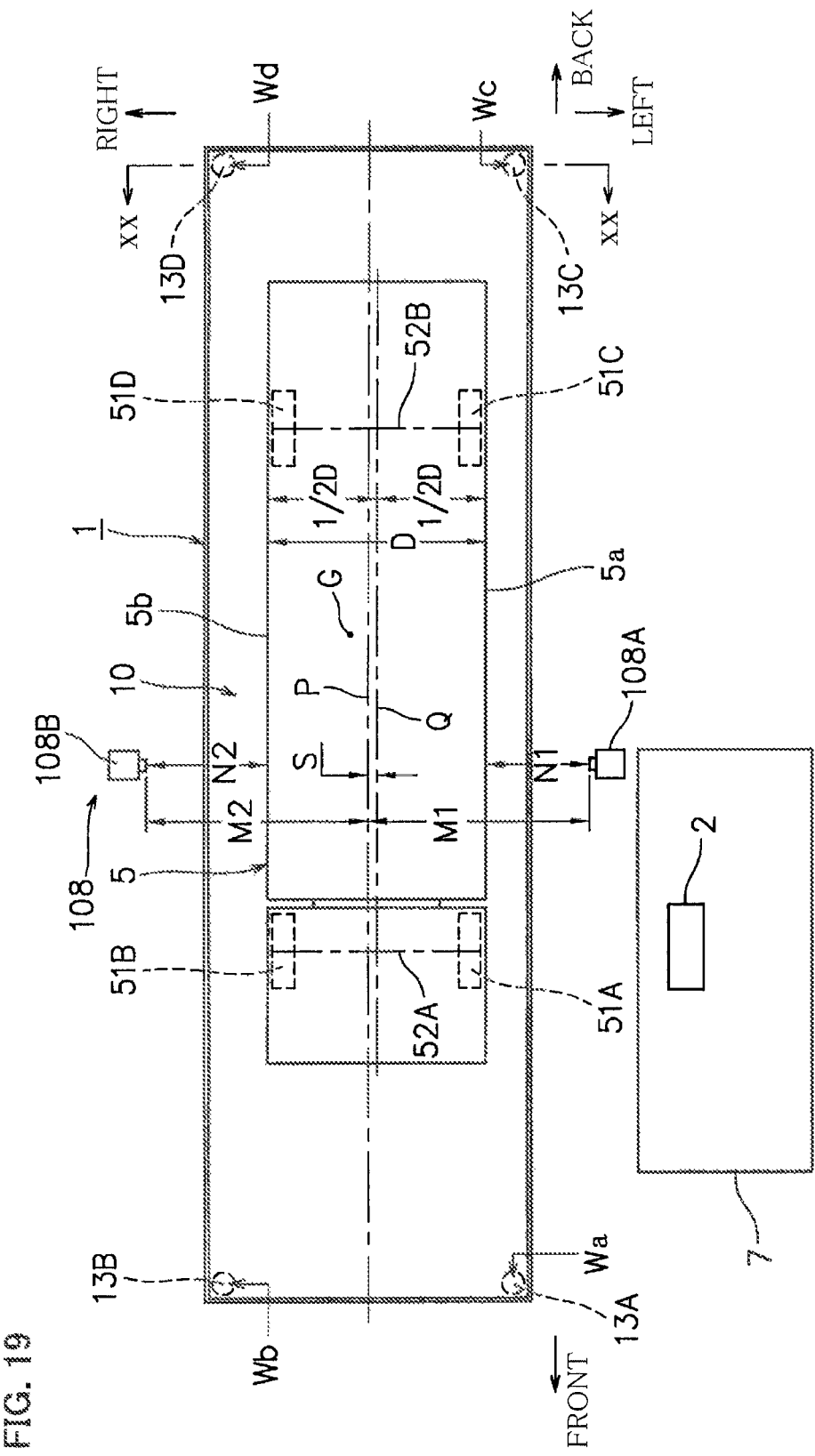
FIG. 19 is a plan view of a truck scale provided with an apparatus for determining the center of gravity of a vehicle according to a seventh embodiment of this Application, the plan view depicting a state in which the vehicle to be measured is placed on a flat surface of a measuring table.
Figure 20:
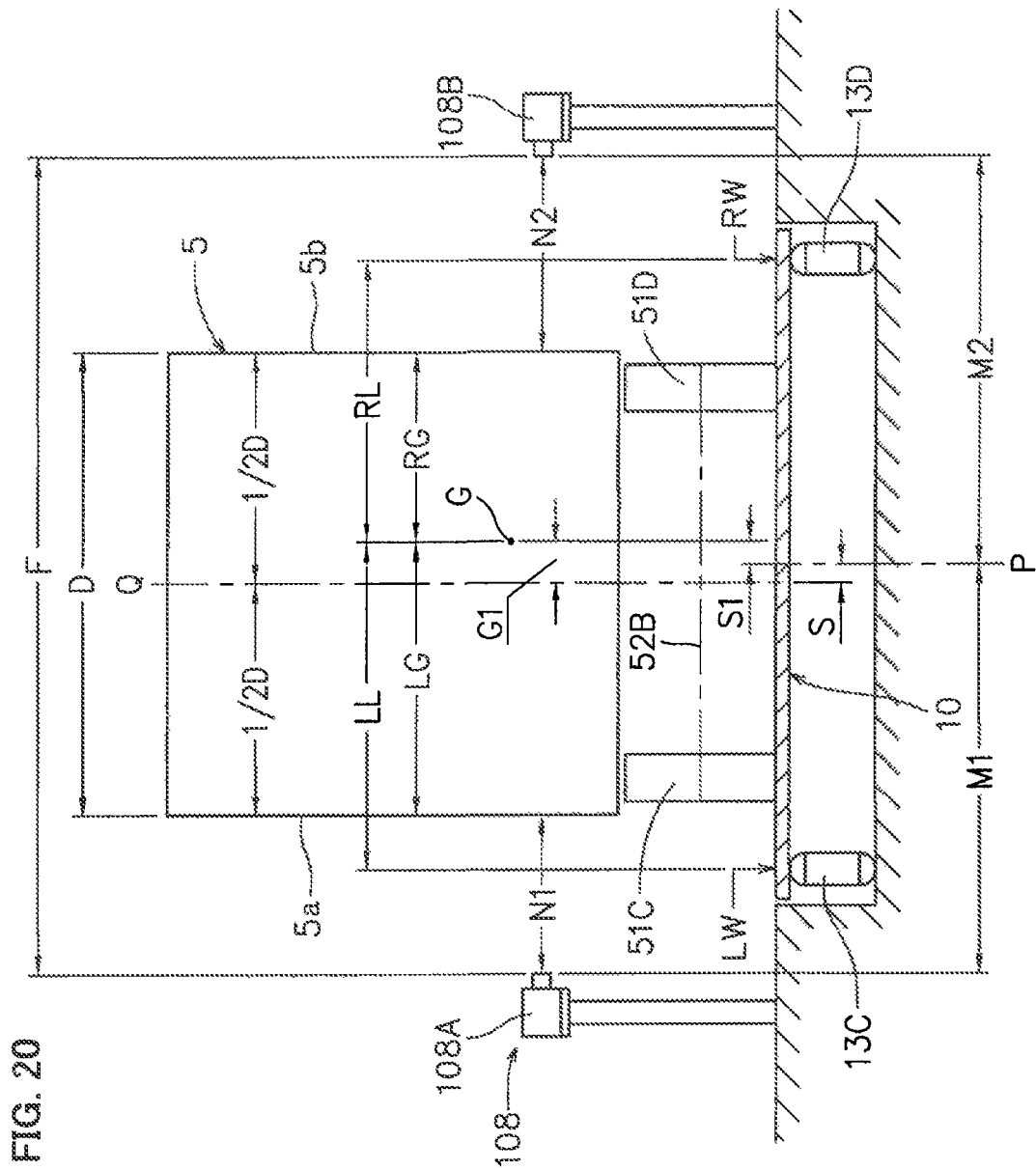
FIG. 20 is an enlarged view taken in the direction of arrows XX-XX of FIG. 19.
Figure 21:
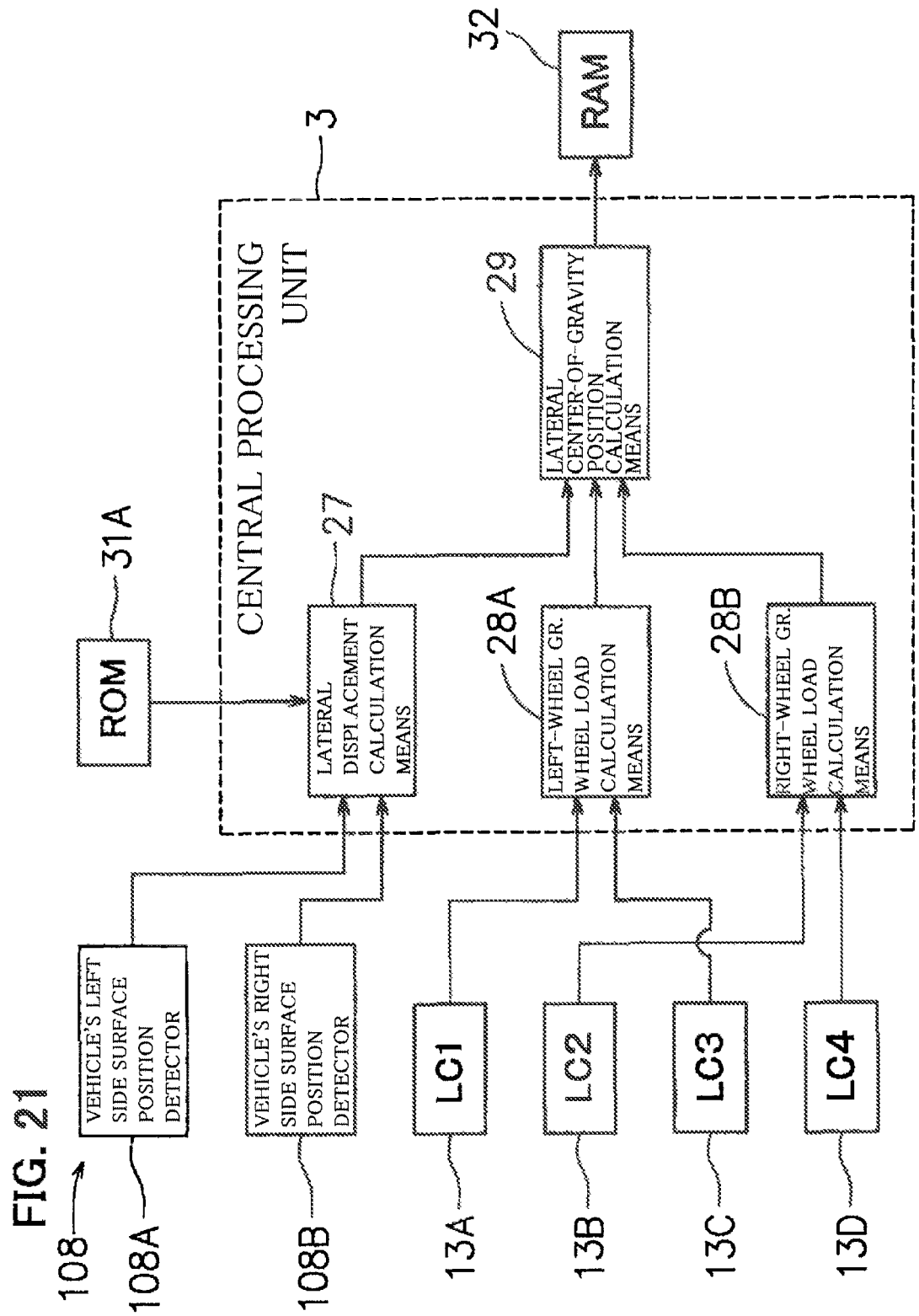
FIG. 21 is a detailed block diagram of the apparatus for determining the center of gravity of the vehicle according to the seventh embodiment of this application.
Figure 22:
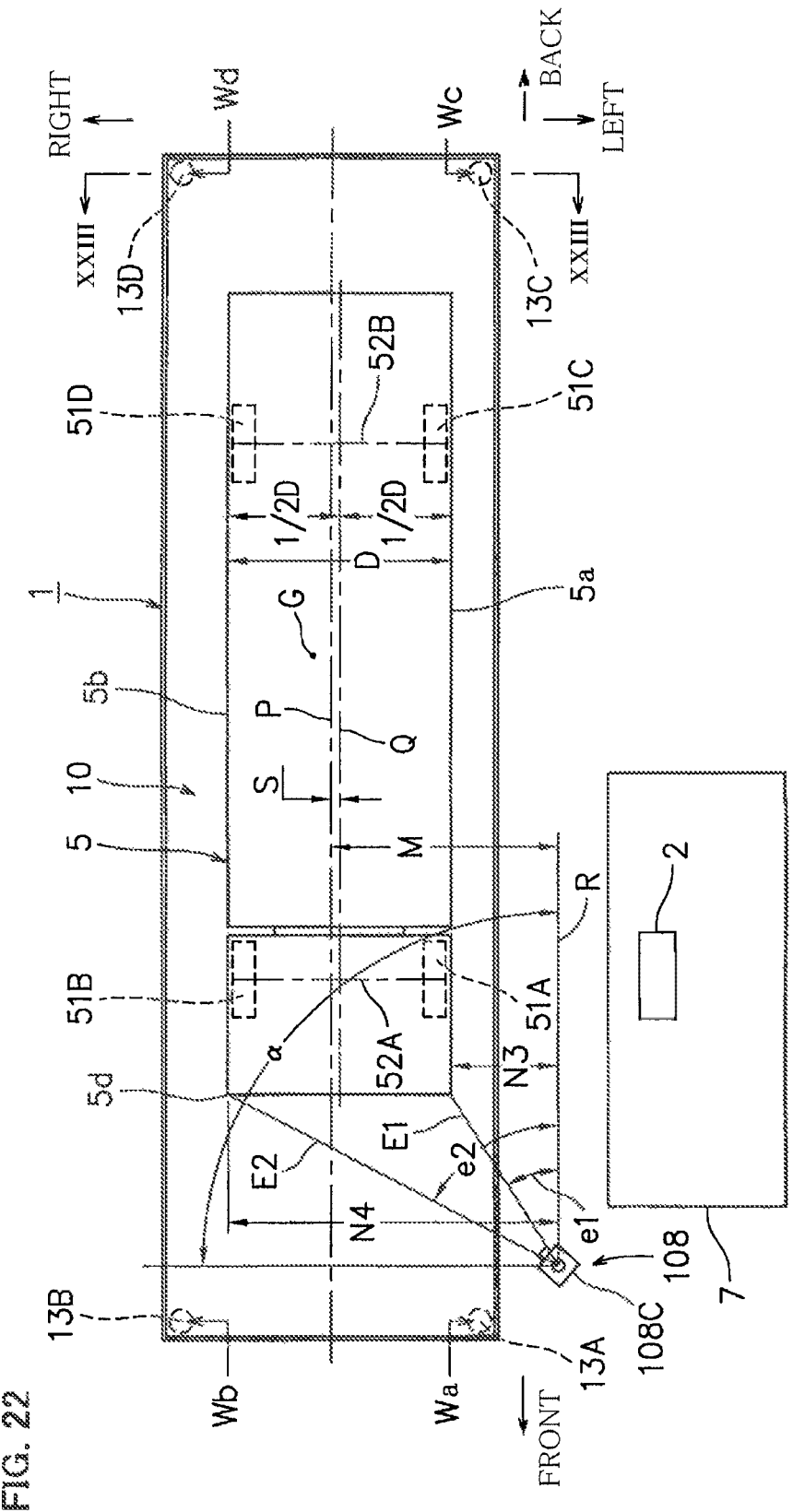
FIG. 22 is a plan view of a truck scale provided with an apparatus for determining the center of gravity of a vehicle according to an eighth embodiment of this application, the plan view depicting a state in which the vehicle to be measured is placed on a flat surface of a measuring table.
Figure 23:
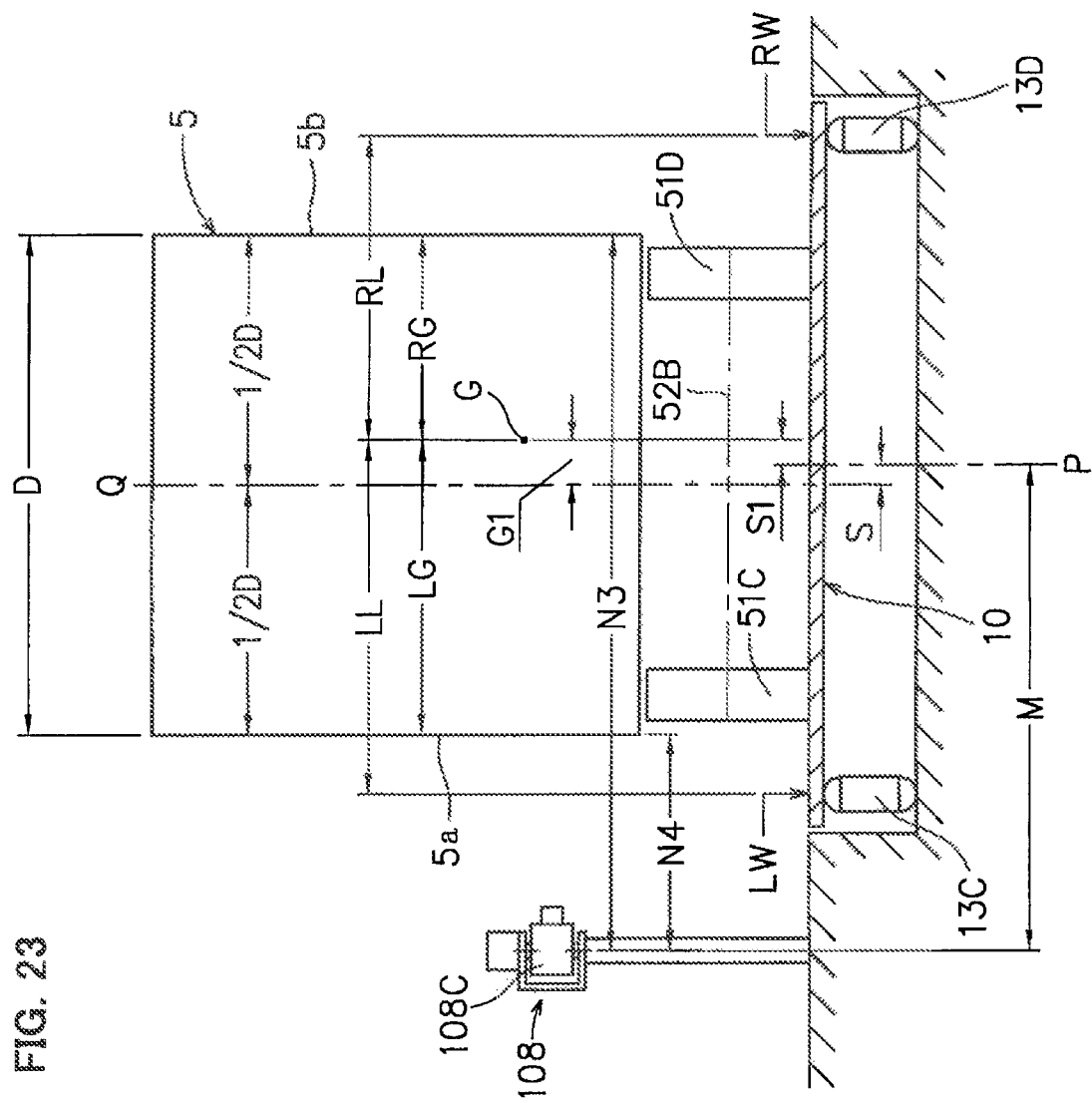
FIG. 23 is an enlarged view taken in the direction of arrows XXIII-XXIII of FIG. 22.
Figure 24:
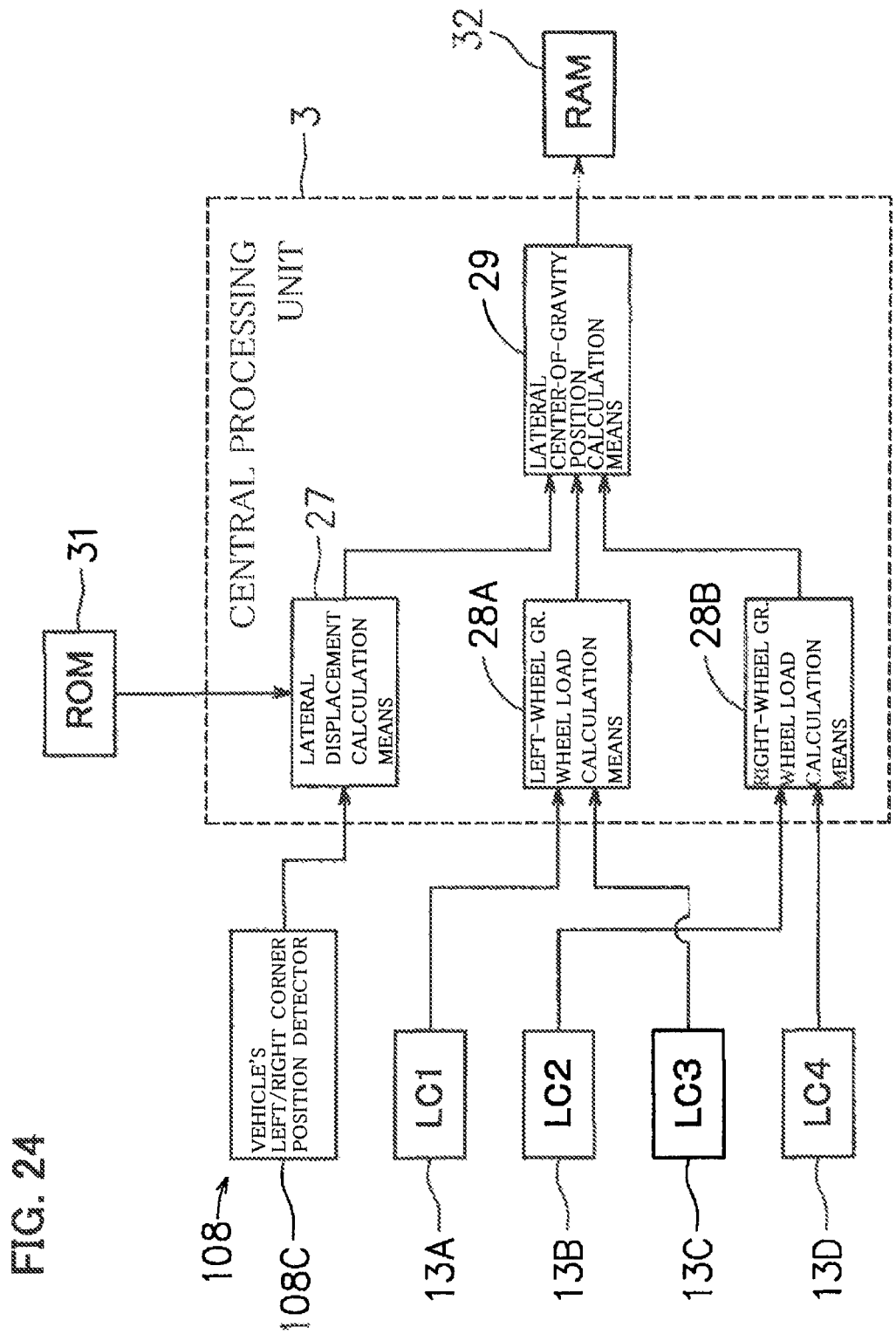
FIG. 24 is a detailed block diagram of the apparatus for determining the center of gravity of the vehicle according to the eighth embodiment of this application.

Referring next to FIGS. 14 to 24, sixth to eighth embodiments of the present application are described. FIGS. 14 to 18 depict an apparatus for determining a vehicle's center of gravity according to the sixth embodiment of the present application, FIGS. 19 to 21 depict an apparatus for determining a vehicle's center of gravity according to the seventh embodiment of the present application, and FIGS. 22 to 24 depict an apparatus for determining a vehicle's center of gravity according to the eighth embodiment of the present application. In FIGS. 14 to 24, constituent elements similar to those depicted in FIGS. 1 to 13 are designated by the same symbols.

The apparatuses for determining the center of gravity of the vehicle depicted in FIGS. 14 to 24 are intended to determine the position where the center of gravity of the vehicle is located along a widthwise direction (left/right direction) thereof. The sixth embodiment depicted in FIGS. 14 to 18 is configured to be able to measure the lateral center-of-gravity position of the vehicle in a case where width D of the vehicle 5 to be measured (or the distance between the left and right wheels instead) is known in advance, the seventh embodiment depicted in FIGS. 19 to 21 and the eighth embodiment depicted in FIGS. 22 to 24 are configured to be able to measure the lateral center-of-gravity position of the vehicle even in a case where the width D of the vehicle 5 to be measured is unknown. These embodiments are individually described hereinbelow.

<Sixth Embodiment of FIGS. 14 to 18>

A principal portion of the apparatus for determining the center of gravity of the vehicle of the sixth embodiment is as depicted in a block diagram of FIG. 18. First, the overall structure of a truck scale 1 used in the sixth embodiment is described.

Figure 14:
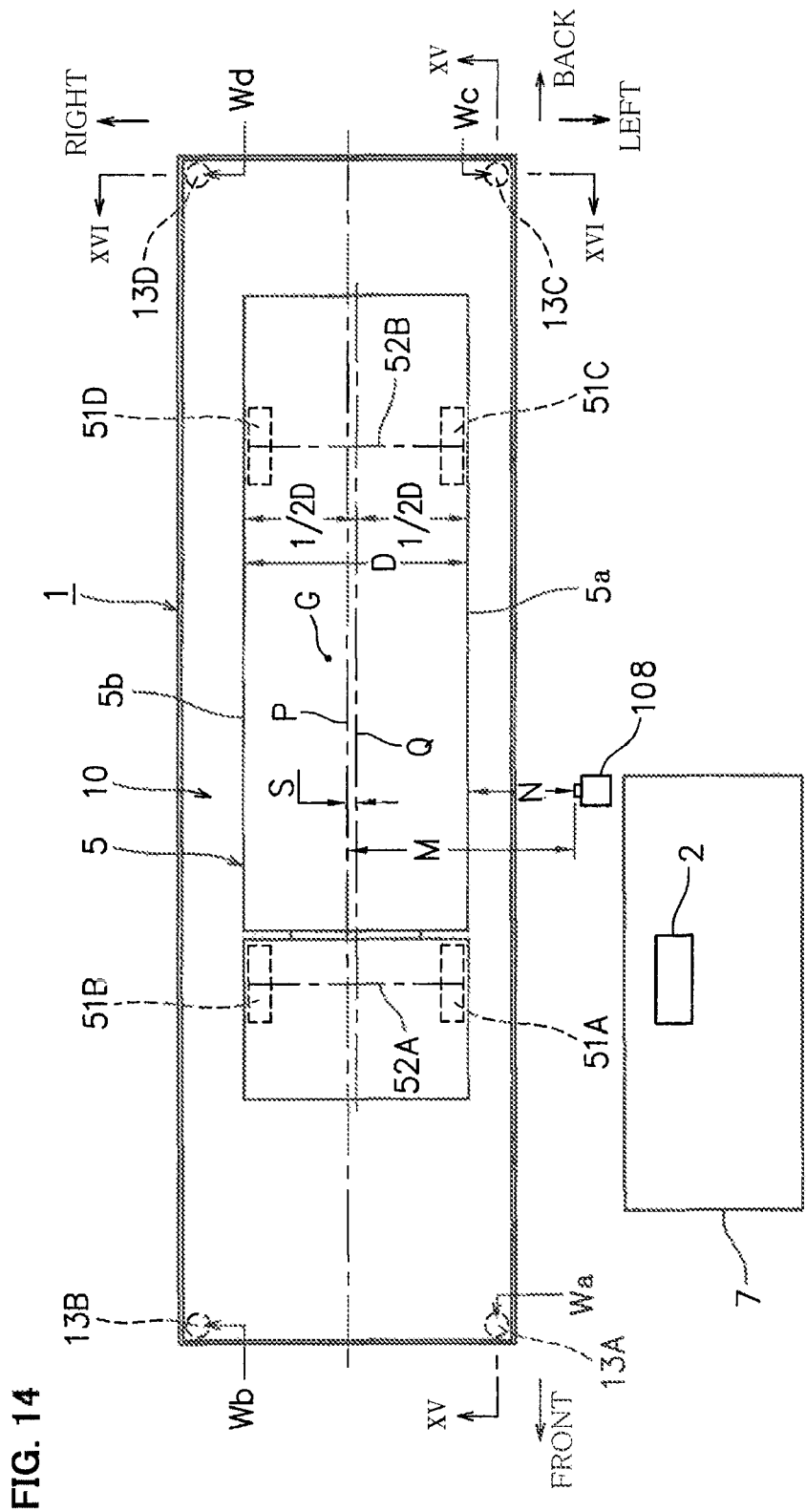
FIG. 14 is a plan view of a truck scale provided with an apparatus for determining the center of gravity of a vehicle according to a sixth embodiment of this application, the plan view depicting a state in which the vehicle to be measured is placed on a flat surface of a measuring table.
Figure 15:
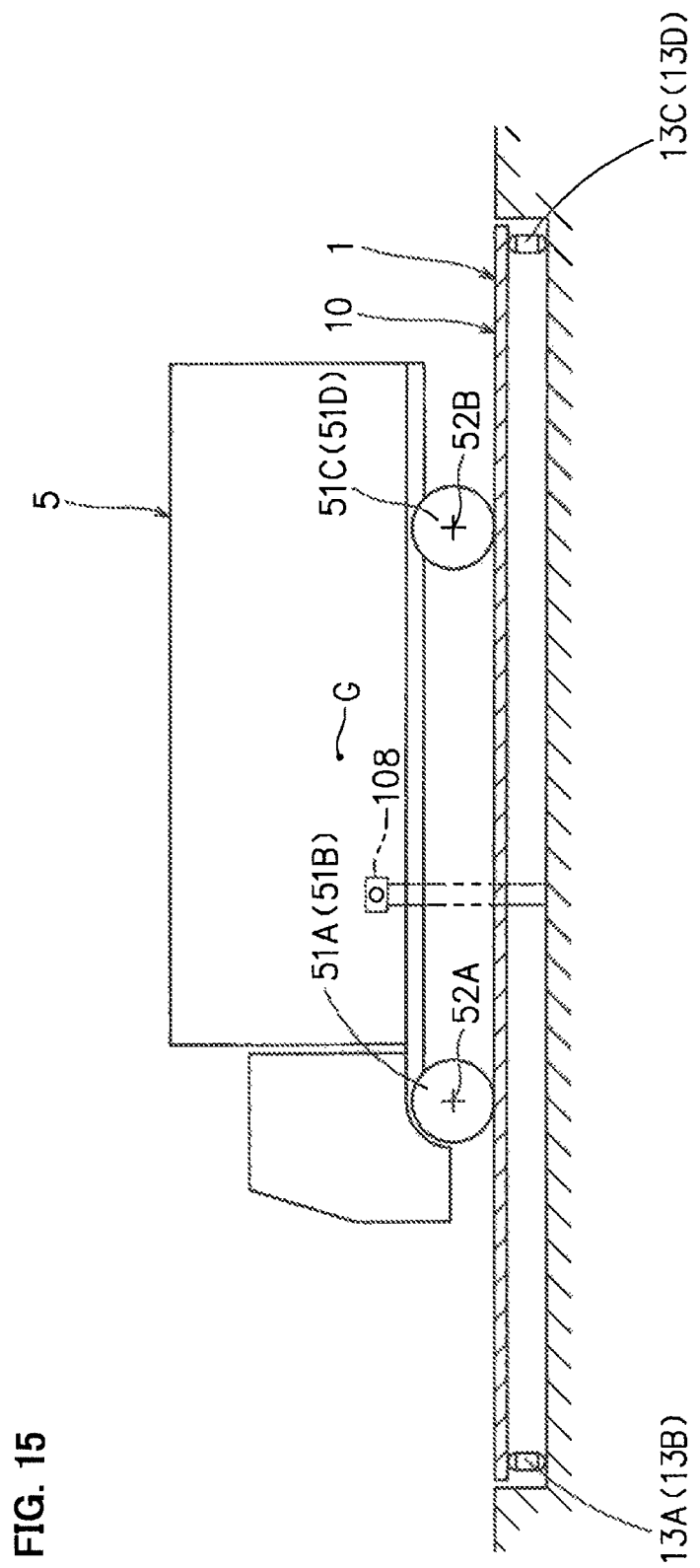
FIG. 15 is a view taken in the direction of arrows XV-XV of FIG. 14.
Figure 16:
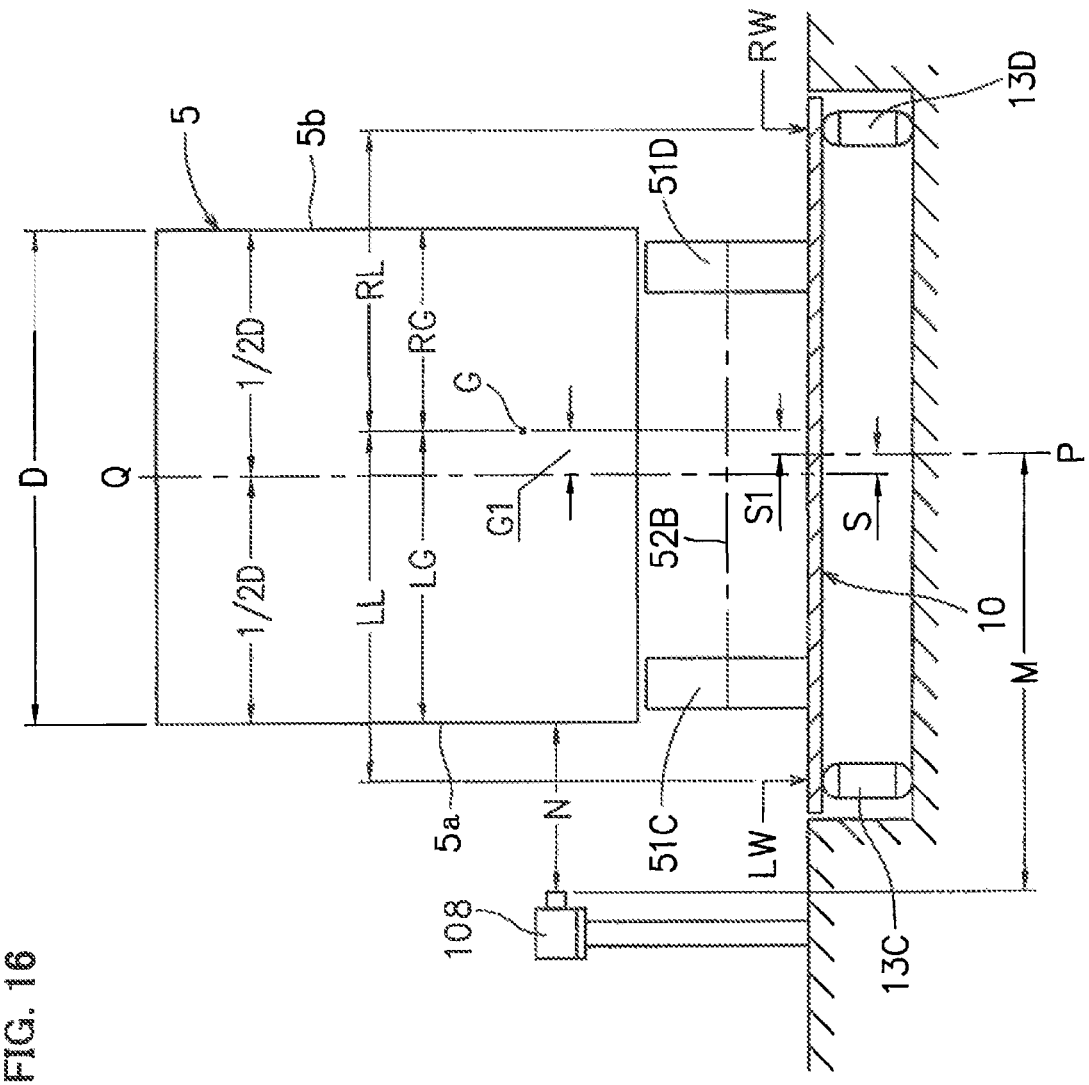
FIG. 16 is an enlarged view taken in the direction of arrows XVI-XVI of FIG. 14.

As illustrated in FIGS. 14 to 16, the truck scale 1 has a similar structure to the aforementioned structure illustrated in FIGS. 1 to 3, with a central processing unit (CPU) 3 depicted in FIG. 17 having a capability to measure the weight of the vehicle 5 to be measured. Since the configuration depicted in a block diagram of FIG. 17 is essentially the same as that of FIG. 8 described earlier except that the former is provided with a later-described vehicle position detector 108 instead of the wheel position detector 8, a detailed description is not provided here.

The apparatus for determining the center of gravity of the vehicle of the sixth embodiment is configured to be able to calculate data concerning the lateral center-of-gravity position of the vehicle 5 to be measured besides various kinds of weights under conditions where the vehicle 5 to be measured is placed on a measuring table 10 of the truck scale 1.

As depicted in FIGS. 14 to 18, the apparatus for determining the center of gravity of the vehicle of this sixth embodiment includes the single vehicle position detector 108 for detecting the position of one of left and right side surfaces (the position of the left side surface in the illustrated example) of the vehicle 5 to be measured that is placed on the measuring table 10, storage means (ROM) 31 for storing distance M measured from the vehicle position detector 108 in a horizontal direction perpendicular to a central extension line P passing between left and right load cells (13A and 13B, or 13C and 13D), and vehicle width storage means 9 for storing the width D of the vehicle 5 to be measured. The apparatus is configured to be able to calculate the lateral position of the center of gravity of the vehicle 5 to be measured by the central processing unit 3 which is provided with later-described individual calculation means on the basis of data obtained from the aforementioned storage means 31, 9 and the values of weights detected by the individual load cells 13A-13D.

The vehicle position detector 108 is configured with a range sensor which is made of an optical sensor. The vehicle position detector 108 of the sixth embodiment which is fixedly installed at a left-side position (at one position) of the measuring table 10 serves to detect a body side surface (left side surface) 5a of the vehicle 5 to be measured on the measuring table 10. The vehicle position detector 108 is configured to be able to detect horizontal distance N from the detector 108 to the left side surface 5a of the vehicle 5 to be measured when the vehicle 5 to be measured is at a measuring position on the measuring table 10.

The storage means (ROM) 31 of the computer 2 stores (registers) basic data on the truck scale 1 in advance. Among this basic data on the truck scale 1, data concerning later-described measurement of the vehicle's lateral center-of-gravity position, that is, the distance M measured from the vehicle position detector 108 in the horizontal direction perpendicular to the central extension line P passing between the left and right load cells 13A, 13B (or 13C, 13D) is stored in the aforementioned storage means (ROM) 31.

While data on the width D of the vehicle 5 to be measured is needed for measuring the lateral center-of-gravity position of the vehicle 5 to be measured, the data on the vehicle width D is stored in the vehicle width storage means 9 (FIG. 18) before weighing the vehicle 5 to be measured in this sixth embodiment. Meanwhile, regarding the vehicle width D used as data for measurement of the lateral center-of-gravity position of the vehicle 5 to be measured, distance ½D from the left side surface 5a to the center line Q is used in actual calculation and, therefore, a numerical value equal to half the actual vehicle width D (½D) is stored in the vehicle width storage means 9.

Incidentally, if the vehicle 5 to be measured is a leased vehicle, basic data on the relevant vehicle is stored in the storage means (ROM) 31 while data on the vehicle width is stored in the vehicle width storage means 9 in advance. If the vehicle 5 to be measured is not a leased vehicle, on the other hand, basic data concerning weighing is input into (stored in) the storage means (ROM) 31 and vehicle width data related to measurement of the lateral center-of-gravity position is input into (stored in) the vehicle width storage means 9 prior to the weighing.

Meanwhile, although the vehicle width storage means 9 of FIG. 18 is illustrated separately from the storage means (ROM) 31 for storing the basic data to facilitate understanding of explanation, the vehicle width storage means 9 may be means assembled in the storage means (ROM) 31 for storing the basic data.

Next, the central processing unit 3 for measuring the vehicle's lateral center-of-gravity position of the sixth embodiment depicted in FIG. 18 is described.

In the sixth embodiment depicted in FIG. 18, means provided concerning measurement of the vehicle's lateral center-of-gravity position performed by the central processing unit 3 includes lateral displacement calculation means 27, left-wheel group wheel load calculation means 28A, right-wheel group wheel load calculation means 283 and lateral center-of-gravity position calculation means 29.

<Lateral Displacement Calculation Means 27>

The lateral displacement calculation means 27 is intended to calculate how much the vehicle 5 to be measured (the center line Q) placed on the measuring table 10 is displaced leftward or rightward with respect to the measuring table 10 (the central extension line P).

This lateral displacement calculation means 27 calculates a horizontal distance from the vehicle position detector 108 to the center line Q of the vehicle 5 to be measured on the measuring table 10 by calculating (N+½D) using the horizontal distance N to the vehicle's left side surface 5a detected by the vehicle position detector 108 and the vehicle width D stored in the vehicle width storage means 9 beforehand. The lateral displacement calculation means 27 is configured to be able to calculate how much the vehicle 5 to be measured (the center line Q) placed on the measuring table 10 is displaced leftward or rightward (i.e., the amount of lateral displacement S) with respect to the central extension line P passing between the left and right load cells by calculating the value of (M−(N+½D)) using the horizontal distance (N+½D) and the horizontal distance M from the vehicle position detector 108 to the central extension line P passing between the left and right load cells stored in the storage means (ROM) 31. Meanwhile, if (N+½D) mentioned above is larger than M mentioned above (M<N), it means that the center line Q of the vehicle 5 to be measured is located farther away from the central extension line P passing between the left and right load cells with respect to the vehicle position detector 108, and the aforementioned amount of lateral displacement S takes a negative (−) value.

<Left-wheel Group Wheel Load Calculation Means 28A>

The left-wheel group wheel load calculation means 28A serves to calculate the total load of the left-wheel group (51A and 51C) of the vehicle 5 to be measured by adding the individual measurement values Wa, Wc fed from the left-front load cell 13A and the left-rear load cell 13C (Wa+Wc), respectively, when the vehicle 5 to be measured is placed on the measuring table 10. Meanwhile, the sum of the individual measurement values Wa, We (FIG. 14) fed from the left-front load cell 13A and the left-rear load cell 13C is designated by LW in FIG. 16.

<Right-Wheel Group Wheel Load Calculation Means 28B>

The right-wheel group wheel load calculation means 28B serves to calculate the total load of the right-wheel group (51B and 51D) of the vehicle 5 to be measured by adding the individual measurement values Wb, Wd fed from the right-front load cell 13W and the right-rear load cell 13D (Wb+Wd), respectively, when the vehicle 5 to be measured is placed on the measuring table 10. Meanwhile, the sum of the individual measurement values Wa, We (FIG. 14) fed from the right-front load cell 13B and the right-rear load cell 13D is designated by RW in FIG. 16.

<Lateral Center-of-Gravity Position Calculation Means 29>

The lateral center-of-gravity position calculation means 29 serves to calculate the position where the center of gravity G of the vehicle is located along the left/right direction of the vehicle from the individual total loads of the left and right wheels (Wa+Wc=LW and Wb+Wd=RW) calculated by the aforementioned left-wheel group wheel load calculation means 28A and right-wheel group wheel load calculation means 28B and the amount of lateral displacement S calculated by the lateral displacement calculation means 27.

Specifically, the lateral center-of-gravity position calculation means 29 is configured to calculate lateral displacement distance G1 from the center line Q of the vehicle 5 to be measured to the center of gravity G thereof in a state depicted in FIG. 16 by calculating lateral distance LL from the center of gravity G to the left load cell 13C and lateral distance RL from the center of gravity G to the right load cell 13D using the ratio of the individual total loads of the left and right wheels (LW:RW) and further calculating the amount of lateral displacement S1 from the central extension line P of the measuring table 10 to the center of gravity G by (LL-RL)/2 as well as the value of (S+S1).

Then, the lateral position of the center of gravity of the vehicle 5 to be measured presented on the display 33 may be expressed in terms of the aforementioned lateral displacement distance G1 from the center line Q of the vehicle or, as an alternative, expressed upon converting the same into left and right distances LG, RG measured respectively from the vehicle's left and right side surfaces 5a, 5b to the center of gravity G on the basis of the lateral displacement distance G1.

The apparatus for determining the center of gravity of the vehicle of this sixth embodiment functions in the below-described manner. In the truck scale 1 of this embodiment, the vehicle 5 to be measured is expected to move onto the measuring table 10 from the rear side as depicted in FIG. 14.

Then, under conditions where all the wheels 51A-51D of the vehicle 5 to be measured ride on the measuring table 10 as depicted in FIGS. 14 and 15, the central processing unit 3 measures the total weight of the vehicle 5 to be measured on the basis of the individual measurement values Wa-Wd fed from the load cells 13A-13D, respectively, while the apparatus for determining the vehicle's center of gravity depicted in FIG. 18 calculates the lateral center-of-gravity position of the vehicle 5 to be measured.

Specifically, the lateral center-of-gravity position of the vehicle 5 to be measured is determined by the lateral displacement calculation means 27 by first calculating how much the center line Q of the vehicle 5 to be measured is displaced leftward or rightward (i.e., the amount of lateral displacement S) with respect to the central extension line P passing between the left and right load cells from vehicle's side surface position data (horizontal distance N) fed from the vehicle position detector 108, the vehicle width D (½D) stored in the vehicle width storage means 9, and the distance M measured from the vehicle position detector 108 in the horizontal direction to the central extension line P passing between the left and right load cells stored in the storage means (ROM) 31.

Subsequently, the lateral center-of-gravity position calculation means 29 calculates the position where the center of gravity G of the vehicle is located along the left/right direction (LG:RG) from the individual total loads of the left and right wheels (LW, RW) calculated respectively by the left-wheel group wheel load calculation means 28A and the right-wheel group wheel load calculation means 28B and the amount of lateral displacement S calculated by the lateral displacement calculation means 27 in the above-described manner.

Lateral center-of-gravity position data (LG:RG) calculated by the lateral center-of-gravity position calculation means 29 is stored in the storage means (RAM) 32 for presentation on the display 33 and printout on a weighing report. While the vehicle position detector 108 of this sixth embodiment is so disposed as to detect the position of the left side surface of the vehicle 5 to be measured, it is possible to obtain the lateral center-of-gravity position of the vehicle 5 to be measured in the same way as described above even when the vehicle position detector 108 is so disposed as to detect the position of the right side surface of the vehicle 5 to be measured.

<Seventh Embodiment of FIGS. 19 to 21>

The apparatus for determining the center of gravity of the vehicle of the seventh embodiment depicted in FIGS. 19 to 21 is configured such that a vehicle position detector 108 for detecting a specified position of the vehicle 5 to be measured on the measuring table 10 includes a pair of left and right vehicle's side surface position detectors (i.e., a vehicle's left side surface position detector 108A and a vehicle's right side surface position detector 108B). The apparatus for determining the center of gravity of the vehicle of the seventh embodiment can calculate how much the vehicle 5 to be measured is displaced leftward or rightward with respect to the measuring table 10 even if the vehicle width D of the vehicle 5 to be measured is unknown.

Subsequently, in this seventh embodiment, the vehicle's left side surface position detector 108A and the vehicle's right side surface position detector 108B for detecting the positions (distances N1, N2) of the left and right side surfaces 5a, 5b of the vehicle 5 to be measured are installed on left and right sides of the measuring table 10 outside thereof, respectively, and lateral distance F between the two detectors 8A, 8B is stored in the storage means (ROM) 31. In this seventh embodiment, the left and right detectors 8A, 8B are installed at positions equidistant leftward and rightward (M1=M2) from the central extension line P passing between the left and right load cells.

This seventh embodiment is otherwise the same as the aforementioned sixth embodiment including the fact that the central processing unit 3 is provided with lateral displacement calculation means 27, left-wheel group wheel load calculation means 28A, right-wheel group wheel load calculation means 28B and lateral center-of-gravity position calculation means 29.

In the apparatus for determining the center of gravity of the vehicle of this seventh embodiment, the vehicle's left side surface position detector 108A and the vehicle's right side surface position detector 108B detect the distances N1, N2 (FIGS. 19 and 20) from the detectors 8A, 8B to the left and right side surfaces 5a, 5b of the vehicle 5 to be measured, respectively, and then the lateral displacement calculation means 27 can calculate the vehicle width D of the vehicle 5 to be measured (D=F−N1−N2) by subtracting the individual distances N1, N2 detected by the aforementioned detectors 8A, 8B from the distance F (equal to M1+M2) between the two detectors 8A, 8B stored in the storage means (ROM) 31 under conditions where the vehicle 5 to be measured is placed on the measuring table 10.

When the aforementioned vehicle width D has been calculated, the lateral displacement calculation means 27 can calculate how much the center line Q of the vehicle 5 to be measured is displaced leftward or rightward from the central extension line P passing between the left and right load cells (the amount of lateral displacement S) by calculating the value of (M1−(N1+½D)) or (M2−(N2+½D)). Meanwhile, although M1=M2 and M1 and M2 each have a value equal to ½F in this seventh embodiment, it is possible in other embodiments to calculate the amount of lateral displacement S by calculating the value of (M1−(N1+½D)) or (M2−(N2+½D)) even if M1 and M2 have unequal values.

As is the case with the foregoing sixth embodiment, the left-wheel group wheel load calculation means 28A and the right-wheel group wheel load calculation means 28B calculate the total wheel load LW of the left-wheel group (51A and 51C) and the total wheel load RW of the right-wheel group (51B and 51D) of the vehicle 5 to be measured that is placed on the measuring table 10, respectively.

Subsequently, as is the case with the foregoing sixth embodiment, the lateral center-of-gravity position calculation means 29 calculates the position where the center of gravity G of the vehicle is located along the left/right direction thereof (LG:RG) from the individual total loads of the left and right wheels (LW, RW) calculated respectively by the left-wheel group wheel load calculation means 28A and the right-wheel group wheel load calculation means 28B and the amount of lateral displacement S calculated by the lateral displacement calculation means 27.

Lateral center-of-gravity position data (LG:RG) calculated by the lateral center-of-gravity position calculation means 29 is stored in the storage means (RAM) 32 for presentation on the display 33 and printout on a weighing report in the case of this seventh embodiment as well.

<Eighth Embodiment of FIGS. 22 to 24>

As is the case with the foregoing seventh embodiment, the apparatus for determining the center of gravity of the vehicle of the eighth embodiment depicted in FIGS. 22 to 24 is configured to be able to calculate how much the vehicle 5 to be measured is displaced leftward or rightward with respect to the measuring table 10 even if the vehicle width D of the vehicle 5 to be measured is unknown.

In the apparatus for determining the center of gravity of the vehicle of this eighth embodiment is so configured that the vehicle position detector 108 for detecting specific positions of the vehicle 5 to be measured that is placed on the measuring table 10 is made of a single vehicle's left/right corner position detector 108C. The vehicle's left/right corner position detector 108C is configured to be able to detect positions of left and right corners 5c, 5d of the vehicle 5 to be measured by swinging across horizontal directions. Meanwhile, the vehicle's left/right corner position detector 108C used in this eighth embodiment may be referred to simply as the detector 108C in the following description.

This detector 108C can detect the positions of the left and right corners 5c, 5d at the front of the vehicle 5 to be measured by swinging across the horizontal directions under conditions where the detector 108C is installed at a fixed position obliquely ahead of a forward end of the vehicle 5 to be measured that is stopped on the measuring table 10. A swinging range of this detector 108C may be a range of approximately 90° from a direction parallel to a longitudinal direction (front/rear direction) of the measuring table 10 to a direction (left/right direction) perpendicular thereto as indicated by angle α in FIG. 22.

Incidentally, the detector 108C may be installed at a position obliquely behind at the rear of a rear end of the vehicle 5 to be measured that is stopped on the measuring table 10 so as to detect left and right corners of the vehicle 5 to be measured at a rear part thereof.

The apparatus for determining the center of gravity of the vehicle of this eighth embodiment uses the aforementioned swing-type detector 108C and is provided with the storage means (ROM) 31 for storing distance M measured from the detector 108C in a horizontal direction perpendicular to the central extension line P passing between left and right load cells (13A and 13B, or 13C and 13D) (i.e., the distance between a front-to-rear extension line R from the detector 108C to the central extension line P passing between the left and right load cells).

The apparatus for determining the center of gravity of the vehicle of this eighth embodiment also employs almost the same configuration as that of the above-described sixth embodiment except that the apparatus employs the swing-type detector 108C. Specifically, the apparatus for determining the center of gravity of the vehicle of this eighth embodiment is provided with the basic structure of the truck scale 1 of the sixth embodiment as well as the individual calculation means used in the central processing unit 3 (i.e., the lateral displacement calculation means 27, the left-wheel group wheel load calculation means 28A, the right-wheel group wheel load calculation means 28B and the lateral center-of-gravity position calculation means 29).

In this eighth embodiment, calculation of the lateral position of the vehicle 5 to be measured using detection data fed from the detector 108C is performed as described below. Meanwhile, the later-described value of sine is read out from a data table concerning a trigonometric function stored in the storage means (ROM) 31.

When the detector 108C is caused to swing under conditions where the vehicle 5 to be measured is stopped on the measuring table 10 as depicted in FIG. 22, the detector 108C first detects the left corner 5c and the right corner 5d at the front of the vehicle with a time difference. At a point in time when the detector 108C detects the left corner 5c, the detector 108C outputs distance data E1 concerning the distance from the detector 108C to the left corner 5c and angle data e1 concerning the angle of the left corner 5c with respect to a front-to-rear extension line R of the detector 108C to the lateral displacement calculation means 27 (FIG. 24). At a point in time when the detector 108C detects the right corner 5d, on the other hand, the detector 108C outputs distance data E2 concerning the distance from the detector 1080 to the right corner 5c and angle data e2 to the lateral displacement calculation means 27.

Then, the lateral displacement calculation means 27 calculates distance N3 from the front-to-rear extension line R of the detector 108C to the left corner 5c (left side surface 5a) by calculating the value of (E1×sin e1) using the distance data E1 and the angle data e1 obtained at the point in time when the detector 108C detects the left corner 5c, and calculates distance N4 from the front-to-rear extension line R of the detector 108C to the right corner 5d (left side surface 5b) by calculating the value of (E2×sin e2) using the distance data E2 and the angle data e2 obtained at the point in time when the detector 108C detects the right corner 5d. Subsequently, the lateral displacement calculation means 27 calculates the vehicle width D of the vehicle 5 to be measured by calculating the value of (N4−N3).

Further, the lateral displacement calculation means 27 calculates distance (½D+N3) from the front-to-rear extension line R of the detector 108C to the center line Q of the vehicle 5 to be measured on the measuring table 10 by adding half (½D) the aforementioned vehicle width D and the aforementioned distance N3. On the other hand, the lateral displacement calculation means 27 compares the distance (½D+N3) with the distance M from the front-to-rear extension line R of the detector 108C to the central extension line P passing between left and right load cells, whereby the lateral displacement calculation means 27 can calculate how much the center line Q of the vehicle 5 to be measured is displaced leftward or rightward with respect to the central extension line P passing between left and right load cells. In short, the amount of displacement S is eventually obtained by calculating the value of (M−(½D+N3)).

As is the case with the foregoing sixth embodiment, the left-wheel group wheel load calculation means 28A and the right-wheel group wheel load calculation means 28B, on the other hand, calculate the total wheel load LW of the left-wheel group (51A and 510) and the total wheel load RW of the right-wheel group (510 and 510) of the vehicle 5 to be measured that is placed on the measuring table 10, respectively.

Then, as is the case with the foregoing sixth embodiment, the lateral center-of-gravity position calculation means 29 calculates the position where the center of gravity G of the vehicle is located along the left/right direction thereof (LG: RG) from the individual total loads of the left and right wheels (LW, RW) calculated respectively by the left-wheel group wheel load calculation means 28A and the right-wheel group wheel load calculation means 28B and the amount of lateral displacement S calculated by the lateral displacement calculation means 27.

Meanwhile, lateral center-of-gravity position data (LG: RG) calculated by the lateral center-of-gravity position calculation means 29 is stored in the storage means (RAM) 32 for presentation on the display 33 and printout on a weighing report in the case of this eighth embodiment as well.

As is the case with the foregoing seventh embodiment, the apparatus for determining the center of gravity of the vehicle of the eighth embodiment can measure the position where the lateral center-of-gravity position G of the vehicle to be measured is located along the left/right direction thereof (LG:RG) even if data on the vehicle width D of the vehicle 5 to be measured is unavailable as discussed above. Additionally, since the apparatus of this eighth embodiment uses the single swing-type detector 5C for detecting the positions of the left and right corners of the vehicle 5 to be measured, it is possible to reduce the number of detectors compared to the seventh embodiment which uses two detectors.

Incidentally, knowing how much the center of gravity G of the vehicle is displaced leftward or rightward as in the foregoing individual embodiments makes it possible to predict the risk of rollover of the vehicle in a road driving situation and to know in advance if the vehicle in the present situation has a secure safety level with respect to a rollover incidence.

Since the apparatus for determining the center of gravity of the vehicle of each of the embodiments of the present application can calculate also the lateral center-of-gravity position of the vehicle 5 to be measured during measurement thereof, it is possible to recognize the risk of rollover of the vehicle in the road driving situation and thereby contribute to safe driving.

Additionally, while the vehicle 5 to be measured employed in each of the foregoing embodiments is of a type having a pair of front and rear axles (with a total of four wheels), it is possible to calculate the lateral center-of-gravity position of the vehicle 5 to be measured on the ground of the basic idea of the apparatuses for determining the center of gravity of the embodiments of the present application even if the vehicle is of a type having three or more axles from the vehicle's front to rear side.

Furthermore, in a case of a truck scale with a pair of left and right load cells added between the front and rear load cells (including six load cells in total, for example), the values of weights detected by the load cells located between the front and rear load cells are added to the values of weights detected by either the front or rear load cells to perform various calculations.

Reference Signs List

1 designates a truck scale, 2 designates a computer, 3 designates a central processing unit, 5 designates a vehicle to be measured, 5a and 5b designate side surfaces of the vehicle, 5c and 5d designate corners of the vehicle, 8 designates a wheel position detector, 108 designates a vehicle position detector, 108A designates a vehicle's left side surface position detector, 108B designates a vehicle's right side surface position detector, 108C designates a vehicle's left/right corner position detector, 9 designates vehicle width storage means, 10 designates a measuring table, 11 designates a flat surface, 12 designates a front wheel platform, 13A to 13D designate load cells, 20 designates longitudinal displacement calculation means, 21 designates inter-axle distance calculation means, 22 designates vehicle inclination angle calculation means, 23A designates front axle load calculation means, 23B designates rear axle load calculation means, 24 longitudinal center-of-gravity position calculation means, 25 designates longitudinal center-of-gravity displacement calculation means, 26 designates vehicle center-of-gravity height calculation means, 27 designates lateral displacement calculation means, 28A designates left-wheel group wheel load calculation means, 28B designates right-wheel group wheel load calculation means, 29 designates lateral center-of-gravity position calculation means, 31 designates storage means (ROM), 32 designates storage means (RAM), 51A to 51D designate wheels, 52A and 52B designate axles, 211 designates inter-axle distance storage means, 221 designates vehicle inclination angle storage means, 231A designates front axle load storage means, 231B designates rear axle load storage means, A1 and A2 designate front wheel positions, and B1 and B2 designate rear wheel positions.

The invention claimed is:

1. An apparatus for determining the center of gravity of a vehicle to be measured being applied to a truck scale including load cells (13A-13D) provided individually at around four corners of a measuring table (10) below a bottom surface thereof, the measuring table (10) being provided with a flat surface (11) having a surface area on which all wheels (51A-51D) of a vehicle (5) to be measured can be simultaneously placed and a front wheel platform (12) located at a position in a frontal part of the flat surface (11) and raised to a specific height, the truck scale being configured to be able to measure the weight of the vehicle (5) to be measured by a central processing unit (3) on the basis of measurement values fed from the individual load cells (13A-13D) when the vehicle (5) to be measured is placed on the measuring table (10), the apparatus comprising
 a wheel position detector (8) for detecting a front wheel position and a rear wheel position of the vehicle (5) to be measured that is placed on the measuring table (10);
 longitudinal displacement calculation means (20) for calculating how much the vehicle (5) to be measured is displaced frontward or rearward from a reference position along a front/rear direction on the basis of information on the wheel positions detected by the wheel position detector (8) under conditions where the vehicle (5) to be measured is placed on the measuring table (10);

longitudinal center-of-gravity position calculation means (24) for acquiring a front axle load and a rear axle load of the vehicle (5) to be measured and calculating a position where the center of gravity (G or G') of the vehicle is located along the front/rear direction thereof on the basis of the front axle load, the rear axle load and the amount of longitudinal displacement calculated by the longitudinal displacement calculation means (20);

storage means (32) for storing information on the center of gravity along the front/rear direction calculated by the longitudinal center-of-gravity position calculation means (24);

longitudinal center-of-gravity displacement calculation means (25) for calculating the amount of displacement (T) of the center of gravity along the front/rear direction by comparing information on the center of gravity along the front/rear direction newly calculated by the longitudinal center-of-gravity position calculation means (24) under conditions where front wheels (51A, 51B) of the vehicle (5) to be measured ride on the front wheel platform (12) and the information on the center of gravity on the flat surface (11) stored in the storage means (32); and vehicle center-of-gravity height calculation means (26) for acquiring a longitudinal inclination angle (θ) of the vehicle (5) to be measured under conditions where the front wheels (51A, 51B) of the vehicle (5) to be measured ride on the front wheel platform (12) and calculating the height (G1) of the center of gravity of the vehicle (5) to be measured on the basis of the amount of displacement (T) of the center of gravity along the front/rear direction calculated by the longitudinal center-of-gravity displacement calculation means (25) and the longitudinal inclination angle (θ).

2. The apparatus for determining the center of gravity of a vehicle to be measured being applied to the truck scale according to claim 1, further comprising:

inter-axle distance calculation means (21) for calculating the distance (L) between the front and rear axles from the front wheel position and the rear wheel position detected by the wheel position detector (8);

vehicle inclination angle calculation means (22) for calculating the longitudinal inclination angle (θ) from the distance (L) between the front and rear axles calculated by the inter-axle distance calculation means (21) and the height (H) of the front wheel platform (12); and front axle load calculation means (23A) and rear axle load calculation means (23B) for calculating the front axle load and the rear axle load on the basis of measurement values (Wa-Wd) fed from the individual load cells (13-13D), respectively.

3. The apparatus for determining the center of gravity of a vehicle to be measured being applied to the truck scale according to claim 1, further comprising:

inter-axle distance storage means (211) for storing the distance (L) between the front and rear axles of the vehicle (5) to be measured in advance;

vehicle inclination angle calculation means (22) for calculating the longitudinal inclination angle (θ) from the distance (L) between the front and rear axles stored in the inter-axle distance storage means (211) and the height (H) of the front wheel platform (12); and front axle load calculation means (23A) and rear axle load calculation means (23B) for calculating the front axle load and the rear axle load on the basis of measurement values (Wa-Wd) fed from the individual load cells (13A-13D), respectively.

4. The apparatus for determining the center of gravity of a vehicle to be measured being applied to the truck scale according to claim 1, further comprising:

inter-axle distance calculation means (21) for calculating the distance (L) between the front and rear axles from the front wheel position and the rear wheel position detected by the wheel position detector (8);

vehicle inclination angle calculation means (22) for calculating the longitudinal inclination angle (θ) from the distance (L) between the front and rear axles calculated by the inter-axle distance calculation means (21) and the height (H) of the front wheel platform (12); and front axle load storage means (231A) and rear axle load storage means (231B) for storing the front axle load and the rear axle load, respectively in advance.

5. The apparatus for determining the center of gravity of a vehicle to be measured being applied to the truck scale according to claim 1, further comprising inter-axle distance storage means (211) for storing the distance (L) between the front and rear axles of the vehicle (5) to be measured in advance;

vehicle inclination angle calculation means (22) for calculating the longitudinal inclination angle (θ) from the distance (L) between the front and rear axles stored in the inter-axle distance storage means (211) and the height (H) of the front wheel platform (12); and front axle load storage means (231A) and rear axle load storage means (231B) for storing the front axle load and the rear axle load in advance, respectively in advance.

6. The apparatus for determining the center of gravity of a vehicle to be measured being applied to the truck scale according to claim 1, further comprising:

vehicle inclination angle storage means (221) for storing the longitudinal inclination angle (θ) of the vehicle (5) to be measured of which distance (L) between the front and rear axles is constant; and front axle load calculation means (23A) and rear axle load calculation means (23B) for calculating the front axle load and the rear axle load on the basis of measurement values (Wa-Wd) fed from the individual load cells (13A-13D), respectively.

7. The apparatus for determining the center of gravity of a vehicle to be measured being applied to the truck scale according to claim 1, further comprising:

lateral displacement calculation means (27) for calculating how much a central extension line (Q) passing between the left and right wheels is displaced along a left/right direction with respect to a central extension line (P) passing between the left and right load cells on the basis of the wheel position information fed from the wheel position detector (8) under conditions where the vehicle (5) to be measured is placed on the measuring table (10);

left-wheel group wheel load calculation means (28A) and right-wheel group wheel load calculation means (28B) for calculating total loads (LW, RW) of left- and right-side wheel groups (51A and 51C, 51B and 51D) of the vehicle (5) to be measured, respectively, on the basis of measurement values (Wa-Wd) fed from the individual load cells (13A-13D) when the vehicle (5) to be measured is placed on the measuring table (10); and lateral center-of-gravity position calculation means (29) for calculating the position where the center of gravity (G) of the vehicle is located along the left/right direction thereof from the total loads (LW, RW) of the left and right wheels calculated by the left-wheel group wheel load calculation means (28A) and the right-wheel group wheel load calculation means (28B), respectively, and the amount of displacement (S) along the left/right direction calculated by the lateral displacement calculation means (27).

8. A truck scale including load cells (13A-13D) provided individually at around four corners of a measuring table (10) below a bottom surface thereof, the measuring table (10) being provided with a flat surface (11) having a surface area on which all wheels (51A-51D) of a vehicle (5) to be measured can be simultaneously placed and a front wheel platform (12) located, at a position in a frontal part of the flat surface (11) and raised to a specific height, the truck scale being configured to be able to measure the weight of the vehicle (5) to be measured by a central processing unit (3) on the basis of measurement values fed from the individual load cells (13A-13D) when the vehicle (5) to be measured is placed on the measuring table (10), the truck scale comprising:
- a wheel position detector (8) for or detecting a front wheel position and a rear wheel position of the vehicle (5) to be measured that is placed on the measuring table (10)
- longitudinal displacement calculation means (20) for calculating how much the vehicle (5) to be measured is displaced frontward or rearward from a reference position along a front/rear direction on the basis of information on the wheel positions detected by the wheel position detector (8) under conditions where the vehicle (5) to be measured is placed on the measuring table (10);
- longitudinal center-of-gravity position calculation means (24) for acquiring a front axle load and a rear axle load of the vehicle (5) to be measured and calculating a position where the center of gravity (G or G') of the vehicle is located along the front/rear direction thereof on the basis of the front axle load, the rear axle load and the amount of longitudinal displacement calculated by the longitudinal displacement calculation means (20);
- storage means (32) for storing information on the center of gravity along the front/rear direction calculated by the longitudinal center-of-gravity position calculation means (24);
- longitudinal center-of-gravity displacement calculation means (25) for calculating the amount of displacement (T) of the center of gravity along the front/rear direction by comparing information on the center of gravity along the front/rear direction newly calculated by the longitudinal center-of-gravity position calculation means (24) under conditions where front wheels (51A, 51B) of the vehicle (5) to be measured ride on the front wheel platform (12) and the information on the center of gravity on the flat surface (11) stored in the storage means (32); and
- vehicle center-of-gravity height calculation means (26) for acquiring a longitudinal inclination angle (θ) of the vehicle (5) to be measured under conditions where the front wheels (51A, 51B) of the vehicle (5) to be measured ride on the front wheel platform (12) and calculating the height (G1) of the center of gravity of the vehicle (5) to be measured on the basis of the amount of displacement (T) of the center of gravity along the front/rear direction calculated by the longitudinal center-of-gravity displacement calculation means (25) and the longitudinal inclination angle (θ).

9. An apparatus for determining the center of gravity of a vehicle to be measured being applied to a truck scale including load cells (13A-13D) provided individually at around four corners of a measuring table (10) below a bottom surface thereof, the truck scale being configured to be able to measure the weight of the vehicle (5) to be measured by a central processing unit (3) on the basis of measurement values fed from the individual load cells (13A-13D) when the vehicle (5) to be measured is placed on the measuring table (10), the apparatus comprising:
- a vehicle position detector (108) for detecting a specified position of the vehicle (5) to be measured that is placed on the measuring table (10);
- lateral displacement calculation means (27) for calculating how much a center line (Q) of the vehicle (5) to be measured is displaced along a left/right direction with respect to a central extension line (P) passing between a pair of left and right load cells (13A and 13B, 13C and 13D) on the basis of detection by the vehicle position detector (108);
- left-wheel group wheel load calculation means (28A) and right-wheel group wheel load calculation means (28B) for calculating total loads (LW, RW) of left- and right-side wheel groups (51A and 51C, 51B and 51D) of the vehicle (5) to be measured, respectively, on the basis of measurement values (Wa-Wd) fed from the individual load cells (13A-13D) when the vehicle (5) to be measured is placed on the measuring table (10); and
- lateral center-of-gravity position calculation means (29) for calculating the position where the center of gravity (G) of the vehicle is located along the left/right direction thereof from the total loads (LW, RW) of the left and right wheels calculated by the left-wheel group wheel load calculation means (28A) and the right-wheel group wheel load calculation means (28B), respectively, and the amount of displacement (S) along the left/right direction calculated by the lateral displacement calculation means (27).

10. The apparatus for determining the center of gravity of a vehicle to be measured being applied to the truck scale according to claim 9, wherein the vehicle position detector (108) is configured to detect the position of one of left and right side surfaces (5a) of the vehicle (5) to be measured that is placed on the measuring table (10), and the lateral displacement calculation means (27) acquires the center line (Q) on the basis of information (N) on the vehicle's side surface positions fed from the vehicle position detector (108) and the width (D) of the vehicle (5) to be measured that is stored in advance.

11. The apparatus for determining the center of gravity of a vehicle to be measured being applied to the truck scale according to claim 9, wherein the vehicle position detector (108) includes vehicle's left side surface position detector (108A) and a vehicle's right side surface position detector (108B) for detecting the positions of left and right side surfaces (5a, 5b) of the vehicle (5) to be measured that rides on the measuring table (10), respectively, and the lateral displacement calculation means (27) acquires the center line (Q) on the basis of information (N1, N2) on the vehicle's left and right side surface positions detected by the vehicle's left side surface position detector (108A) and the vehicle's right side surface position detector (108B) and the distance (F) between the vehicle's left side surface position detector (108A) and the vehicle's right side surface position detector (108B) along the left/right direction stored in advance.

12. The apparatus for determining the center of gravity of a vehicle to be measured being applied to the truck scale according to claim 9, wherein the vehicle position detector (108) includes a single vehicle's left/right corner position detector (108C) for detecting the positions (5c, 5d) of left and right corners of the vehicle (5) to be measured that rides on the measuring table (10) by swinging across horizontal directions, and the lateral center-of-gravity position calculation means (27) acquires the vehicle's center line (Q) on the basis of information on the positions of the vehicle's left and right corners detected by the vehicle's left/right corner position detector (108C).

13. A truck scale including load cells (13A-13D) provided individually at around four corners of a measuring table (10) below a bottom surface thereof, the truck scale being configured to be able to measure the weight of the vehicle (5) to be measured by a central processing unit (3) on the basis of measurement values fed from the individual load cells (13A-13D) when the vehicle (5) to be measured is placed on the measuring table (10), the truck scale comprising:

a vehicle position detector (108) for detecting a specified position of the vehicle (5) to be measured that is placed on the measuring table (10);

lateral displacement calculation means (27) for calculating how much a center line (Q) of the vehicle (5) to be measured is displaced along a left/right direction with respect to a central extension line (P) passing between a pair of left and right load cells (13A and 13B, 13C and 13D) on the basis of detection by the vehicle position detector (108);

left-wheel group wheel load calculation means (28A) and right-wheel group wheel load calculation means (28B) for calculating total loads (LW, RW) of left- and right-side wheel groups (51A and 51C, 51B and 51D) of the vehicle (5) to be measured, respectively, on the basis of measurement values (Wa-Wd) fed from the individual load cells (13A-13D) when the vehicle (5) to be measured is placed on the measuring table (10); and lateral center-of-gravity position calculation means (29) for calculating the position where the center of gravity (G) of the vehicle is located along the left/right direction thereof from the total loads (LW, RW) of the left and right wheels calculated by the left-wheel group wheel load calculation means (28A) and the right-wheel group wheel load calculation means (28B), respectively, and the amount of displacement (S) along the left/right direction calculated by the lateral displacement calculation means (27).

* * * * *